US012748392B1

(12) United States Patent
Kotowksi-Chang et al.

(10) Patent No.: US 12,748,392 B1
(45) Date of Patent: Sep. 29, 2026

(54) APPARATUS FOR AND METHOD OF PREDICTIVE ADAPTATION OF DATA PARAMETERS

(71) Applicant: Archer Roose, Inc., Boston, MA (US)

(72) Inventors: Jan Kotowksi-Chang, N Bellmore, NY (US); Marian Leitner, Dartmouth, MA (US)

(73) Assignee: Archer Roose, Inc., Boston, MA (US)

( * ) Notice: Subject to any disclaimer, the term of this patent is extended or adjusted under 35 U.S.C. 154(b) by 0 days.

(21) Appl. No.: 19/384,050

(22) Filed: Nov. 10, 2025

(51) Int. Cl.
*G05B 13/04* (2006.01)
*G05B 13/02* (2006.01)

(52) U.S. Cl.
CPC ....... *G05B 13/042* (2013.01); *G05B 13/0265* (2013.01); *G05B 13/048* (2013.01)

(58) Field of Classification Search
CPC .......... G06N 20/00; G06N 5/022; G06N 3/08; G05B 19/41875; G05B 13/0265; G05B 13/027; G05B 2219/32193; G05B 2219/32194; G05B 2219/45031; G05B 13/048; G05B 13/029; G05B 13/04; G05B 2219/31449; G05B 2219/32191; G05B 2219/32368; G05B 2219/33025; G05B 2219/33034; G05B 23/0254; G01N 33/146; G01N 22/02; G01N 2201/1296; G01N 27/24; G06Q 50/04; C12G 3/08; C12H 1/22; G06F 11/079; G06F 17/40
See application file for complete search history.

(56) References Cited

U.S. PATENT DOCUMENTS

| | | | | |
|---|---|---|---|---|
| 6,477,432 B1 * | 11/2002 | Chen | ................ | G05B 19/41875 700/32 |
| 7,647,131 B1 * | 1/2010 | Sadowski | .......... | G05B 23/0297 702/181 |
| 10,691,082 B2 * | 6/2020 | Di Pietro | ............... | G05B 13/04 |
| 11,747,772 B1 * | 9/2023 | Putman | ................ | G05B 13/027 700/29 |

(Continued)

FOREIGN PATENT DOCUMENTS

| | | |
|---|---|---|
| JP | 2005047509 A | 2/2005 |
| JP | 2023097960 A | 7/2023 |
| WO | 2011013456 A | 2/2011 |

OTHER PUBLICATIONS

Improving Industrial Quality Control by Machine Learning Technique Esraa Raheem Alzaidi1 (Year: 2024).*

(Continued)

*Primary Examiner* — Darrin D Dunn
(74) *Attorney, Agent, or Firm* — CALDWELL LLC

(57) ABSTRACT

An apparatus for and method of predictive adaptation of data parameters. The apparatus includes at least a processor, and a memory configuring the at least a processor to receive liquid data, receive facility data at a first sampling rate, identify at least a mechanical variability, generate an interaction profile, and determine a compatibility score as a function of the interaction profile. The processor is additionally configured to generate an adjustment profile as a function of the compatibility score and the at least a mechanical variability, modify the first sampling rate to a second sampling rate as a function of the adjustment profile, and generate a graphical user interface including the adjustment profile.

20 Claims, 29 Drawing Sheets

(56) References Cited

U.S. PATENT DOCUMENTS

| | | | | |
|---|---|---|---|---|
| 2017/0206469 | A1* | 7/2017 | Das | G05B 13/048 |
| 2018/0018587 | A1* | 1/2018 | Kobayashi | G06N 20/00 |
| 2018/0082139 | A1* | 3/2018 | Li | G06V 30/224 |
| 2020/0029600 | A1 | 1/2020 | Colina | |
| 2020/0401120 | A1* | 12/2020 | Putman | G05B 19/41875 |
| 2021/0375492 | A1* | 12/2021 | Walker | G06N 20/00 |
| 2022/0092473 | A1* | 3/2022 | Lee | G06F 18/251 |
| 2022/0308566 | A1* | 9/2022 | Meyer | G05B 19/41865 |
| 2023/0004149 | A1* | 1/2023 | Dehghanimohammadabadi | G05B 19/41885 |
| 2023/0076083 | A1* | 3/2023 | Mishra | G06F 18/2148 |
| 2023/0306281 | A1* | 9/2023 | Han | H01L 21/67063 |
| 2024/0028976 | A1* | 1/2024 | Imoto | G06N 5/01 |
| 2024/0104270 | A1* | 3/2024 | Das | G06N 3/098 |
| 2024/0168467 | A1* | 5/2024 | Kotriwala | G05B 19/41875 |
| 2024/0274449 | A1* | 8/2024 | Jo | H01L 21/67253 |
| 2024/0377802 | A1* | 11/2024 | Stoddard | G05B 19/188 |
| 2025/0086046 | A1* | 3/2025 | Xie | G06F 11/079 |
| 2025/0093319 | A1* | 3/2025 | Feng | G06N 5/01 |
| 2025/0238681 | A1* | 7/2025 | Luzin | G06N 3/096 |
| 2025/0258152 | A1* | 8/2025 | Crabtree | C12G 3/07 |
| 2025/0314608 | A1* | 10/2025 | Anderson | G01R 27/2623 |
| 2025/0348849 | A1* | 11/2025 | Khan | G06N 20/00 |

OTHER PUBLICATIONS

Jody Dascalu; Flexible manufacturing systems in beverage production; “Global Spec, food and beverage article Jan. 8, 2025”.

* cited by examiner

Supplemental Table 1 Initial composition of wines used in long-term canning study. TA, titratable acidity; ABV, alcohol by volume.

| Wine | Vintage | Composition | Alcohol (% ABV) | TA (g/L) | pH | Residual sugar (g/L) | Free $SO_2$ (mg/L) | $mSO_2$ (mg/L)[a] | Aluminum (mg/L) | Free $SO_2$ (mg/L): Treatment II and III | $mSO_2$ (mg/L): Treatment II | $mSO_2$ (mg/L): Treatment III |
|---|---|---|---|---|---|---|---|---|---|---|---|---|
| Pinot grigio | 2021 | 100% Pinot grigio | 12.1% | 6.7 | 3.37 | 0.0 | 16 | 0.59 | 1.17 | 38 | 1.40 | 0.58 |
| Sauvignon blanc | 2021 | 100% Sauvignon blanc | 12.1% | 7.40 | 3.28 | 1.2 | 15 | 0.68 | 1.15 | 35 | 1.58 | 0.67 |
| French rosé | 2019 | 60.2% Grenache noir; 26.5% Syrah; 8% Carignon; 5% Grenache blanc; 0.3% Ugni blanc | 12.7% | 6.10 | 3.30 | 0.6 | 21 | 0.93 | 1.16 | 51 | 2.28 | 0.57 |
| Sparkling rosé | NV | 90% Glera, 10% Pinot noir | 11.2% | 5.79 | 3.20 | 9.5 | 20.5 | 1.07 | 0.61 | 45 | 2.36 | 0.72 |
| Sparkling white | NV | 100% Glera | 10.5% | 5.60 | 3.11 | 10.9 | 15 | 0.93 | 1.11 | 41 | 2.49 | 0.69 |

[a] $mSO_2$, molecular $SO_2$, calculated from pH and free $SO_2$ using alcohol-adjusted acid dissociation constant ($pK_a$) values.

FIG. 11

Supplemental Table 2 Parameters for open circuit potential testing.

| | |
|---|---|
| **Pretreatment settings** | |
| E condition 1 | 0 V |
| t condition 1 | 0 sec |
| E condition 2 | 0 V |
| t condition 2 | 0 sec |
| **Corrosion potential settings** | |
| t interval | 1 sec |
| t run | 3600 sec |

FIG. 12A

Supplemental Table 3 Parameters for electrochemical impedance spectroscopy testing. OCP, open circuit potential; DC, direct current; AC, alternating current.

| | |
|---|---|
| **Pretreatment settings** | |
| E condition 1 | 0 V |
| t condition 1 | 0 sec |
| E condition 2 | 0 V |
| t condition 2 | 0 sec |
| **Impedance spectroscopy settings** | |
| t equilibration | 0 sec |
| Scan type | Fixed |
| E DC | 0 V |
| E AC | 0.01 V |
| Frequency type | Scan |
| n frequencies | 67 |
| Max frequency | 50,000 Hz |
| Min frequency | 0.01 Hz |
| Measure versus OCP | Checked |
| E DC versus OCP | Checked |
| t max OCP | 5 sec |
| Stability criterion | 0.1 mV/sec |
| t min sampling | 0.1 sec |
| t max equilibration | 0.01 sec |

FIG. 12B

APPARATUS FOR AND METHOD OF PREDICTIVE ADAPTATION OF DATA PARAMETERS

FIELD OF THE INVENTION

The present invention generally relates to the field of artificial-intelligent (AI) derived data adaptation. In particular, the present invention is directed to an apparatus for and method of predictive adaptation of data parameters.

BACKGROUND

Conventional adaptive systems typically depend on static rules or manually tuned feedback loops that are unable to anticipate dynamic changes in complex industrial or environmental conditions. These systems often result in delayed responses, suboptimal performance, and inefficiencies in maintaining process stability or product quality. Accordingly, there exists a need for a technical solution that addresses such challenges.

SUMMARY OF THE DISCLOSURE

In some aspects, the techniques described herein relate to an apparatus for predictive adaptation of data parameters, the apparatus including at least a processor, and a memory communicatively connected to the at least a processor, wherein the memory contains instructions configuring the at least a processor to receive liquid data including one or more liquid parameters associated with a liquid formulation and an associated parameter range, receive facility data at a first sampling rate, wherein the facility data includes one or more facility parameters, identify at least a mechanical variability as a function of the one or more facility parameters and reference data, generate an interaction profile between the one or more liquid parameters and the one or more facility parameters, determine a compatibility score as a function of the interaction profile, generate an adjustment profile as a function of the compatibility score and the at least a mechanical variability, wherein generating the adjustment profile includes in response to the compatibility score being lower than a compatibility threshold, generating at least an adjusted liquid parameter of the adjustment profile as a function of the at least a mechanical variability, and in response to the at least an adjusted liquid parameter exceeding the parameter range, generating at least an adjusted facility parameter of the adjustment profile as a function of the one or more liquid parameters, modify the first sampling rate to a second sampling rate as a function of the adjustment profile, and generate a graphical user interface including the adjustment profile.

In some aspects, the techniques described herein relate to a method of predictive adaptation of data parameters, the method including receiving, using at least a processor, liquid data including one or more liquid parameters associated with a liquid formulation and an associated parameter range, receiving, using the at least a processor, facility data at a first sampling rate, wherein the facility data includes one or more facility parameters, identifying, using the at least a processor, at least a mechanical variability as a function of the one or more facility parameters and reference data, generating, using the at least a processor, an interaction profile between the one or more liquid parameters and the one or more facility parameters, determining, using the at least a processor, a compatibility score as a function of the interaction profile, generating, using the at least a processor, an adjustment profile as a function of the compatibility score and the at least a mechanical variability, wherein generating the adjustment profile includes in response to the compatibility score being lower than a compatibility threshold, generating at least an adjusted liquid parameter of the adjustment profile as a function of the at least a mechanical variability, and in response to the at least an adjusted liquid parameter exceeding the parameter range, generating at least an adjusted facility parameter of the adjustment profile as a function of the one or more liquid parameters, and modifying, using the at least a processor, the first sampling rate to a second sampling rate as a function of the adjustment profile, and generating, using the at least a processor, a graphical user interface including the adjustment profile.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 11 is a table illustrating initial composition of wines used in a long-term canning study;

FIG. 12A is a table of parameters for open circuit potential testing;

FIG. 12B is a table of parameters for electrochemical impedance spectroscopy testing;

Figure 1:
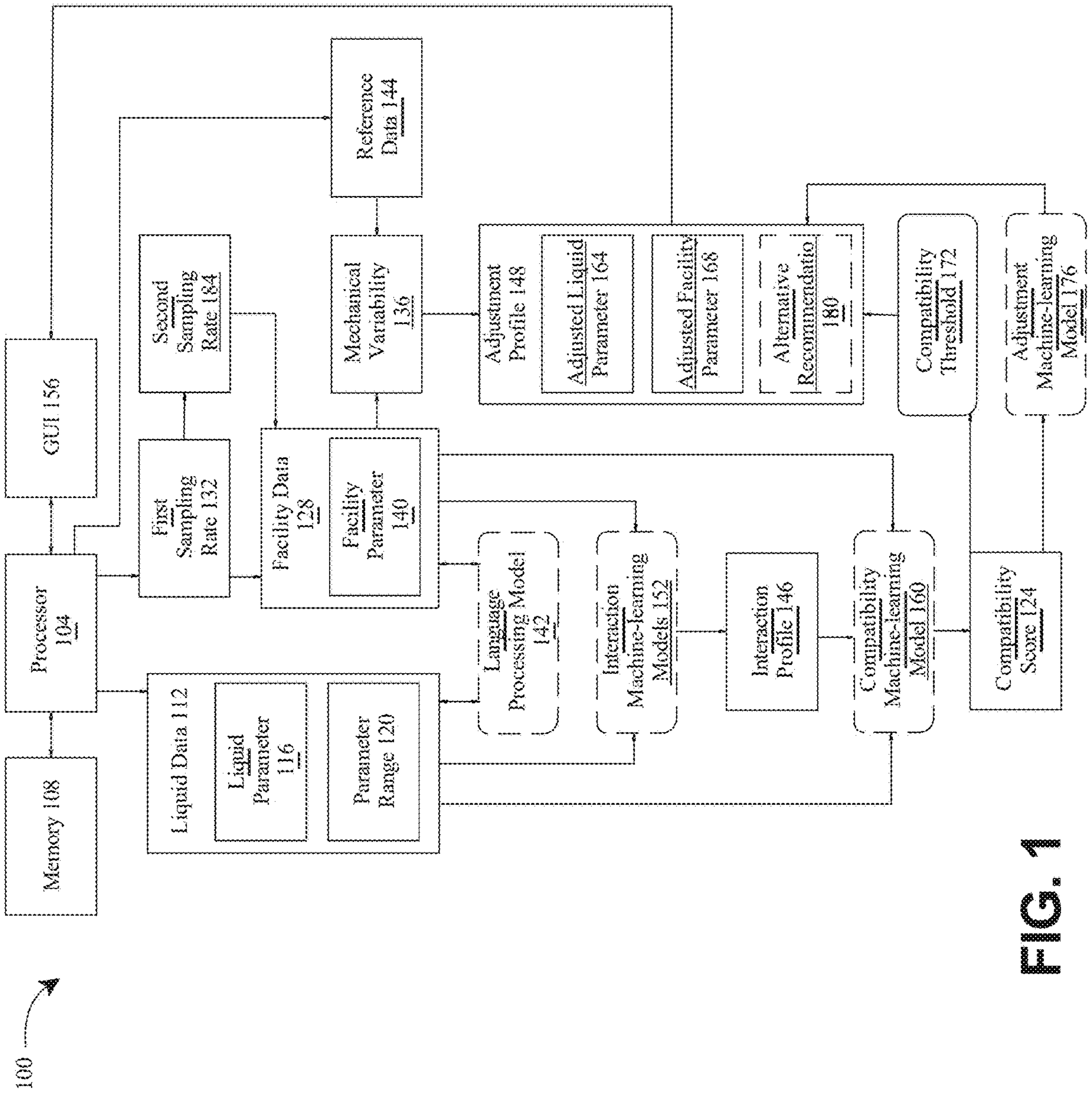
FIG. 1 illustrates a block diagram of an exemplary apparatus for predictive adaptation of data parameters.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses for and methods of predictive adaptation of data parameters, the apparatus including at least a processor, and a memory communicatively connected to the at least a processor, wherein the memory contains instructions configuring the at least a processor to receive liquid data including one or more liquid parameters associated with a liquid formulation and an associated parameter range, receive facility data at a first sampling rate, wherein the facility data includes one or more facility parameters, identify at least a mechanical variability as a function of the one or more facility parameters and reference data, generate an interaction profile between the one or more liquid parameters and the one or more facility parameters, determine a compatibility score as a function of the interaction profile, generate an adjustment profile as a function of the compatibility score and the at least a mechanical variability, wherein generating the adjustment profile includes in response to the compatibility score being lower than a compatibility threshold, generating at least an adjusted liquid parameter of the adjustment profile as a function of the at least a mechanical variability, and in response to the at least an adjusted liquid parameter exceeding the parameter range, generating at least an adjusted facility parameter of the adjustment profile as a function of the one or more liquid parameters, modify the first sampling rate to a second sampling rate as a function of the adjustment profile, and generate a graphical user interface including the adjustment profile. Exemplary embodiments illustrating aspects of the present disclosure are described below in the context of several specific examples.

Manufacturing inconsistencies among canning facilities, such as differences in filler head alignment, purge gas efficiency, nitrogen dosing accuracy, and seaming pressure, often result in significant variability in beverage quality, even when using identical formulations. The disclosed disclosure provides a technical solution for adapting beverage chemistry and packaging parameters to account for site-specific mechanical variability without requiring physical retrofitting of equipment. The process may involve receiving and analyzing data representing facility capabilities, including parameters such as nitrogen dosing consistency, purge effectiveness, and thermal control stability. Based on these parameters, the system may dynamically adjust beverage attributes such as dissolved oxygen targets, sulfur dioxide thresholds, and fill-level tolerances to maintain optimal product stability. Traditional canning lines, originally designed for carbonated beverages, lack standardization necessary for sensitive products like wine, where small deviations in oxygen exposure or seaming integrity can compromise shelf life and flavor preservation. The disclosed may apparatus mitigate this issue by computationally modeling facility variability and adapting beverage parameters through predictive machine-learning algorithms. This may allow producers to achieve consistent outcomes across diverse co-packing sites, reducing reliance on costly equipment modification or repetitive trial runs. Accordingly, the disclosure may offer a technical framework for harmonizing beverage performance across heterogeneous canning infrastructures through data-driven predictive adaptation.

Referring now to FIG. 1, an exemplary embodiment of apparatus 100 for predictive adaptation of data parameters is illustrated. Apparatus 100 may include circuitry such as without limitation a processor 104 communicatively connected to a memory 108; for instance, circuitry may include and/or be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, For example, and without limitation, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, memory 108 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 104 may access the information from primary memory.

With continued reference to FIG. 1, as used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 receives liquid data 112. For the purposes of this disclosure, "liquid data" is digital information representing a dataset of measurable, categorical, or derived properties of a liquid formulation. In some embodiments, liquid data 112 may function as the aggregate input dataset upon which processor 104 performs comparative, analytical, and predictive operations. Processor 104 may receive liquid data 112 from one or more authenticated data sources such as laboratory information systems, formulation databases, or production control servers. Each data record in liquid data 112 may be associated with a time index, product identifier, and contextual metadata describing batch origin, testing protocol, and packaging environment. For the purposes of this disclosure, "liquid" is a consumable beverage intended for human consumption that contains one or more dissolved, suspended, or emulsified components. As a non-limiting example, liquid may include wine, beer, cider, carbonated water, juice, or any other liquid formulation configured to be packaged into an aluminum container, glass bottle, or other sealed vessel. In some embodiments, liquid may include chemical or physical constituents such as ethanol, water, dissolved gases, sugars, acids, or flavoring compounds.

With continued reference to FIG. 1, processor 104 may normalize liquid data 112 through a pre-processing routine that includes data-type validation, unit harmonization, and missing-value interpolation. In some embodiments, processor 104 may store liquid data 112 as a multidimensional matrix, where each dimension corresponds to a liquid property or operational context. Liquid data 112 may include a container-level representation of all liquid-related variables, whereas liquid parameter 116, discussed below, refers to the individual scalar or categorical variables contained within this dataset. As a non-limiting example, liquid data 112 may include a matrix containing pH readings, oxygen content, free copper levels, dissolved gas profiles, temperature histories, viscosity data, and colorimetric measurements. Each entry may represent a discrete liquid parameter 116 associated with that dataset. Processor 104 may process liquid data 112 through stored algorithms or trained machine-learning models to derive patterns, predictions, and quality metrics used for compatibility evaluation and parameter adaptation.

With continued reference to FIG. 1, in some embodiments, processor 104 may be configured to receive liquid data 112 from a plurality of heterogeneous data sources, including structured datasets, semi-structured reports, and unstructured file formats. Liquid data 112 may include, as a non-limiting example, digital file formats such as portable document format (PDF) files, comma-separated value (CSV) files, laboratory information management system (LIMS) records, or machine logs generated by analytical instruments. In some cases, processor 104 may acquire liquid data 112 through a secure communication network, a cloud-based data repository, or a local data interface connected to laboratory or facility equipment. In certain embodiments, processor 104 may perform a data extraction routine to transform unstructured or semi-structured liquid data 112 into a structured computational representation. Processor 104 may execute a document parsing algorithm, text recognition model, or pattern classification routine to extract discrete data elements corresponding to measurable properties of a liquid formulation. These extracted data elements may subsequently be formatted into a structured array or table stored in memory for further analysis. In such cases, processor 104 effectively converts human-readable or instrument-reported files into standardized datasets suitable for predictive computation. As a non-limiting example, processor 104 may receive liquid data 112 in the form of a PDF laboratory report containing textual and tabular descriptions of chemical measurements such as pH, dissolved oxygen concentration, free sulfur dioxide level, and copper ion concentration. Processor 104 may identify numerical tokens and measurement labels within the document using natural language processing and assign each identified value to a predefined variable slot in memory. Processor 104 may subsequently normalize the extracted dataset through scaling, unit conversion, and validation routines stored in system memory.

With continued reference to FIG. 1, liquid data 112 includes liquid parameters 116 associated with a liquid formulation and associated parameter range 120. The parameter range 120 is described in detail below. For the purposes of this disclosure, "liquid parameter" is an individual data variable within liquid data that quantifies or categorically represents a property of a liquid formulation. In some cases, liquid parameter 116 may serve as the atomic informational unit of liquid data 112. Each liquid parameter 116 may carry a discrete measurement or classification value that processor 104 can directly manipulate, compare, or optimize. Processor 104 may isolate individual liquid parameters 116 from liquid data 112 when performing compatibility analysis, predictive modeling, or parameter adjustment routines. Liquid parameter 116 may include scalar or categorical entity embedded within the broader dataset of liquid data 112. As a non-limiting example, liquid parameter 116 may include dissolved oxygen concentration, free sulfur dioxide, total acidity, copper ion concentration, ethanol percentage, or carbonation volume. As a non-limiting example, liquid parameter 116 may include physicochemical characteristics of the liquid such as free sulfur dioxide ($FSO_2$), total sulfur dioxide ($TSO_2$), molecular sulfur dioxide, total package oxygen, and dissolved oxygen concentration. Liquid parameter 116 may further include carbon dioxide concentration, temperature at filling, internal pressure at rest, and pH value. For the purposes of this disclosure, "liquid formulation" refers to a composition of a liquid product characterized by its chemical, physical, and sensory properties that define its performance, stability, and quality during processing, packaging, and storage. In some embodiments, liquid formulation may include one or more components such as base liquid (e.g., water, wine, juice, or alcoholic mixture), dissolved gases (e.g., $CO_2$, $N_2$), solutes (e.g., sugars, acids, or preservatives), and additives (e.g., flavoring agents, stabilizers, antioxidants, or clarifiers). Each of these components may influence measurable liquid parameters 116, including, without limitation, free sulfur dioxide ($FSO_2$) levels, total sulfur dioxide ($TSO_2$), dissolved oxygen (DO), carbonation pressure, viscosity, and pH.

With continued reference to FIG. 1, liquid parameter 116 may include container-related parameters that directly influence liquid chemistry. For instance, and without limitation, liquid parameter 116 may include can material, such as aluminum alloys, liner material, liner type, or liner coating chemistry. For the purposes of this disclosure, a "liner material" is a coating layer disposed on an interior surface of a container that forms a physical and chemical barrier between a liquid and a metallic base layer of the container. The liner material may determine the degree of interaction between the liquid and metal substrate, affecting hydrogen sulfide ($H_2S$) generation, corrosion resistance, and long-term flavor stability. As a non-limiting example, aluminum liner material variation across suppliers can significantly impact $H_2S$ levels after storage, even when liquid chemistry remains constant. Therefore, processor 104 may treat liner material type as an embedded subfield within liquid parameter 116 to quantify its effect on compatibility score 124. As a non-limiting example, liner material may include BPA-NI Gen 2 coating, which refers to a bisphenol-A-non-intent polymeric liner formulation engineered to minimize migration and oxidative reactions with acidic liquids. Additional examples of liner material may include BPA-NI Gen 1, epoxy-phenolic coatings, or hybrid polymer-ceramic liners.

With continued reference to FIG. 1, liquid parameter 116 may include storing position and filling level in a can, which influence gas exchange dynamics, headspace exposure, and liner contact area. For the purposes of this disclosure, a "storing position" is an orientation of a filled container during storage or distribution relative to a reference plane. For the purposes of this disclosure, a "filling level" is a volumetric point within a container that defines the upper limit of a liquid volume and establishes a headspace region between the liquid surface and an upper rim of the container. As a non-limiting example, upright storage orientation may limit liquid contact with the headspace liner region, while inverted or tilted storage may increase $H_2S$ formation by exposing unlined or thinly coated aluminum areas to acidic liquid contact. Similarly, filling level variations alter the surface-to-volume ratio and headspace oxygen content, which in turn affect molecular $SO_2$ consumption rates and oxygen ingress over time.

With continued reference to FIG. 1, in some embodiments, processor 104 may be configured to extract liquid parameters 116 from liquid data 112 through feature extraction algorithms. Processor 104 may apply rule-based parsing, statistical inference, or machine-learning models to identify relevant chemical or physical variables from liquid data 112. Once extracted, processor 104 may label each liquid parameter 116 with metadata describing its source, measurement unit, and timestamp. Processor 104 may then assign allowable parameter ranges for each liquid parameter 116 using constraint data stored in memory to define acceptable operational limits. As a non-limiting example, processor 104 may extract liquid parameters 116 such as pH, dissolved oxygen, or free sulfur dioxide concentration from liquid data 112 and compare those values to standard references to determine whether the parameters fall within acceptable tolerances. Processor 104 may execute this comparison using a correlation engine or regression model to establish statistical relationships between liquid parameters 116 and observed packaging stability outcomes. In certain embodiments, processor 104 may update liquid parameters 116 dynamically as new liquid data 112 is received. For example, and without limitation, when a new PDF analysis report is uploaded to the system, processor 104 may automatically parse the new document, extract updated liquid parameters 116, and overwrite outdated values in memory.

With continued reference to FIG. 1, processor 104 receives facility data 128 at a first sampling rate 132. For the purposes of this disclosure, "facility data" is s digital information representing a dataset of operational, mechanical, or environmental characteristics of a facility. Facility data 128 may include a dataset that provides contextual information describing the conditions, configurations, and performance capabilities of equipment, instrumentation, and facility-level processes relevant to liquid packaging and stability. For the purposes of this disclosure, a "first sampling rate" is a temporal frequency at which processor 104 receives facility data from one or more sensors or data acquisition systems located within a facility. In some embodiments, processor 104 may receive facility data 128 at a first sampling rate 132 defined by a fixed or dynamically assigned interval, such as every 10 milliseconds, 100 milliseconds, or one second, depending on system configuration. Facility data 128 may include measurements such as filler pressure, purge gas flow rate, seaming torque, or temperature, each collected through dedicated sensors. Processor 104 may receive the data via an analog-to-digital converter or a digital communication interface, such as a fieldbus, Ethernet/IP, or wireless industrial protocol. As a non-limiting example, processor 104 may initially operate at a low first sampling rate 132 to reduce computational and network overhead during nominal operation, when mechanical variability 136 remains within tolerance.

With continued reference to FIG. 1, in some embodiments, processor 104 may be configured to receive facility data 128 from one or more sources, including production control systems, maintenance logs, environmental sensors, operator interfaces, or facility databases. Facility data 128 may be transmitted to processor 104 through secure network communication, uploaded from local storage devices, or extracted from document-based sources such as equipment calibration certificates, sensor reports, or maintenance summaries. In certain cases, facility data 128 may include files such as spreadsheets, CSV files, or portable document format (PDF) reports that describe equipment specifications or performance history. In some embodiments, processor 104 may extract information from unstructured facility data 128 using parsing algorithms or pattern-recognition models to convert human-readable documentation into machine-interpretable structured datasets. Processor 104 may store facility data 128 in memory as a multidimensional record set, where each entry corresponds to a particular machine, operational event, or environmental reading.

With continued reference to FIG. 1, for the purposes of this disclosure, "facility parameter" is a defined variable within facility data that quantitatively or categorically represents a specific mechanical, environmental, or process-related attribute of a facility. Facility parameter 140 is an elemental unit of information extracted from facility data 128 and serves as the direct variable of comparison against liquid parameters 116 during compatibility computation and adaptation processes. In some embodiments, processor 104 may extract facility parameters 140 from facility data 128 using feature recognition or regression-based data extraction techniques. Processor 104 may assign each facility parameter 140 a measurement unit, sampling frequency, and acceptable operating range stored in memory. In certain cases, processor 104 may classify facility parameters 140 according to their operational domain, such as filling system behavior, purge gas performance, seaming conditions, or environmental stability. As a non-limiting example, facility parameter 140 may include filler head alignment, nitrogen dosing accuracy, seaming pressure, product inlet temperature, line speed, purge gas efficiency, or equipment calibration drift. For the purposes of this disclosure, a "filler head alignment" is a spatial relationship between a filler head outlet and a corresponding container opening that defines the linear and angular positioning of the filler head relative to the container during a filling operation. For the purposes of this disclosure, a "purge gas efficiency" is a quantitative measure of the effectiveness of a gas-based purging process in displacing oxygen or other atmospheric gases from an interior volume of a container prior to liquid filling. For the purposes of this disclosure, a "nitrogen dosing accuracy" is a degree of precision with which a nitrogen dosing system delivers a target nitrogen volume or droplet mass into a container during a filling cycle. For the purposes of this disclosure, a "seaming pressure" is a compressive force applied by a seaming apparatus to form a double seam between a lid and a container body that produces a hermetic mechanical and gas-tight seal. Processor 104 may analyze each facility parameter 140 to determine whether its value falls within a predetermined acceptable range derived from reference equipment specifications. Facility parameters 140 that deviate beyond acceptable tolerances may be flagged by processor 104 as indicators of mechanical variability, which in turn influence compatibility score 124 and adjustment profile generation. In certain embodiments, processor 104 may compute correlations between liquid parameters 116 and facility parameters 140 using stored machine-learning models to establish how mechanical or thermal inconsistencies affect liquid chemistry stability. For instance, processor 104 may evaluate how variations in nitrogen dosing rate (a facility parameter 140) influence dissolved oxygen concentration (a liquid parameter 116) and adjust target thresholds accordingly. Processor 104 may apply these relationships dynamically during production to adapt formulation settings or operational parameters to ensure consistent product outcomes.

With continued reference to FIG. 1, facility data 128 thus functions as the comprehensive dataset describing facility-level mechanical and environmental characteristics, while facility parameter 140 serves as the granular variable extracted from that dataset and used for computational comparison and prediction. Processor 104 uses facility data 128 to establish the context in which liquid formulations are produced and uses facility parameters 140 to quantify and adaptively correct for the specific mechanical differences among canning facilities, thereby enabling consistent liquid stability without requiring hardware standardization or costly retrofitting.

With continued reference to FIG. 1, for the purposes of this disclosure, "facility" is a physical or digital manufacturing environment in which liquid packaging operations occur. The environment may include interconnected equipment, process control systems, and operational infrastructure that collectively influence packaging quality and performance. Facility may include an operational entity characterized by mechanical variability, environmental conditions, and control settings measurable by processor 104 through data collection and analysis routines.

With continued reference to FIG. 1, in some embodiments, facility may include one or more mechanical subsystems such as liquid filling lines, nitrogen dosing systems, purge gas delivery systems, seaming or capping machines, and thermal regulation units. In certain cases, facility may also include environmental monitoring devices such as temperature sensors, pressure transducers, and gas analyzers that generate input signals corresponding to real-time facility conditions. Facility may further include control infrastructure such as programmable logic controllers, networked control terminals, or supervisory control and data acquisition systems that record or transmit process information to processor 104. In some embodiments, facility may operate as a distributed canning site within a broader co-packing network. Each facility may have its own unique set of operational tolerances, mechanical configurations, and process sequences. Processor 104 may be configured to receive facility data 128 from multiple facility locations, allowing the apparatus to identify and quantify inter-site variability. This inter-site variability may include differences in filler head alignment, purge gas efficiency, nitrogen dosing precision, or sealing pressure, all of which affect liquid quality during packaging. As a non-limiting example, facility may include a canning line equipped with a filler having eight heads, a nitrogen dosing manifold, a double-seam roller assembly, and a temperature control unit. Each of these mechanical components may be represented in facility data 128 through associated facility parameters 140 such as filler alignment deviation, nitrogen droplet mass distribution, or roller contact force. Processor 104 may interpret these facility parameters 140 to assess operational stability, detect calibration drift, or predict maintenance requirements. In some embodiments, facility may further include a data communication interface that allows processor 104 to access live or historical records of equipment performance. Facility may store these records locally on production servers or transmit them through a cloud-based network to a centralized system where processor 104 performs multi-facility comparison. Processor 104 may analyze received facility data 128 from each facility to generate a compatibility profile that determines which sites are most capable of handling a given liquid formulation without requiring process modification.

With continued reference to FIG. 1, in certain embodiments, processor 104 may assign a digital representation to each facility within memory, where the representation includes stored references to associated facility data 128, historical performance logs, and operational thresholds. This digital representation enables processor 104 to simulate production behavior, predict packaging outcomes, and execute adaptive parameter control virtually before applying real-world changes. Processor 104 may use these simulated evaluations to recommend facility selection or to generate facility adjustment parameters that improve compatibility between the facility and liquid formulation characteristics. As a non-limiting example, processor 104 may evaluate three facilities within a co-packing network, each with unique nitrogen dosing tolerances, filler geometries, and environmental conditions. Processor 104 may determine that one facility has a lower mechanical variability score, making it better suited for a low-sulfur liquid formulation, while another facility requires adjustment of its purge gas dwell time to meet compatibility thresholds. Processor 104 may output these determinations to a graphical user interface for operator review and decision-making.

With continued reference to FIG. 1, in some embodiments, processor 104 may use a language processing model 142 to extract liquid parameter 116 and facility parameter 140 from liquid data 112 and facility data 128. for the purposes of this disclosure, a "language processing model" is a statistical or computational representation of linguistic relationships between textual elements. The language processing model 142 may be configured to extract, from the one or more documents, one or more words associated with liquid and facility specifications. One or more words may include, without limitation, strings of one or more characters, including without limitation any sequence or sequences of letters, numbers, punctuation, diacritic marks, engineering symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams," where all sequences of n consecutive characters are considered. Any or all possible sequences of tokens or words may be stored as "chains," for example for use as a Markov chain or Hidden Markov Model.

With continued reference to FIG. 1, the language processing model 142 may operate to produce a language processing model 142. The language processing model 142 may include a program automatically generated by processor 104 and/or the language processing model 142 to produce associations between one or more words extracted from at least a document and detect associations, including without limitation mathematical associations, between such words. Associations between language elements, where language elements include for purposes herein extracted words, relationships of such categories to other such terms may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like. For instance, in some embodiments, the model may associate terms such as "oxygen concentration," "fill level," or "liner coating" with liquid parameter 116, and terms such as "filler head alignment," "nitrogen dosing," or "seaming pressure" with facility parameter 140.

With continued reference to FIG. 1, the language processing model 142 may generate the language processing model 142 by any suitable method, including without limitation a natural language processing classification algorithm; the language processing model 142 may include a natural language process classification model that enumerates and/or derives statistical relationships between input terms and output terms. The algorithm to generate the language processing model 142 may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that may be applied to the models. In such models, a hidden state to be estimated may include an association between extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. The language processing model 142 may combine two or more approaches. For instance, and without limitation, a machine-learning program may use a combination of Naive-Bayes (NB), Stochastic Gradient Descent (SGD), and parameter grid-searching classification techniques; the result may include a classification algorithm that returns ranked associations identifying relevant liquid parameter 116 or facility parameter 140.

With continued reference to FIG. 1, generating the language processing model 142 may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element distributive with respect to vector addition, and distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of the vector space; as a non-limiting example, each element of a vector may include a number representing an enumeration of co-occurrences of the word and/or language element represented by the vector with another word and/or language element. For instance, a token "free copper" may appear frequently with "ppm," allowing processor 104 to infer that it relates to a liquid parameter 116, whereas a token "roller pressure" may appear with "bar" or "psi," corresponding to a facility parameter 140. Vectors may be normalized, scaled according to relative frequencies of appearance and/or file sizes. In an embodiment, associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. The degree of similarity may include any other geometric measure of distance between vectors.

With continued reference to FIG. 1, the language processing model 142 may use a corpus of documents to generate associations between language elements, and the language processing model 142 may then use such associations to analyze words extracted from one or more documents and determine that the one or more documents indicate significance of a category. In an embodiment, the language module and/or processor 104 may perform this analysis using a selected set of significant documents, such as documents identified by one or more experts as representing high-quality canning or liquid data 112 and facility data 128. Experts may identify or enter such documents via a graphical user interface or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL), or other datum permitting unambiguous identification of the document, processor 104 may automatically obtain the document using such an identifier, for instance by submitting a request to a database or repository of canning specifications, facility maintenance logs, or production certifications.

With continued reference to FIG. 1, processor 104 identifies mechanical variability 136 based on facility parameters 140 and reference data 144. For the purposes of this disclosure, "reference data" is digital information representing equipment specifications, environmental baselines, and process performance thresholds against which actual operational data are compared to detect deviation or variability. Reference data 144 may function as a computational benchmark that enables processor 104 to identify, quantify, and classify differences between facility data 128 and idealized or historical performance conditions. In some embodiments, processor 104 may store reference data 144 in memory as a structured dataset organized by equipment type, operational category, and measurement domain. Each record within reference data 144 may correspond to a normative value or range describing expected operating conditions of a given mechanical system. For example, and without limitation, reference data 144 may include expected seaming pressure values, nitrogen dosing accuracy ranges, purge gas purity thresholds, or temperature control gradients associated with ideal canning performance. Processor 104 may use these reference benchmarks as ground truth values when analyzing facility data 128 to determine whether observed parameters deviate beyond acceptable tolerance limits.

With continued reference to FIG. 1, in some embodiments, processor 104 may receive reference data 144 from multiple sources, including manufacturer documentation, calibration reports, prior production analytics, or curated knowledge bases derived from empirical testing. Processor 104 may validate received reference data 144 through statistical analysis or cross-correlation with verified datasets to ensure data reliability. Once validated, processor 104 may index reference data 144 to facilitate efficient retrieval during mechanical variability computation and compatibility scoring. As a non-limiting example, reference data 144 may include a record specifying that optimal seaming pressure for a particular can geometry ranges from 40 to 60 pounds per square inch, with a deviation tolerance of ±5 psi. If facility parameter 140 indicates a measured pressure of 68 psi, processor 104 may compute a positive deviation of 8 psi, flagging that component as mechanically variant. Similarly, reference data 144 may store acceptable nitrogen dosing dispersion rates or filler head alignment tolerances. Processor 104 may use these records to quantify how far a given facility deviates from target mechanical behavior.

With continued reference to FIG. 1, in certain embodiments, processor 104 may generate reference data 144 automatically using learned models trained on historical production outcomes. Processor 104 may employ a supervised learning model configured to correlate facility parameters 140 and liquid parameters 116 with achieved product stability outcomes such as dissolved oxygen concentration, shelf life, or oxidation rate. During training, processor 104 may supply the model with labeled input-output pairs, for instance, facility data 128 and corresponding liquid stability scores. The trained model may output predicted optimal process settings, which processor 104 then stores as reference data 144. In this way, reference data 144 may evolve dynamically as the system ingests new operational and product quality data.

With continued reference to FIG. 1, in some embodiments, processor 104 may maintain multiple tiers of reference data 144 to account for variability across facility types, liquid formulations, or environmental conditions. Processor 104 may store global reference data 144 applicable across all sites and local reference data 144 tailored to individual facilities. Processor 104 may automatically select the appropriate tier during comparison based on metadata associated with received facility data 128, such as facility location, canning line configuration, or production temperature profile. As a non-limiting example, and without limitation, processor 104 may maintain reference data 144 for three different can sizes (250 mL, 355 mL, and 500 mL). When processor 104 receives facility data 128 indicating a 355 mL line, it may select only those reference records corresponding to that volume class to compute mechanical variability 136 accurately. Processor 104 may further incorporate temporal weighting, giving more recent reference data 144 higher influence during compatibility computation to reflect evolving process standards.

With continued reference to FIG. 1, in some cases, processor 104 may refine reference data 144 using unsupervised learning techniques. For example, and without limitation, processor 104 may apply a clustering algorithm to historical datasets of mechanical readings to identify naturally occurring performance clusters that represent stable operation modes. Processor 104 may extract cluster centroids from these groupings and store them as updated reference data 144. This enables adaptive recalibration of benchmarks as production environments or equipment conditions evolve over time. In certain embodiments, processor 104 may use reference data 144 as a diagnostic guide during adjustment profile generation. When processor 104 detects that a facility parameter 140 deviates significantly from corresponding reference data 144, it may determine whether the deviation is correctable through liquid parameter 116 adjustment or requires facility adjustment. For example, and without limitation, if reference data 144 indicates that optimal purge gas purity is 99.5%, and facility data 128 reports 97.0%, processor 104 may first attempt to adjust liquid chemistry by altering dissolved oxygen targets. If that adjustment exceeds acceptable formulation boundaries, processor 104 may instead recommend facility-level correction to restore gas system purity.

With continued reference to FIG. 1, for the purposes of this disclosure, "mechanical variability" is deviation of one or more mechanical or operational characteristics of a facility relative to reference mechanical performance specifications. Mechanical variability 136 may be computed by processor 104 as a differential, distance, or correlation metric between facility parameter 140 values contained in facility data 128 and corresponding facility parameter values contained in reference data 144. As a non-limiting example, processor 104 may determine mechanical variability 136 by comparing filler-head alignment deviation, purge-gas efficiency, nitrogen-dosing accuracy, thermal-control stability, or seaming-pressure uniformity of a current facility against benchmark or reference facilities stored in memory. Processor 104 may represent mechanical variability 136 as a multidimensional feature vector, wherein each dimension corresponds to a deviation magnitude between an evaluated facility parameter and an average, median, or normalized reference parameter derived from reference data 144. Processor 104 may compute such deviation using one or more statistical distance measures including, without limitation, Euclidean distance, cosine similarity, Mahalanobis distance, or correlation-based metrics. In some embodiments, processor 104 may further weight each deviation by the corresponding parameter's influence on liquid stability as determined from interaction profile 146. By modeling mechanical variability 136 as a relative deviation between facility data 128 and reference data 144 rather than as an isolated internal fluctuation, processor 104 enables compatibility score 124 and adjustment profile 148 to capture cross-facility mechanical heterogeneity, thereby predicting and compensating for site-specific operational differences affecting liquid packaging stability.

With continued reference to FIG. 1, processor 104 may identify mechanical variability 136 by performing comparative and analytical computations between facility data 128 and reference data 144. Facility data 128 may include real-time or historical measurements collected from a specific facility, while reference data 144 may include corresponding operational records or benchmark values derived from a plurality of previously evaluated or certified facilities. Processor 104 may first normalize facility parameter 140 values in facility data 128 to remove scale differences and ensure comparability with reference parameters. Normalization may include, without limitation, z-score normalization, min-max scaling, or percentile ranking relative to reference facility distributions. After normalization, processor 104 may compute differential feature vectors representing mechanical deviation between facility and reference conditions. Each feature vector may correspond to a specific mechanical or operational subsystem, such as a filling assembly, dosing system, seaming unit, or purge-gas module, and may contain multiple components representing deviation magnitudes for individual parameters. For example, and without limitation, a filler-head subsystem vector may include components representing deviations in alignment precision (e.g., measured in millimeters), flow-rate uniformity (e.g., liters per minute), and vibration frequency (e.g., hertz). Processor 104 may compute each deviation component as a numerical difference, ratio, or correlation value between the facility parameter and a baseline reference parameter. Processor 104 may aggregate these deviation values into an overall mechanical variability vector representing the facility's mechanical signature. Processor 104 may further compute a global mechanical variability index (MVI) as a scalar measure derived from the vector using a statistical or machine-learning method such as principal component analysis (PCA), support vector regression, or weighted summation based on learned feature importance. In some embodiments, processor 104 may employ unsupervised learning methods, such as k-means clustering or Gaussian mixture modeling, to categorize facilities into variability classes (e.g., "stable," "moderately variable," or "highly variable") based on mechanical deviation patterns. These classes may then be used to generate feature embeddings that quantify similarity or dissimilarity between facilities. In other embodiments, processor 104 may compute time-dependent variability by analyzing mechanical sensor logs, identifying drift trends, or estimating mean-time-to-deviation (MTTD) for each subsystem. This temporal analysis may involve autocorrelation modeling or spectral density analysis of sensor signals to identify periodic instability patterns.

With continued reference to FIG. 1, processor 104 may identify mechanical variability 136 by computing deviations between facility parameters 140 contained in facility data 128 and corresponding facility parameters contained in reference data 144. In some cases, identifying at least a mechanical variability 136 may include generating one or more deviation vectors representing a difference between one or more facility parameters 140 and corresponding facility parameters contained in reference data 144 and aggregating the one or more deviation vectors into a mechanical variability index. Processor 104 may first align facility data 128 and reference data 144 using a parameter matching process that associates equivalent metrics such as filler head alignment, purge gas efficiency, nitrogen dosing accuracy, or seaming pressure across data sources. Once aligned, processor 104 may compute a deviation vector for each matched parameter pair, where each deviation vector represents the magnitude and direction of difference between facility operation and a reference baseline. Each element of the deviation vector may correspond to a normalized quantitative variation, such as millimeter displacement, pressure deviation in psi, or gas flow rate difference in standard cubic centimeters per minute (sccm). Processor 104 may then aggregate these deviation vectors into a mechanical variability index that reflects the cumulative operational variability of the facility. Aggregation may be performed using mathematical operations such as vector summation, weighted averaging, or principal component analysis to capture both individual deviations and cross-parameter interactions. In some embodiments, processor 104 may assign different weights to each deviation based on the relative impact of that facility parameter on liquid quality, as determined by prior correlation analysis or learned model coefficients. For example, and without limitation, deviation in filler head alignment may be given a higher weight than purge gas efficiency if empirical data indicate greater influence on oxygen ingress. In certain embodiments, processor 104 may implement an error threshold filter to exclude minor fluctuations within acceptable tolerance ranges before computing the mechanical variability index. Processor 104 may store both raw deviation vectors and the aggregated index in memory, enabling comparison across multiple facilities and temporal tracking of equipment performance. This computational process transforms heterogeneous operational data into a unified quantitative metric that characterizes mechanical stability and supports downstream predictive functions such as compatibility scoring and adjustment profile generation.

With continued reference to FIG. 1, for the purposes of this disclosure, a "deviation vector" is a multidimensional numerical representation that quantifies the difference between one or more facility parameters and corresponding facility parameters from a reference dataset. Each component of a deviation vector corresponds to a specific facility parameter, such as filler head alignment, purge gas efficiency, nitrogen dosing accuracy, or seaming pressure, and encodes the magnitude and direction of deviation between the operational value of that parameter at a given facility and its reference or target value. As a non-limiting example, when a facility's nitrogen dosing accuracy deviates by +3% from the reference mean of 0.5% dosing variability, processor 104 may assign a positive scalar value to that dimension of the deviation vector, indicating the extent of deviation in a quantifiable manner. These deviation vectors enable processor 104 to represent and analyze multidimensional mechanical performance data in a structured mathematical form, allowing computational models to compare, cluster, and rank variability across facilities or equipment systems.

With continued reference to FIG. 1, for the purposes of this disclosure, "corresponding facility parameters" are equivalent operational or mechanical parameters stored within reference data that serve as baseline values for comparative analysis. Each facility parameter in facility data 128 has a corresponding facility parameter in reference data 144 representing standardized or expected operating conditions, such as nominal seaming torque, calibrated purge pressure, or optimal fill head tolerance. In some embodiments, processor 104 may retrieve corresponding facility parameters from reference data 144 that has been derived from historical production records, manufacturer calibration settings, or validated benchmark facilities. By aligning each facility parameter with its corresponding reference parameter, processor 104 ensures that the resulting deviation vectors accurately reflect the degree of mechanical divergence rather than random measurement variation.

With continued reference to FIG. 1, for the purposes of this disclosure, a "mechanical variability index" is an aggregated quantitative metric representing the overall operational inconsistency or variability of a facility relative to reference data. In some embodiments, processor 104 may compute the mechanical variability index by aggregating multiple deviation vectors using mathematical techniques such as weighted averaging, Euclidean norm computation, or principal component projection. The weighting factors may be derived from the relative importance of each parameter to beverage stability as determined by interaction profile 146. For example, and without limitation, if filler head alignment has a higher influence on dissolved oxygen retention than purge gas efficiency, processor 104 may assign a greater weight to that parameter in the mechanical variability index calculation. The mechanical variability index may be stored as a normalized score, allowing comparative ranking of facilities regardless of their absolute scale of operation. As a non-limiting example, processor 104 may calculate deviation vectors indicating the following differences: a 1.2 mm misalignment in filler head position, a 4% reduction in purge gas efficiency, and a 6 psi variance in seaming pressure. Processor 104 may then compute the mechanical variability index as the square root of the sum of the squares of these normalized deviations, resulting in an index value such as 0.73. This index serves as a unified measure of how far a facility's mechanical behavior diverges from ideal reference performance. In some embodiments, the mechanical variability index may directly influence subsequent calculations, including compatibility score 124 and adjustment profile 148, thereby linking mechanical inconsistency quantification to predictive adaptation and quality assurance processes.

With continued reference to FIG. 1, processor 104 determines interaction profile 146 between the one or more liquid parameters 116 and the one or more facility parameters 140. For the purposes of this disclosure, "interaction profile" is a computational representation of predicted influence relationships between liquid parameters and facility parameters. In some cases, interaction profile 146 may include a mathematical construct generated by processor 104 that encodes correlations, sensitivities, and predictive behaviors between liquid parameters 116 and facility parameters 140 to forecast resulting liquid stability or packaging quality.

With continued reference to FIG. 1, in some embodiments, processor 104 may be configured to determine interaction profile 146 by processing liquid data 112 and facility data 128 simultaneously. Processor 104 may retrieve liquid parameter 116 values, such as dissolved oxygen targets, sulfur levels, or temperature tolerances, and compare them with facility parameter 140 values, such as filler head precision, purge gas flow rate, and nitrogen dosing variance. Processor 104 may normalize both sets of parameters into a shared analytical domain to ensure that interactions are measurable using compatible units and scales. In some embodiments, processor 104 may compute interaction profile 146 using one or more predictive models that infer non-linear relationships between liquid and facility parameters. As a non-limiting example, processor 104 may employ a supervised learning model trained on historical datasets that include labeled outcomes such as measured oxidation rate or pressure retention for specific liquid-facility combinations. During training, processor 104 may supply the model with feature pairs derived from liquid parameter 116 and facility parameter 140 and label them with observed stability scores. The model's learned weights and bias terms may define interaction profile 146, which is then stored in memory for inference on new data.

With continued reference to FIG. 1, processor 104 may optionally use multiple models to derive interaction profile 146 depending on data complexity. For linear or monotonic relationships, processor 104 may employ multivariate regression or correlation-matrix-based algorithms to capture proportional dependencies. For highly non-linear, multivariate effects, such as how filler head turbulence interacts with dissolved oxygen retention, processor 104 may employ a deep learning model with multiple hidden layers that learn high-order feature interactions. The output from these models collectively forms interaction profile 146, which encodes predictive patterns across liquid-facility conditions. As a non-limiting example, processor 104 may detect that a liquid formulation with low free sulfur is highly sensitive to filler misalignment beyond 1.5 mm, resulting in elevated oxidation probability. Processor 104 may represent this sensitivity within interaction profile 146 as a response function indicating how incremental changes in filler precision alter liquid oxygen uptake. Similarly, processor 104 may encode that a liquid with high carbonation tolerance exhibits minimal sensitivity to purge gas variability, representing this as a flattened response curve. By storing these relational mappings, processor 104 enables predictive compatibility assessment without re-running physical trials.

With continued reference to FIG. 1, in some embodiments, determining interaction profile 146 may include using a plurality of interaction machine-learning models 152, wherein the plurality of interaction machine-learning models 152 may include a multivariate regression model configured to capture a proportional dependency between one or more liquid parameters 116 and one or more facility parameters 140 and a deep learning model including multiple hidden layers configured to determine a non-linear multivariate feature interaction between the one or more liquid parameters 116 and the one or more facility parameters 140. For the purposes of this disclosure, an "interaction machine-learning model" is a computational model that is trained to detect, quantify, and predict statistical relationships between two or more variables including liquid parameters and facility parameters. The interaction machine-learning model may be designed to determine how variations in one set of parameters influence another, thereby generating predictive relationships that can be used to form interaction profile 146. As a non-limiting example, interaction machine-learning models 152 may be configured to receive as input liquid data 112 and facility data 128, each represented as feature vectors containing numerical or categorical variables corresponding to measurable process characteristics. Processor 104 may execute the interaction machine-learning models 152 to evaluate correlations, dependencies, and sensitivities between the inputs, and to generate an output interaction mapping that quantifies how changes in facility conditions affect liquid chemistry stability metrics such as oxygen retention, carbonation consistency, or pressure resilience.

With continued reference to FIG. 1, for the purposes of this disclosure, a "multivariate regression model" is a machine-learning model that represents the statistical relationship between multiple independent variables and one or more dependent variables using a linear function. The model determines how simultaneous changes in several input features (For example, and without limitation, filler head alignment, purge gas efficiency, and seaming pressure) proportionally influence a target output variable (For example, and without limitation, dissolved oxygen concentration in the finished liquid). For the purposes of this disclosure, a "proportional dependency" is a mathematical relationship in which a change in one or more input variables causes a directly proportional or monotonic change in one or more output variables. Proportional dependency expresses consistent directional influence, meaning that an increase or decrease in a facility parameter results in a predictable increase or decrease in a liquid parameter within a linear or near-linear range. As a non-limiting example, processor 104 may identify that an increase in filler head pressure proportionally increases the internal can pressure, or that improved purge gas efficiency proportionally reduces dissolved oxygen levels. These proportional dependencies may be represented in the multivariate regression model as regression coefficients, each corresponding to a measure of influence or sensitivity between an input and an output parameter. For the purposes of this disclosure, a "deep learning model" is a non-linear machine-learning model that includes multiple hidden layers configured to process complex, multidimensional data and identify higher-order interactions between variables. The deep learning model may be trained to learn mappings from liquid parameters 116 and facility parameters 140 to predicted liquid stability outcomes without being explicitly programmed with equations describing those relationships. For the purposes of this disclosure, a "non-linear multivariate feature interaction" is a complex dependency between multiple input variables where the combined effect of those inputs on an output variable is not a simple linear sum of individual effects. Non-linear multivariate feature interactions occur when changes in multiple parameters jointly influence the output in a non-additive or exponential manner. As a non-limiting example, processor 104 may determine that filler head turbulence, purge gas efficiency, and nitrogen dosing accuracy jointly influence oxygen ingress levels in a manner that cannot be captured by linear regression. Small deviations in any single variable may not affect the outcome, but combined deviations may cause a large, non-proportional increase in dissolved oxygen. Deep learning model may be configured to represent these effects by adjusting weighted connections between hidden layers during training until the output predictions best approximate observed outcomes.

With continued reference to FIG. 1, in some embodiments, determining interaction profile 146 may include using a plurality of interaction machine-learning models 152, wherein the plurality of interaction machine-learning models 152 may include a multivariate regression model configured to capture proportional dependencies between one or more liquid parameters 116 and one or more facility parameters 140, and a deep learning model including multiple hidden layers configured to determine non-linear multivariate feature interactions between the one or more liquid parameters 116 and the one or more facility parameters 140. Processor 104 may execute the plurality of interaction machine-learning models 152 sequentially or concurrently, with outputs combined or weighted to produce interaction profile 146. Interaction profile 146 may encode learned mappings of both proportional dependencies and non-linear feature interactions, thereby enabling predictive adaptation of liquid chemistry and packaging conditions without requiring physical testing at each facility.

With continued reference to FIG. 1, in some embodiments, processor 104 may continuously refine interaction profile 146 using reinforcement learning techniques. Processor 104 may monitor production feedback, including measured oxygen levels, pressure retention, and sensory stability outcomes, after packaging operations. Processor 104 may then compare these real-world results to predictions generated from interaction profile 146. When deviations exceed a confidence threshold, processor 104 may adjust the model parameters to minimize prediction error, effectively retraining the interaction mapping over time. This adaptive refinement ensures that interaction profile 146 remains accurate as new formulations, materials, or equipment conditions evolve. In certain embodiments, processor 104 may represent interaction profile 146 as a multidimensional matrix in memory. Each axis of the matrix may correspond to a liquid parameter 116 or facility parameter 140, and each cell may contain a predicted outcome or compatibility likelihood. Processor 104 may perform matrix operations, such as eigenvalue decomposition or gradient descent optimization, to identify the most influential cross-parameter interactions. As a non-limiting example, processor 104 may determine that nitrogen dosing accuracy (facility parameter 140) and dissolved oxygen tolerance (liquid parameter 116) have the highest mutual influence coefficient. This finding, stored within interaction profile 146, allows processor 104 to prioritize corrective actions related to dosing calibration before altering liquid chemistry. If interaction profile 146 later indicates a change in influence hierarchy, e.g., due to equipment upgrades, processor 104 may automatically update the decision logic used during compatibility scoring and adjustment profile generation.

With continued reference to FIG. 1, processor 104 may employ probabilistic modeling within interaction profile 146 to account for uncertainty in sensor readings or environmental variation. Processor 104 may assign confidence intervals to each interaction coefficient, reflecting the reliability of predictions under varying conditions. These probabilistic representations allow processor 104 to generate compatibility scores with quantifiable confidence levels, providing a more robust technical output for decision-making. In some embodiments, processor 104 may share interaction profile 146 with other computational subsystems responsible for compatibility scoring or adjustment recommendation. Processor 104 may provide the interaction profile 146 as an intermediate output that informs subsequent operations, such as generating compatibility score 124 or adjustment profile 148. The structured, machine-readable format of interaction profile 146 allows downstream algorithms to utilize it as a consistent, dynamic foundation for predictive adaptation processes.

With continued reference to FIG. 1, processor 104 generates compatibility score 124 as a function of interaction profile 146. For the purposes of this disclosure, "compatibility score" is a value that expresses a predicted degree of alignment between one or more liquid parameters and one or more facility parameters as determined through an analysis of interaction profile. Compatibility score 124 may numerically represent how closely a liquid formulation's chemical and physical tolerances correspond to the operational capabilities of a given facility. Compatibility score 124 may be represented in numerical form, alphabetic characters, alphanumeric codes, or symbolic labels, depending on system configuration and output formatting. In some embodiments, processor 104 may express compatibility score 124 as a numeric value normalized to a scale such as 0 to 1 or 0 to 100, where higher values indicate higher predicted compatibility. In other embodiments, processor 104 may represent compatibility score 124 as a character-based label selected from predefined categories. For example, and without limitation, processor 104 may assign characters such as "A," "B," "C," and "D" to represent graded compatibility levels, where "A" corresponds to high compatibility and "D" corresponds to low compatibility. As a non-limiting example, processor 104 may generate compatibility score 124="A" when predicted dissolved oxygen, pressure, and corrosion parameters are within reference thresholds across all facility conditions. If oxygen uptake or pressure deviation exceeds acceptable tolerance, processor 104 may assign a lower categorical rating such as "C." In some embodiments, processor 104 may also use alphanumeric or symbolic formats for compatibility score 124 to express multi-dimensional compatibility evaluations. For example, and without limitation, processor 104 may produce a score such as "B2" or "A−" to encode both quantitative and categorical information. Alternatively, processor 104 may display icons or color-coded markers on graphical user interface 156 to visually communicate compatibility score 124 to an operator.

With continued reference to FIG. 1, in some embodiments, processor 104 may be configured to generate compatibility score 124 by applying a predictive computation that integrates data derived from liquid data 112, facility data 128, and interaction profile 146. As a non-limiting example, processor 104 may extract numerical feature vectors representing liquid parameter 116 (e.g., sulfur concentration threshold, dissolved oxygen tolerance, or carbonation pressure) and facility parameter 140 (e.g., seaming pressure, filler-head alignment, or purge-gas efficiency). Processor 104 may then process these feature vectors through an evaluation model that computes a scalar value normalized between 0 and 1, where higher values indicate greater compatibility and lower values indicate a higher risk of instability or failure.

With continued reference to FIG. 1, processor 104 may generate compatibility score 124 using a trained neural network or gradient-boosted regression model. In some cases, generating compatibility score 124 may include using a compatibility machine-learning model 160, wherein the compatibility machine-learning model 160 may include a neural network model that has been trained using labeled data including exemplary liquid parameters and exemplary facility parameters correlated to exemplary compatibility scores. During training, processor 104 may provide labeled data that includes liquid and facility pairings with observed outcomes. Each record in the training dataset may include liquid parameter 116, facility parameter 140, and an associated target score representing measured stability success, such as retention of sulfur compounds after three months or absence of corrosion within warranty period. Processor 104 may train the model to minimize prediction error between generated compatibility score 124 and the known target score, thereby ensuring accurate mapping between process inputs and observed outcomes. Processor 104 may learn that such conditions yield a compatibility score 124 of approximately 0.65, reflecting marginal suitability. When a new dataset produces similar conditions, processor 104 may infer a similar score, enabling predictive stability assessment without physical testing.

With continued reference to FIG. 1, for the purposes of this disclosure, a "compatibility machine-learning model" is a trained computational model that maps liquid parameters and facility parameters to a predicted compatibility score that represents a likelihood of achieving a stable packaging outcome under specified process conditions. For the purposes of this disclosure, "labeled data" is a dataset in which input records contain identified liquid parameters and facility parameters paired with a target compatibility score that indicates an observed or validated stability outcome for those inputs. For the purposes of this disclosure, "compatibility training data" is a curated dataset used to train a compatibility machine-learning model to predict the relationship between liquid parameters and facility parameters under varying manufacturing conditions. The training data may be derived from multiple sources, including historical production logs, sensor readings from canning lines, laboratory test results, and post-packaging quality assessments collected across multiple facilities. Each record in the dataset may include input variables such as filler head alignment, nitrogen dosing pressure, purge gas efficiency, dissolved oxygen levels, $CO_2$ retention, and corresponding beverage outcomes, such as oxidation rate, seam integrity, and flavor stability. The dataset may also incorporate reference data obtained from validated facilities with known performance metrics, serving as benchmark examples for successful and unsuccessful packaging events. During model development, these labeled examples, correlating specific combinations of beverage and facility parameters with measured stability outcomes, enable the model to learn predictive mappings that form the basis of the compatibility score. By continuously updating this dataset with feedback from ongoing operations, the compatibility training data allows the system to improve prediction accuracy and adapt to evolving process variability across different production environments. For the purposes of this disclosure, a "neural network model" is a machine-learning architecture comprising interconnected computational layers that compute non-linear transformations on input features to approximate a function from liquid parameters and facility parameters to a compatibility score.

With continued reference to FIG. 1, in some embodiments, generating compatibility score 124 may include using compatibility machine-learning model 160 that is instantiated as a neural network model trained on labeled data. As a non-limiting example, the labeled data may include exemplary liquid parameters 116 (e.g., dissolved oxygen concentration, free sulfur dioxide, carbon dioxide level, filling level, can material, storing position) and exemplary facility parameters 140 (e.g., filler head alignment, purge gas efficiency, nitrogen dosing accuracy, seaming pressure, thermal control stability) paired with exemplary compatibility scores 124 derived from historical packaging outcomes.

With continued reference to FIG. 1, in some embodiments, processor 104 may prepare the labeled data by normalizing numerical features, encoding categorical features, and partitioning records into training, validation, and test subsets to prevent overfitting. Processor 104 may then train the neural network portion of compatibility machine-learning model 160 by minimizing a loss function that measures deviation between predicted compatibility score 124 and the target compatibility score included in the labeled data. As a non-limiting example, processor 104 may employ gradient-based optimization with backpropagation across multiple epochs until validation loss converges within a tolerance.

With continued reference to FIG. 1, in some embodiments, compatibility machine-learning model 160 may output either a scalar compatibility score 124 or a vector of sub-scores (e.g., oxidation, corrosion, carbonation, seam integrity), and processor 104 may aggregate any sub-scores into an overall compatibility score 124 using a weighting function tuned on the labeled data. Processor 104 may further record prediction uncertainty or confidence associated with the compatibility score 124 based on calibration performed on the validation subset of the labeled data.

With continued reference to FIG. 1, in some embodiments, processor 104 may align the training distribution of labeled data with operating conditions by sampling records across a range of liquid parameters 116 and facility parameters 140, including edge cases such as high dissolved oxygen, low purge efficiency, or atypical can materials. This curation enables compatibility machine-learning model 160 to generalize to new facilities or formulations and to infer compatibility score 124 for unseen but related combinations without conducting physical packaging trials.

With continued reference to FIG. 1, in some embodiments, processor 104 may couple compatibility machine-learning model 160 with interaction profile 146 by supplying feature-importance or sensitivity attributions computed from the neural network model, thereby identifying which liquid parameters 116 or facility parameters 140 most strongly influence compatibility score 124 for a particular input. Processor 104 may then utilize these attributions downstream to guide adjustment profile 148 generation, either toward adjusted liquid parameter 164 within parameter range 120 or toward adjusted facility parameter 168 when chemical limits would otherwise be exceeded.

With continued reference to FIG. 1, in some embodiments, processor 104 may periodically update compatibility machine-learning model 160 using newly accrued labeled data sourced from post-packaging measurements and stability audits. Processor 104 may detect performance drift between predicted and realized compatibility score 124 and trigger incremental retraining to restore predictive accuracy, thereby maintaining alignment between model behavior and evolving liquid formulations, can materials, and facility conditions.

With continued reference to FIG. 1, in some embodiments, processor 104 may dynamically adjust the weighting assigned to liquid parameter 116 and facility parameter 140 when computing compatibility score 124. For example, and without limitation, if interaction profile 146 indicates that filler-head alignment exerts greater influence on dissolved oxygen retention than nitrogen dosing variance, processor 104 may automatically assign higher model weight to that mechanical factor. This adaptive weighting mechanism ensures that compatibility score 124 reflects the most critical dependencies within the system. In certain embodiments, processor 104 may also compute compatibility score 124 as a vector rather than a single scalar, where each element corresponds to a sub-score for different stability dimensions such as oxidation, corrosion, carbonation, or seam integrity. Processor 104 may aggregate these sub-scores using a weighted averaging function to generate the overall compatibility score 124. This approach allows the apparatus to capture nuanced relationships between specific liquid properties and mechanical constraints, yielding a multi-dimensional understanding of compatibility.

With continued reference to FIG. 1, processor 104 may normalize compatibility score 124 relative to reference data 144 to maintain cross-facility consistency. For example, and without limitation, a compatibility score 124 of 0.80 may represent a strong match at one facility but only moderate compatibility at another, depending on local calibration and historical performance baselines. Processor 104 may therefore compute normalized compatibility score 124 by comparing predicted outcomes against historical production data stored as reference data 144, ensuring consistent interpretation of the score across multiple canning lines. As a non-limiting example, processor 104 may determine that for a specific liquid formulation, compatibility score 124=0.92 at Facility A (high compatibility) and 0.54 at Facility B (low compatibility). In response, processor 104 may proceed to generate adjustment profile 148. If the compatibility score 124 falls below a predetermined threshold, such as 0.70, processor 104 may initiate parameter adjustment logic to identify corrective actions either by modifying liquid chemistry or by adjusting facility settings.

With continued reference to FIG. 1, processor 104 may continuously refine compatibility score 124 using feedback from post-production monitoring data. After each canning operation, processor 104 may compare predicted outcomes against measured results. When discrepancies are detected, such as a liquid predicted to be stable exhibiting unexpected oxidation, processor 104 may update the predictive model that produces compatibility score 124 through reinforcement learning, adjusting weights associated with specific input features to improve predictive precision over time. In some embodiments, processor 104 may display compatibility score 124 on a graphical user interface 156 as a visual indicator for production engineers. The graphical user interface 156 may present compatibility score 124 numerically and graphically, such as through color-coded gauges or percentile rankings, to enable rapid assessment of whether a proposed liquid-facility pairing meets operational tolerances.

With continued reference to FIG. 1, processor 104 generates adjustment profile 148 as a function of compatibility score 124 and mechanical variability 136. For the purposes of this disclosure, "adjustment profile" is a computational dataset that defines one or more modifications or recommendations required to improve compatibility between a liquid formulation and a facility. Adjustment profile 148 may provide processor 104 with structured instructions or recommended changes that specify how liquid parameters 116, facility parameters 140, or both should be modified to achieve or exceed a target compatibility threshold.

With continued reference to FIG. 1, generating adjustment profile 148 includes in response to compatibility score 124 being lower than a compatibility threshold 172, generate at least an adjusted liquid parameter 164 as a function of at least a mechanical variability 136. For the purposes of this disclosure, "compatibility threshold" is a reference value representing a minimum acceptable level of compatibility between liquid parameters and facility parameters. Compatibility threshold 172 may be used by processor 104 to evaluate whether compatibility score 124 indicates that the liquid formulation and the facility are sufficiently aligned to produce a stable packaged product. In some embodiments, processor 104 may store compatibility threshold 172 within memory as a static value defined during system calibration. As a non-limiting example, when compatibility score 124 is expressed on a normalized 0-to-1 scale, compatibility threshold 172 may be set at 0.75, meaning that compatibility score 124 equal to or greater than 0.75 represents an acceptable condition. In other embodiments, processor 104 may dynamically calculate compatibility threshold 172 based on historical production data, such as prior canning runs, stored in reference data 144. Processor 104 may identify the lowest compatibility score 124 value that consistently produced defect-free or stable results and use that empirical value as compatibility threshold 172.

With continued reference to FIG. 1, processor 104 may adapt compatibility threshold 172 in real time using a trained machine-learning model that continuously refines the acceptable threshold according to recent facility performance, seasonal temperature variations, or ingredient batch differences. As a non-limiting example, a neural network-based model may receive historical compatibility scores 124 and corresponding product stability metrics as input data and output a refined threshold estimate that maximizes predictive accuracy for future batches. Processor 104 may periodically retrain this model using new data from production logs or laboratory analysis.

With continued reference to FIG. 1, compatibility threshold 172 may be multidimensional, defining multiple target criteria across different compatibility domains. For instance, processor 104 may store separate threshold dimensions for oxygen exposure, seam integrity, and dissolved gas stability. Compatibility threshold 172 may then be represented as a vector {$O_2 \leq 1.2$ ppm, seam pressure ≥58 psi, dissolved gas retention ≥95%}. Processor 104 may compare compatibility score 124 against each dimension to determine if all requirements are met.

With continued reference to FIG. 1, in some embodiments, processor 104 may apply fuzzy logic comparison between compatibility score 124 and compatibility threshold 172. Instead of a strict binary pass/fail evaluation, processor 104 may define a near-threshold region that triggers partial optimization or minor liquid parameter adjustments. For example, and without limitation, if compatibility threshold 172 is 0.75 and compatibility score 124 is 0.73, processor 104 may execute a limited optimization loop, slightly adjusting liquid chemistry, rather than performing a complete recalibration.

With continued reference to FIG. 1, for the purposes of this disclosure, "adjusted liquid parameter" is a recalculated or modified instance of a liquid parameter. Adjusted liquid parameter 164 may represent an optimized configuration value within the permitted liquid-chemistry range that increases predicted compatibility with specific facility conditions. In some embodiments, processor 104 may generate adjusted liquid parameter 164 using an optimization process executed through mathematical modeling or machine-learning inference. Processor 104 may evaluate each liquid parameter 116 to determine which one contributes most significantly to the reduced compatibility score 124, based on gradient sensitivity computed from interaction profile 146. As a non-limiting example, processor 104 may calculate a sensitivity coefficient indicating how strongly each liquid parameter 116 (such as dissolved oxygen, sulfur concentration, or carbonation volume) affects compatibility score 124 and prioritize adjustments accordingly.

With continued reference to FIG. 1, in some cases, generating adjustment profile 148 may include using an adjustment machine-learning model 176 that has been trained with adjustment training data including exemplary liquid parameters and exemplary facility parameters correlated to exemplary adjusted liquid parameters and exemplary adjusted facility parameters. For the purposes of this disclosure, an "adjustment machine-learning model" is a computational model that is configured to generate adjustment profile. The adjustment machine-learning model 176 may be trained using adjustment training data comprising paired examples of liquid parameters 116, facility parameters 140, and corresponding adjusted parameters that historically resulted in improved packaging performance or quality outcomes. In some embodiments, the adjustment machine-learning model 176 may include one or more supervised learning architectures, such as a gradient-boosted regression model, neural network, or hybrid ensemble framework capable of learning multidimensional mappings between input parameters (representing current operational conditions) and output parameters (representing optimal adjustments). During operation, the adjustment machine-learning model 176 may receive as inputs the current liquid parameters 116 and facility parameters 140, along with derived indicators such as compatibility score 124 and mechanical variability index. The model may then output predicted adjustment parameters, which represent the magnitude and direction of modification required for one or more variables to restore the system within a desired compatibility or stability range. These predicted adjustments may include, without limitation, changes to mechanical settings, chemical formulation ratios, or process timing sequences. For instance, and without limitation, if the compatibility score indicates excessive oxygen ingress due to filler head misalignment, the adjustment machine-learning model 176 may output a recommended adjustment parameter of "+0.8 mm filler head alignment correction" or a "+0.5 s increase in purge duration."

For the purposes of this disclosure, "adjustment training data" is a dataset used to train an adjustment machine-learning model to generate optimized recommendations for modifying liquid and facility parameters in response to detected incompatibilities or performance deviations. The adjustment training data may include labeled examples correlating exemplary liquid parameters, such as dissolved oxygen thresholds, sulfur dioxide concentrations, carbonation pressure, and fill level, with exemplary facility parameters, including filler head alignment, purge gas efficiency, nitrogen dosing accuracy, and seaming pressure. Each training record may associate these inputs with corresponding adjusted parameters, representing experimentally validated or historically successful corrective configurations. The source of the adjustment training data may include both empirical and simulated data collected from production trials, sensor-based facility monitoring, laboratory analysis of packaging outcomes, and domain-specific knowledge derived from process engineers and quality assurance experts. For example, ad without limitation, production data showing that increasing nitrogen dosing pressure by a defined increment (e.g., +5 psi) reduces oxygen ingress for a low-sulfur formulation may be encoded as a positive adjustment instance. Similarly, data from reference facilities demonstrating improved seam integrity after recalibration of seaming pressure can serve as another labeled training record. In some embodiments, the adjustment training data may also include feedback from real-time operational outcomes, such as stability improvements, reduced oxidation rates, or extended shelf-life metrics, allowing the adjustment machine-learning model to self-optimize through reinforcement learning. By leveraging these structured datasets, the system can dynamically generate adjustment profiles that specify tailored modifications to beverage chemistry and facility operation, thereby achieving consistent packaging performance across variable manufacturing conditions.

With continued reference to FIG. 1, processor 104 may apply an optimization algorithm (e.g., adjustment machine-learning model 176) such as stochastic gradient descent or Bayesian optimization to identify new parameter values that maximize compatibility score 124 while maintaining liquid integrity. Processor 104 may define an objective function of the form maximize f(p)=compatibility score 124 subject to parameter range constraints, where "p" represents the set of liquid parameters 116. The optimization may iterate over successive parameter combinations until adjusted liquid parameter 164 yields compatibility score 124≥compatibility threshold 172. As a non-limiting example, if compatibility score 124=0.61 for a wine product with dissolved oxygen=1.9 ppm and sulfur=35 ppm, processor 104 may simulate adjusted liquid parameter 164 scenarios by incrementally reducing oxygen and increasing sulfur within their allowable limits. Processor 104 may determine that oxygen=1.3 ppm and sulfur=40 ppm result in compatibility score 124=0.81. These new values may be stored in adjustment profile 148 as adjusted liquid parameters 164.

With continued reference to FIG. 1, in some embodiments, processor 104 may generate adjusted liquid parameter 164 through predictive modeling using a trained regression model (e.g., adjustment machine-learning model 176). The regression model may accept liquid parameter 116, facility parameter 140, and mechanical variability 136 as input features and output predicted adjusted liquid parameter 164. The model may be trained using supervised learning on historical datasets that contain prior liquid configurations and their resulting packaging outcomes. Training data may include examples such as {oxygen=2.0 ppm, purge efficiency=94%, outcome=unstable} and {oxygen=1.3 ppm, purge efficiency=97%, outcome=stable}. Through this learning process, processor 104 may establish functional relationships between liquid chemistry and facility performance, enabling it to infer appropriate adjusted liquid parameter 164 for future conditions.

With continued reference to FIG. 1, processor 104 may validate adjusted liquid parameter 164 by recomputing interaction profile 146 using the newly adjusted values and re-evaluating compatibility score 124. If the recalculated compatibility score 124 remains below compatibility threshold 172, processor 104 may initiate a secondary adjustment loop that modifies secondary liquid attributes (e.g., pH or carbonation) until the desired compatibility level is reached. Processor 104 may also compare each adjusted liquid parameter 164 against stored reference limits in liquid data 112 to ensure that adjustments remain within safe and regulatory-approved ranges. As a non-limiting example, processor 104 may find that decreasing oxygen below 1.0 ppm marginally improves compatibility but violates liquid data 112 constraints related to flavor retention. In such case, processor 104 may cap adjusted liquid parameter 164 at 1.2 ppm and proceed to suggest facility parameter adjustments instead, linking this output with adjusted facility parameter 168 generation in adjustment profile 148.

With continued reference to FIG. 1, adjusted liquid parameter 164 may include multiple dimensions corresponding to chemical, thermal, and physical liquid properties. Processor 104 may calculate adjusted temperature, fill volume, carbonation level, and additive concentrations simultaneously to produce a multi-dimensional solution vector. Processor 104 may then evaluate this vector through the predictive model to ensure that no cross-parameter interactions reduce overall compatibility.

With continued reference to FIG. 1, generating adjustment profile 148 includes in response to at least an adjusted liquid parameter 164 exceeding parameter range 120, generate at least an adjusted facility parameter 168 as a function of one or more liquid parameters 116. For the purposes of this disclosure, "parameter range" is a bounded interval of acceptable values associated with a liquid parameter that defines permissible variation limits ensuring that liquid formulation quality, stability, and regulatory compliance are maintained. Parameter range 120 may represent the upper and lower quantitative boundaries within which a liquid parameter 116 may be modified by processor 104 without degrading the liquid's intended performance or sensory properties.

With continued reference to FIG. 1, in some embodiments, processor 104 may retrieve parameter range 120 from liquid data 112 stored in memory. As a non-limiting example, parameter range 120 may include one or more numerical ranges defining acceptable thresholds for free sulfur dioxide ($FSO_2$), total sulfur dioxide ($TSO_2$), total package oxygen (TPO), and carbon dioxide ($CO_2$) concentrations for different liquid formulations. Processor 104 may access these limits when calculating adjusted liquid parameter 164 to ensure that all recommended adjustments remain within acceptable manufacturing boundaries. as a non-limiting example, parameter range 120 may include liquid chemistry limits such as free sulfur dioxide ($FSO_2$) between 19 ppm and 24 ppm, total sulfur dioxide ($TSO_2$)≤120 ppm, total package oxygen (TPO)≤1.2 ppm, and carbon dioxide ($CO_2$) concentration between 1300 ppm and 1500 ppm for a Sauvignon Blanc formulation. Comparable limits may be defined for other varietals, such as Rosé (19-24 ppm $FSO_2$, 800-900 ppm $CO_2$), Malbec (24-29 ppm $FSO_2$, $CO_2$=400 ppm), and Pinot Grigio (19-24 ppm $FSO_2$, 1450-1650 ppm $CO_2$). As a non-limiting example, for Sauvignon Blanc formulations, processor 104 may reference parameter range 120 defining $FSO_2$ between 19 ppm and 24 ppm, $TSO_2$≤120 ppm, TPO≤1.2 ppm, and $CO_2$ between 1300 ppm and 1500 ppm. As a non-limiting example, for Rosé formulations, processor 104 may apply parameter range 120 defining $FSO_2$ between 19 ppm and 24 ppm, $TSO_2$≤120 ppm, TPO≤1.2 ppm, and $CO_2$ between 800 ppm and 900 ppm. As a non-limiting example, for Malbec formulations, processor 104 may reference parameter range 120 defining $FSO_2$ between 24 ppm and 29 ppm, $TSO_2$≤120 ppm, TPO≤1.2 ppm, and $CO_2$ fixed at 400 ppm. As a non-limiting example, for Pinot Grigio formulations, processor 104 may reference parameter range 120 defining $FSO_2$ between 19 ppm and 24 ppm, $TSO_2$≤120 ppm, TPO≤1.2 ppm, and $CO_2$ between 1450 ppm and 1650 ppm. As a non-limiting example, parameter range 120 may include liquid chemistry limits such as $FSO_2$ between 19 ppm and 24 ppm, $TSO_2$≤120 ppm, TPO≤1.2 ppm, and $CO_2$ concentration between 1300 ppm and 1500 ppm for a Sauvignon Blanc formulation. Comparable limits may be defined for other varietals, such as Rosé (19-24 ppm $FSO_2$, 800-900 ppm $CO_2$), Malbec (24-29 ppm $FSO_2$, $CO_2$=400 ppm), and Pinot Grigio (19-24 ppm $FSO_2$, 1450-1650 ppm $CO_2$).

With continued reference to FIG. 1, in some cases, parameter range 120 may further include container-supplier safety and process constraints that apply across all liquid types. As a non-limiting example, processor 104 may reference Ball-defined packaging requirements specifying that all newly formulated liquids must be approved for packaging prior to production and that no formulation changes are permitted without re-evaluation. Parameter range 120 may therefore include metadata flags within liquid data 112 indicating "approved for Ball packaging=true" before processor 104 authorizes any adjustment operation. In some cases, parameter range 120 may include compositional purity constraints such as maximum free copper concentration≤0.2 ppm, dissolved oxygen≤1.2 ppm, total oxygen (dissolved plus headspace)≤2.0 ppm, and total package oxygen≤1.2 mg/L. Processor 104 may continuously compare real-time sensor data from the canning line to these limits and generate alerts if oxygen or metal contamination levels exceed the allowed bounds. In some cases, mechanical and thermodynamic parameters may also be incorporated into parameter range 120. In some embodiments, processor 104 may define internal can pressure at 70° F. between 10 psi and 60 psi, with an absolute maximum of 90 psi for standard cans and 70 psi for smaller formats. Processor 104 may further constrain fill volume not to exceed 2 mL above the container's rated capacity and restrict maximum hot-fill temperature to ≤195° F. In addition, processor 104 may ensure that the process-water pH for pasteurized or retorted liquids remains between 6.5 and 8.0. In some cases, parameter range 120 may also incorporate environmental and handling conditions. As a non-limiting example, processor 104 may verify that storage temperature for packaged liquids remains between 32° F. and 100° F., that finished cans are warmed above the dew point prior to labeling unless refrigeration is required, and that secondary packaging exposed to leaks is immediately isolated. Processor 104 may access this operational data through facility data 128 and enforce compliance through automated facility-control recommendations stored within adjustment profile 148.

With continued reference to FIG. 1, in some cases, processor 104 may retrieve parameter range 120 dynamically based on product metadata included in liquid data 112, such as liquid type, origin, or alcohol content. When liquid data 112 identifies a formulation as "Rosé-Pays d'Oc France," processor 104 may automatically apply the corresponding $CO_2$, $FSO_2$, and oxygen ranges listed above. Processor 104 may therefore ensure that the optimization of liquid chemistry through adjusted liquid parameter 164 never exceeds these defined ranges.

With continued reference to FIG. 1, in some embodiments, processor 104 may also include sub-ranges within parameter range 120 for in-line process monitoring. For example, and without limitation, dissolved oxygen concentration in a storage tank prior to canning may have a maximum acceptable limit of 0.5 ppm, while dissolved oxygen measured inline during filling may have a maximum of 0.75 mg/L. Processor 104 may continuously evaluate measured values against these sub-ranges during live production and trigger optimization or corrective actions if any metric approaches a boundary condition.

With continued reference to FIG. 1, processor 104 may utilize parameter range 120 as a constraint when executing optimization algorithms to determine adjusted liquid parameter 164. Parameter range 120 thus acts as a set of permissible boundaries in the multi-dimensional solution space explored by processor 104's optimization engine. In some embodiments, when compatibility score 124 improves as a function of reducing oxygen or increasing sulfur, processor 104 may truncate optimization when parameter range 120 limits are reached, thereby preventing chemically unsafe or off-spec results.

With continued reference to FIG. 1, in some embodiments, parameter range 120 may be expanded or contracted dynamically by processor 104 using adaptive tolerance logic trained on reference data 144. As a non-limiting example, processor 104 may monitor historical production performance and automatically refine parameter range 120 to reflect updated stability observations. If multiple Sauvignon Blanc production runs indicate superior stability when $FSO_2$=23 ppm, processor 104 may narrow parameter range 120 to 21-24 ppm for subsequent batches.

With continued reference to FIG. 1, processor 104 may define multi-variable interdependencies within parameter range 120, ensuring that parameters remain mutually consistent. For example, and without limitation, when total package oxygen approaches its upper boundary (1.2 ppm), processor 104 may adjust the acceptable $CO_2$ range downward by 50 ppm to reduce oxygen absorption risk. This enables parameter range 120 to function not merely as static limits but as a dynamic, contextual constraint set responsive to facility conditions and liquid interactions.

With continued reference to FIG. 1, for the purposes of this disclosure, "adjusted facility parameter" is a modified instance of a facility parameter. In some cases, adjusted facility parameter 168 may be configured to correct or compensate for mechanical, environmental, or operational variabilities identified in facility data 128 that negatively affect compatibility score 124. Adjusted facility parameter 168 may include a configuration setting or physical control variable representing a recalibrated or re-optimized state of the manufacturing equipment designed to enable compliance with parameter range 120 when adjusted liquid parameter 164 alone cannot achieve compatibility.

With continued reference to FIG. 1, in some embodiments, processor 104 may determine adjusted facility parameter 168 by analyzing relationships (e.g., interaction profile 146) between facility data 128 and liquid parameter 116 extracted from liquid data 112. Processor 104 may compute how specific liquid chemistry variables, such as dissolved oxygen tolerance, carbonation level, or sulfur dioxide concentration, interact with physical filling, purging, or seaming operations. When processor 104 determines that existing facility parameters cannot achieve desired liquid outcomes defined by liquid parameter 116 within parameter range 120, processor 104 may compute adjusted facility parameter 168 that reconfigures facility operations to better accommodate liquid chemistry requirements. As a non-limiting example, when liquid parameter 116 specifies a maximum total package oxygen concentration of 1.2 ppm and facility data 128 indicates suboptimal purge efficiency (e.g., nitrogen flow below 0.8 L/min), processor 104 may calculate adjusted facility parameter 168 recommending an increased nitrogen purge time or pressure. Similarly, when liquid parameter 116 specifies a carbonation concentration of 1500 ppm and facility data 128 reveals inconsistent $CO_2$ retention due to high fill turbulence, processor 104 may generate adjusted facility parameter 168 reducing filler head velocity or modifying alignment to maintain carbonation equilibrium.

With continued reference to FIG. 1, processor 104 may employ a predictive model trained on multi-variable datasets representing liquid chemistry-to-mechanical interaction behavior. For the purposes of this disclosure, training data for adjusted facility parameter 168 is a structured collection of paired liquid and facility variables labeled with measured stability outcomes. As a non-limiting example, each record in this dataset may include {dissolved oxygen tolerance, $CO_2$ range, $FSO_2$ concentration, nitrogen purge rate, fill temperature, seaming torque correlated to stability index}. Processor 104 may train a regression or neural network model using this data to infer optimal facility configurations that preserve liquid chemistry integrity across different canning environments.

With continued reference to FIG. 1, in some embodiments, processor 104 may apply reinforcement learning to continuously improve its determination of adjusted facility parameter 168. The model may observe facility performance feedback, such as internal can pressure or measured total oxygen, and iteratively adjust facility control variables to maximize compatibility score 124. Reward signals may be based on minimizing deviations from liquid parameter 116 while maintaining process safety within limits defined by parameter range 120.

With continued reference to FIG. 1, adjusted facility parameter 168 may include one or more operational changes selected from the group consisting of nitrogen purge timing, purge gas flow rate, filler head pressure, fill temperature, carbonation injection duration, or seaming roller torque. Processor 104 may express adjusted facility parameter 168 as scalar offsets or actuator control profiles depending on the equipment's level of automation. For instance, when liquid parameter 116 includes a $CO_2$ target range of 1300-1500 ppm, processor 104 may generate adjusted facility parameter 168 setting filler tank pressure to 18 psi instead of 20 psi to reduce $CO_2$ loss.

With continued reference to FIG. 1, processor 104 may incorporate the manufacturing safety and product integrity requirements defined in Ball specifications. When liquid parameter 116 specifies a high oxygen sensitivity and facility data 128 indicates excessive fill temperature (above 195° F.), processor 104 may generate adjusted facility parameter 168 reducing product temperature or dwell time to prevent oxygen absorption. Similarly, if liquid parameter 116 specifies a pressure-sensitive profile (e.g., internal pressure below 60 psi at 70° F.), processor 104 may compute adjusted facility parameter 168 decreasing seaming compression force or altering roller geometry.

With continued reference to FIG. 1, processor 104 may validate adjusted facility parameter 168 through digital simulation using reference data 144 containing physical equipment models. The simulation may model thermal dynamics, gas solubility, and turbulence behavior under the proposed facility configuration to verify that liquid parameter 116 remains within its acceptable range. Processor 104 may adjust or reject facility changes if simulated results exceed Ball-defined limits (e.g., fill volume >2 mL above nominal or internal pressure >90 psi).

With continued reference to FIG. 1, adjusted facility parameter 168 may be output by processor 104 as part of adjustment profile 148, which may include corresponding liquid parameter 116, the compatibility score 124 that triggered adjustment, and an indication of compliance with parameter range 120. Processor 104 may cause graphical user interface 156 to display this relationship, for example: "To maintain TPO≤1.2 ppm, increase nitrogen dwell by 0.3 seconds," or "To retain carbonation at 1400 ppm, lower fill head pressure by 2 psi."

With continued reference to FIG. 1, generating adjustment profile 148 may include receiving a facility input, wherein the facility input may include a negative input indicating that a facility is unable to implement at least an adjusted facility parameter 168 and in response to the negative input, generating an alternative recommendation 180 including one or more alternative facilities including compatibility score 124 greater than or equal to compatibility threshold 172. For the purposes of this disclosure, a "facility input" is a digital communication or data signal transmitted from a facility interface to processor 104 that conveys information. As a non-limiting example, facility input may be transmitted from a facility control terminal, supervisory control system, or operator console through graphical user interface 156. Facility input may include parameter acknowledgment data, capability feedback, or constraint indicators specifying whether the facility can implement the adjusted facility parameter 168 recommended by adjustment profile 148. In some embodiments, processor 104 may receive facility input through networked communication protocols or local programmable logic controller (PLC) integration. For the purposes of this disclosure, a "negative input" is a subset of facility input that explicitly indicates an inability, restriction, or refusal by a facility to implement one or more adjusted facility parameters. As a non-limiting example, negative input may be represented as a binary data flag, a categorical code, or a text-based acknowledgment transmitted from the facility interface to processor 104. In some embodiments, processor 104 may interpret negative input through structured data entries such as "unavailable," "cannot implement," or "beyond mechanical tolerance."

With continued reference to FIG. 1, for the purposes of this disclosure, an "alternative recommendation" is an output dataset that identifies one or more facilities, processes, or configurations predicted to achieve compatibility score greater than or equal to compatibility threshold. As a non-limiting example, alternative recommendation 180 may include a ranked list of alternative facilities, corresponding compatibility scores, and adjusted liquid parameter 164 values that maintain liquid quality within acceptable parameter range 120. Processor 104 may generate alternative recommendation 180 using a selection algorithm that references facility data 128 stored in memory, evaluating each facility's operational characteristics such as filler head alignment, purge gas efficiency, and seaming pressure tolerances. For the purposes of this disclosure, an "alternative facility" is a secondary or substitute facility that possesses operational parameters predicted to produce a compatible packaging outcome for a liquid formulation. As a non-limiting example, alternative facility may be a geographically distinct co-packing site or a different production line within the same organization that maintains facility parameters, such as purge gas flow rate, filler precision, or thermal stability, within limits corresponding to a high compatibility score 124. Processor 104 may identify alternative facility as part of alternative recommendation 180 by applying the same predictive modeling algorithm used to generate compatibility score 124 for the initial facility.

With continued reference to FIG. 1, processor 104 may access reference data 144 when the currently evaluated facility transmits a negative input through facility input. Processor 104 may first identify the specific limitation that prevents implementation of the adjusted facility parameter 168, For example, and without limitation, insufficient nitrogen dosing accuracy or suboptimal purge gas efficiency. Once identified, processor 104 may use that limitation as a query condition to search through reference data 144 for records of other facilities that exhibit superior performance or tolerance ranges for the same parameter. As a non-limiting example, if facility data 128 indicates that the current facility's seaming pressure deviates by ±10 psi from the optimal specification, processor 104 may reference stored data for other facilities that demonstrate seaming pressure deviation within ±2 psi. Reference data 144 may include additional metadata such as can size, filler model, or ambient temperature conditions, allowing processor 104 to ensure contextual comparability.

With continued reference to FIG. 1, processor 104 may then compute an estimated score for each facility contained in reference data 144. Processor 104 may determine estimated score using the same computational process employed for the primary facility: generating an interaction profile 146 between liquid parameter 116 and facility parameter 140 for each candidate facility record within reference data 144. For the purposes of this disclosure, an "estimated score" is a predictive metric that quantifies the expected degree of compatibility between a liquid formulation defined by liquid parameters and a facility defined by facility parameters contained in reference data. In some embodiments, estimated score may represent a numerical or categorical prediction of whether the liquid formulation will achieve stable packaging performance when processed at a given facility, as inferred through computational comparison of liquid data 112 and facility data 128. Estimated score may be expressed as a continuous value, such as a probability between 0 and 1, or as discrete labels, such as "high," "medium," or "low" compatibility, depending on the model configuration. The interaction profile 146 quantifies how liquid chemistry interacts with the mechanical and environmental parameters of a facility, producing predictive indicators such as dissolved oxygen retention, pressure stability, and seam integrity. In some embodiments, processor 104 may employ a trained machine-learning model (e.g., compatibility machine-learning model 160) to predict estimated score values using the data pairs drawn from liquid data 112 and reference data 144. The model may include a neural network, gradient-boosted regression model, or probabilistic graphical model trained using historical liquid outcomes recorded across multiple facilities. The training data may include labeled examples of successful and unsuccessful packaging events, where the inputs include facility parameters such as filler alignment deviation, nitrogen dosing precision, and seaming torque, and the outputs include quality metrics such as oxygen ingress or internal pressure stability.

With continued reference to FIG. 1, after processor 104 calculates estimated score for all facilities in reference data 144, processor 104 may filter out those whose estimated score falls below compatibility threshold 172. The remaining facilities are then sorted in descending order of estimated score. Processor 104 may further refine this list by comparing environmental or logistical metadata, such as geographic location, production capacity, or line availability, to select facilities that are both technically compatible and operationally feasible. Processor 104 may then compile the top-ranked facilities into alternative recommendation 180. Each entry within alternative recommendation 180 may include the facility identifier, its predicted estimated score, relevant adjusted liquid parameter 164 values that would optimize performance at that facility, and explanatory metadata describing which mechanical characteristics (e.g., filler precision, purge gas efficiency) contributed to compatibility. Processor 104 may store alternative recommendation 180 in memory and transmit it to graphical user interface 156, where it may be presented as a sortable or interactive list of facilities.

With continued reference to FIG. 1, processor 104 is configured to modify first sampling rate 132 to a second sampling rate 184 as a function of the adjustment profile 148. For the purposes of this disclosure, a "second sampling rate" is a modified temporal frequency, derived as a function of the adjustment profile, at which processor 104 continues to receive or request facility data from the same or additional sensors or data acquisition systems. Adjustment profile 148 may include parameters that indicate elevated sensitivity of liquid parameters 116 to mechanical variability 136, such as when the compatibility score 124 falls below a defined compatibility threshold 172. In such cases, processor 104 may automatically increase the sampling frequency to the second sampling rate 184, allowing the apparatus to capture finer temporal variations in facility operation. As a non-limiting example, when the adjustment profile 148 indicates that nitrogen dosing accuracy is degrading due to valve timing drift, processor 104 may increase the sampling rate of dosing pressure sensors from 1 Hz to 100 Hz to monitor rapid fluctuations. Conversely, when the adjustment profile 148 indicates stable operation, processor 104 may reduce the sampling rate to conserve power or network bandwidth.

With continued reference to FIG. 1, processor 104 generates a graphical user interface 156 configured to display adjustment profile 148. For the purposes of this disclosure, "graphical user interface" is digital visualization data configured to be rendered on a display device to present information to a user. Graphical user interface 156 may include visual display components such as data fields, charts, tables, sliders, or control indicators that dynamically represent the relationship between liquid parameter 116 and facility parameter 140. In some cases, graphical user interface 156 may include liquid data 112, liquid parameter 116, parameter range 120, facility data 128, facility parameters 140, mechanical variability 136, reference data 144, interaction profile 146, compatibility score 124, adjustment profile 148, adjusted liquid parameter 164, adjusted facility parameter 168, alternative recommendation 180, and the like.

With continued reference to FIG. 1, as a non-limiting example, processor 104 may cause graphical user interface 156 to display compatibility score 124 as a visual gauge or heatmap, where green, yellow, and red zones represent increasing degrees of incompatibility between the liquid formulation and the facility conditions. When compatibility score 124 falls below compatibility threshold 172, processor 104 may cause graphical user interface 156 to highlight contributing facility parameters and recommend corresponding adjusted facility parameter 168.

With continued reference to FIG. 1, graphical user interface 156 may include a hierarchical information layout organized by process phase. For example, and without limitation, a first region may display liquid chemistry data derived from liquid data 112 (e.g., total package oxygen, $CO_2$ concentration, sulfur dioxide range), a second region may display facility data 128 (e.g., filler pressure, purge dwell time, seaming torque), and a third region may display predicted interactions and adjustments from adjustment profile 148. Each field may be linked to corresponding reference data 144, enabling users to view acceptable ranges, current measurements, and recommended target values side-by-side.

With continued reference to FIG. 1, processor 104 may dynamically update graphical user interface 156 in real time as new sensor or analytical data is received. In some embodiments, processor 104 may incorporate a streaming data architecture, wherein facility sensors continuously transmit temperature, pressure, or oxygen data to memory, and processor 104 updates visual indicators on graphical user interface 156 with corresponding compatibility evaluations. When processor 104 identifies a new mechanical variability 136, graphical user interface 156 may automatically display an alert prompting operator intervention.

With continued reference to FIG. 1, in some embodiments, graphical user interface 156 may include an interactive control element allowing a user to simulate potential changes. As a non-limiting example, an operator may select a slider to increase nitrogen purge time, and processor 104 may immediately recalculate compatibility score 124 and display a predicted outcome. This simulation mode allows users to preview the effect of facility adjustments without physically altering the production line, reducing risk and improving operational predictability.

With continued reference to FIG. 1, graphical user interface 156 may include an adaptive recommendation panel that displays processor-generated guidance text. For example, and without limitation, processor 104 may generate recommendations such as "Increase purge dwell by 0.3 seconds to achieve TPO≤1.2 ppm" or "Reduce fill head pressure by 2 psi to maintain $CO_2$ at 1400 ppm." These recommendations may be derived from the adjusted facility parameter 168 within adjustment profile 148 and visually linked to the underlying data that produced them, such as facility sensor readings or liquid property limits.

With continued reference to FIG. 1, processor 104 may structure graphical user interface 156 using a layered rendering architecture comprising data ingestion, computation, and visualization layers. In some embodiments, processor 104 may utilize a client-server configuration, wherein the computation layer executes machine learning models that generate compatibility score 124 and adjustment profile 148, while the visualization layer renders the graphical interface locally on an operator terminal. Communication between these layers may occur via secure data packets formatted in human-readable structures such as JSON or XML, which are parsed and translated into interface elements on graphical user interface 156.

With continued reference to FIG. 1, graphical user interface 156 may incorporate color encoding, trend charts, and temporal analysis functions that allow users to evaluate compatibility performance over time. As a non-limiting example, processor 104 may cause graphical user interface 156 to render a time-series chart plotting dissolved oxygen concentration versus facility purge rate across production runs, highlighting points of deviation from parameter range 120. Users may select any data point to expand its detailed metrics and corresponding adjusted facility parameter 168 computed during that run.

With continued reference to FIG. 1, graphical user interface 156 may enable hierarchical access permissions. In some embodiments, an operator interface may allow real-time adjustment acceptance or rejection, while a supervisory interface may display historical performance data and model retraining results. Processor 104 may thus tailor graphical user interface 156 to the role of each user, ensuring that critical recommendations, such as those affecting safety limits defined by Ball specifications, require higher-level authorization before implementation.

With continued reference to FIG. 1, processor 104 may utilize graphical user interface 156 as a feedback input mechanism. When an operator modifies a facility setting in response to a displayed recommendation, processor 104 may capture that adjustment as a labeled event within reference data 144. This event record may then be used in subsequent retraining of machine learning models responsible for generating adjusted liquid parameter 164 and adjusted facility parameter 168, thereby improving prediction accuracy and personalization of future recommendations.

With continued reference to FIG. 1, in some cases, processor 104 may automatically adjust physical control signals to a filling head, purge gas valve, or seaming pressure actuator based on adjustment profile 148. In some embodiments, processor 104 may communicate the adjusted facility parameter 168 to programmable logic controllers (PLCs) or industrial automation interfaces responsible for real-time actuation. Processor 104 may generate a digital or analog control signal proportional to the magnitude of the required adjustment. For instance, when adjustment profile 148 indicates that purge gas efficiency is below an acceptable threshold, processor 104 may transmit a control signal that opens a purge gas valve by an additional calibrated increment to increase gas flow. Similarly, when seaming pressure variability causes seal deformation, processor 104 may output a voltage or current adjustment to a pressure actuator to restore the seam force to an optimal level. As a non-limiting example, if adjustment profile 148 indicates that the compatibility score 124 has decreased due to excessive filler head turbulence causing high dissolved oxygen, processor 104 may automatically command the filling head servo to reduce flow velocity by 5-10%. This adjustment effectively lowers oxygen ingress, thereby improving in-can stability without requiring human intervention. In another example, processor 104 may detect from adjustment profile 148 that nitrogen dosing variability exceeds tolerance; it may then modify the pulse width of the nitrogen injector to maintain consistent internal pressure.

With continued reference to FIG. 1, the ability of processor 104 to autonomously adjust physical control signals based on adjustment profile 148 constitutes a technical improvement in beverage packaging automation. It enables closed-loop adaptive control in which machine-learning outputs directly influence electromechanical operations. This integration allows the apparatus to dynamically correct process deviations in real time, minimizing human error and maintaining beverage quality despite mechanical variability among canning facilities. In some embodiments, processor 104 may further log all control signal modifications and corresponding sensor feedback in memory, generating a training dataset for continuous learning and calibration refinement. Over multiple production cycles, these data records may be incorporated into retraining processes of the machine-learning models described previously, allowing future adjustments to become more precise and predictive of physical outcomes.

With continued reference to FIG. 1, disclosed embodiments may provide a technical improvement in computer-based adaptive process control and predictive manufacturing compatibility analysis by addressing inefficiencies and inconsistencies present in conventional beverage packaging systems that rely on static calibration and manual parameter tuning. In some embodiments, the disclosed apparatus 100 may improve computational accuracy and operational responsiveness in adapting beverage chemistry and packaging parameters to variable mechanical environments across canning facilities through integrated machine-learning mechanisms and multi-source data fusion. In some embodiments, processor 104 may be configured to utilize a plurality of machine-learning models trained on liquid data 112, facility data 128, and reference data 144 to predict and correct cross-parameter dependencies affecting in-can stability. This configuration may provide a technical advantage over traditional rule-based or threshold-limited control systems by dynamically quantifying and compensating for non-linear interactions between beverage formulation characteristics and equipment variability. In some embodiments, processor 104 may employ interaction machine-learning models 152, such as multivariate regression and deep learning models, to construct interaction profile 146 that captures high-order dependencies between liquid parameters 116 and facility parameters 140. This allows the apparatus 100 to model the mechanical and chemical interplay that influences oxygen ingress, carbonation retention, and seam integrity with significantly higher precision. Processor 104 may further utilize compatibility machine-learning model 160 to compute compatibility score 124 based on labeled training data correlating real-world production outcomes to input parameter configurations. This adaptive computation may yield a predictive compatibility metric that enables proactive adjustment before product instability occurs, thereby improving both computational efficiency and real-time manufacturing control. In some embodiments, the apparatus 100 may provide an additional technical improvement by implementing closed-loop adaptation via adjustment profile 148. Processor 104 may generate adjustment profile 148 and automatically transmit corresponding control signals to physical actuators, such as filler heads, purge gas valves, or seaming pressure modules, in real time. This direct integration of computational prediction with hardware actuation eliminates the need for manual recalibration, reducing process latency and human error. By employing feedback mechanisms, the apparatus may continuously refine predictive accuracy through reinforcement learning, allowing interaction profile 146 and compatibility score 124 to evolve dynamically as equipment ages or new beverage formulations are introduced. In some embodiments, the disclosed graphical user interface 156 may further provide a technical improvement in human-machine interaction by rendering predictive compatibility data and adjustment recommendations as interactive visualization elements. The interface may enable operators to review facility-specific adaptation guidance, compare compatibility scores across reference facilities, and execute corrective actions directly from the display. This user interface design may improve interpretability of AI-driven predictions while maintaining operational transparency in production settings.

Figure 2:
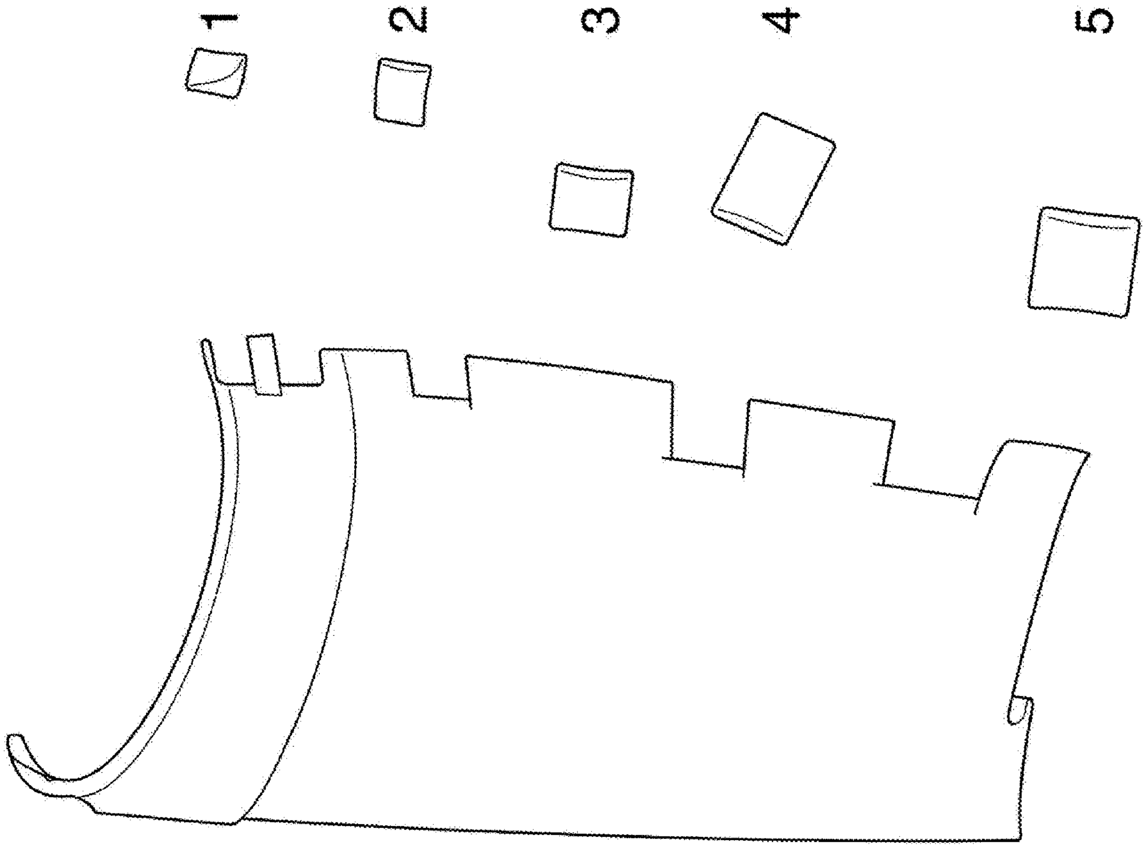
FIG. 2 illustrates the location within a can body sampled for liner and aluminum surface analysis.

Now referring to FIG. 2, illustrates the location within a can body sampled for liner and aluminum surface analysis. In an embodiment, the polymeric liner and aluminum interior surface of cans used in long-term storage trials (e.g., X1, Y2, and Z2) may be evaluated both prior to and following storage using a combination of optical, spectroscopic, and compositional analysis techniques. In some embodiments, unlined aluminum cans provided by manufacturers may also be analyzed to establish baseline elemental and morphological profiles for comparison. The analytical workflow may be configured to detect liner degradation, metal migration, and compositional or structural changes attributable to beverage contact, thereby providing empirical validation data for predictive compatibility modeling.

In an exemplary embodiment, can samples may be prepared for analysis by first sectioning the cylindrical body of each can using a precision cutting instrument such as a Gryphon C-40 band saw (Gryphon Corporation). Each sectioned can may then be vertically cut with stainless steel shears to open the body into a flat rectangular sheet, following the procedure previously described for coupon preparation. For post-storage analysis, the can lid may be removed using a mechanical seam teardown tool (e.g., Oktober Design) to prevent liner tearing and to maintain sample integrity. From each can, multiple test specimens may be obtained from five distinct vertical regions, ranging from the base to the upper headspace region, as illustrated in FIG. 2. In an embodiment, coupons for surface analysis may be approximately 0.25 cm×0.25 cm in size, except for coupons collected from headspace regions where spatial constraints may require smaller samples (approximately 0.25 cm×0.1 cm). These smaller coupons may enable accurate assessment of liner uniformity and corrosion signatures at the curved transition zone near the lid seam. Prior to analysis, sample surfaces may be gently cleaned with inert gas to remove loose particulate matter, ensuring that no additional abrasion or polishing alters the native liner morphology.

In some embodiments, elemental composition of both unused bare aluminum and pre- and post-storage lined can samples may be determined using x-ray fluorescence (XRF) spectroscopy. For purposes of this disclosure, "x-ray fluorescence (XRF)" refers to a non-destructive analytical method in which incident x-rays excite core electrons within a sample, causing emission of characteristic secondary radiation that can be used to quantify elemental composition. In an exemplary implementation, samples approximately 1 cm×1 cm (obtained from FIG. 2, Location 4) may be analyzed using a portable XRF spectrometer (e.g., Bruker Tracer III-SD). Each measurement may be conducted in triplicate, with the excitation voltage set to approximately 40 kV, the tube current set to approximately 40 μA, and a dwell time of approximately 60 seconds per scan.

In one embodiment, the portable XRF unit may be operated in an upward-facing tabletop geometry, allowing samples to be positioned directly on the measurement window with the inner surface of the can facing the detector aperture. Spectral data may be collected under ambient laboratory conditions and analyzed using spectral-fitting software such as PyMCA to quantify element-specific peak areas. In some embodiments, the resulting spectra may be used to determine the presence and concentration of key alloy components (e.g., aluminum, magnesium, manganese, and iron) as well as trace elements indicative of liner degradation or beverage-induced corrosion (e.g., tin, copper, zinc, or sulfur residues). In further embodiments, XRF compositional profiles obtained before and after storage may be compared to identify changes in elemental abundance correlated with beverage exposure. Such comparative analysis may reveal evidence of liner delamination, diffusion of metallic ions through the coating, or loss of protective barrier components. In some embodiments, at least a processor may correlate detected elemental shifts with $H_2S$ accumulation data or corrosion risk scores generated by the predictive compatibility model, thereby enabling quantitative linkage between empirical material characterization and simulated packaging stability outcomes.

With continued reference to FIG. 2, in some embodiments, the composition and physical characteristics of the can liner and underlying aluminum substrate may be characterized using a combination of spectroscopic, optical, and electrochemical measurement techniques. These methods may be applied both to pre-storage and post-storage samples to assess liner degradation, compositional changes, adhesion integrity, and metal exposure. In an exemplary implementation, analysis may be performed on lined aluminum beverage cans of types X1, Y2, and Z2, as well as unlined aluminum control samples provided by the manufacturer.

In some embodiments, Fourier transform infrared-attenuated total reflectance (FTIR-ATR) spectroscopy may be employed to characterize the chemical composition of polymeric liner materials. For purposes of this disclosure, "FTIR-ATR" refers to a spectroscopic technique in which infrared radiation is directed through an optically transparent crystal at a shallow angle to induce total internal reflection, allowing the evanescent field to interact with the liner surface and yield absorbance spectra representative of molecular functional groups. In one embodiment, spectra may be collected using a Bruker Vertex V80V Vacuum FTIR system operated under a nitrogen atmosphere (Cornell Center for Materials Research, Ithaca, NY). Coupons approximately 0.5 cm×0.5 cm in size may be prepared in triplicate from the mid-body region of each can (corresponding to FIG. 2, Location 4). Spectral data may be collected across a wavelength range of approximately 4000 to 700 $cm^{-1}$. In some embodiments, the acquired FTIR-ATR spectra may be analyzed to identify characteristic absorbance bands corresponding to epoxy, polyester, or acrylic resin constituents, thereby confirming liner composition and detecting chemical shifts associated with beverage exposure or oxidation.

In some embodiments, liner thickness and aluminum surface uniformity may be profiled using laser-scanning profilometry. For purposes of this disclosure, "laser-scanning profilometry" refers to a non-contact optical method that reconstructs a three-dimensional surface topography by measuring the reflected intensity of a focused laser beam scanned across a defined area. In an exemplary embodiment, measurements may be conducted using a Keyence VK-X260 laser-scanning profilometer at a laser wavelength of approximately 408 nm. Each sample may be analyzed using the "surface profile" mode to evaluate substrate smoothness and the "thin film" mode to determine liner coating thickness and uniformity. A refractive index of approximately 1.7 may be applied for BPA and BPA-NI epoxy liners, extrapolated from the known polycarbonate refractive index in the 435-1052 nm range. The measured field of view may be approximately 285 μm×210 μm, allowing micro-scale visualization of coating uniformity and potential micro-defects.

In some embodiments, liner thickness in both the body and dome regions of cans may additionally be determined using optical interferometry. For purposes of this disclosure, "optical interferometry" refers to a precision technique that measures film thickness by analyzing interference patterns produced by the reflection of broadband light from layered surfaces. In an exemplary embodiment, an interferometric film-thickness analyzer (e.g., SpecMetrix ACS-10, Sensory Analytics LLC) may be used across a spectral range of approximately 700-1400 nm, with a refractive index of approximately 1.55 applied for computational modeling. Three cans of each liner type may be sampled, and data may be used to quantify mean liner thickness, inter-sample variation, and coating distribution between structural regions of the can. In further embodiments, electrochemical impedance spectroscopy (EIS) may be employed to evaluate liner integrity, including the presence of pores, coating continuity, and barrier performance. For purposes of this disclosure, "EIS" refers to an electrochemical measurement technique in which a sinusoidal voltage perturbation is applied to a sample immersed in an electrolyte, and the resulting current response is analyzed to determine impedance characteristics over a range of frequencies. In an exemplary configuration, EIS measurements may be conducted in triplicate using a PalmSens3 potentiostat with PSTrace 5.9 software. Intact, unused lined cans may be analyzed directly (rather than isolated coupons) following established protocols. The experimental setup, shown in FIG. 16, may include a working electrode in contact with the exterior can bottom, a counter electrode consisting of a flat steel cell, and a silver/silver chloride (Ag/AgCl) reference electrode immersed in a 35 g/L sodium chloride (NaCl) electrolyte solution. The system may be housed within a Faraday cage to prevent electromagnetic interference. The open circuit potential (OCP) may be stabilized prior to measurement (drift <0.01 mV/sec). The applied potential, frequency sweep parameters, and equivalent circuit modeling conditions may be defined according to FIGS. 11 and 12.

In some embodiments, metal exposure measurements may be performed using an enamel rater (e.g., WACO Enamel Rater III). For purposes of this disclosure, an "enamel rater" is an industry-standard instrument configured to measure coating porosity by quantifying current flow through exposed metal regions under an applied voltage. In an exemplary test, cans may be filled with a 10 g/L NaCl electrolyte solution to a standardized level, and a stainless-steel probe electrode may be immersed within the can. A potential of approximately 6.3 V may be applied for four seconds, after which the resulting current may be recorded. The measured current may provide a quantitative indication of liner coverage, with higher current values corresponding to greater exposed metal area. Three cans of each type from the long-term storage study may be analyzed to compare coating integrity across liner chemistries. In some embodiments, liner adhesion quality may be evaluated using standardized mechanical testing. For example, adhesion testing may be performed in accordance with ASTM D3359-17, Test Method B. For purposes of this disclosure, "liner adhesion quality" refers to the mechanical robustness of the liner-to-substrate bond under applied shear or peel stress. In an exemplary test, six parallel horizontal and six parallel vertical incisions may be made on the interior can surface using a precision cutting tool to form a crosshatch pattern. A pressure-sensitive adhesive tape (e.g., Scotch Bi-Directional Filament Tape 8959, 180° peel strength of approximately 11 N/cm) may then be applied to the incised area. After 90 seconds of dwell time, the tape may be peeled off and the percentage of removed coating area may be quantified, providing a measure of liner adhesion strength. In additional embodiments, the presence of uncoated or exposed metal regions may be evaluated qualitatively using the ASBC Can Method 8. For purposes of this disclosure, "uncoated region detection" refers to the identification of areas where the liner coating is absent or discontinuous, exposing the aluminum substrate. In an exemplary test, an aqueous solution containing hydrochloric acid (0.027 N) and copper sulfate pentahydrate (100 g/L) may be added to cans (n=3 replicates) and maintained at room temperature for approximately 45 minutes. Uncoated regions may be visually identified by the formation of copper deposits on exposed aluminum areas, indicating liner discontinuity or manufacturing defects.

In some embodiments, analytical outputs obtained from FTIR-ATR, profilometry, interferometry, EIS, and enamel rating measurements may be stored within a unified characterization dataset. At least a processor may be configured to correlate this dataset with corresponding $H_2S$ production data or liner compatibility scores, enabling the system to refine its predictive modeling parameters based on empirical liner performance metrics. This integration may further improve the accuracy of liner-formulation compatibility simulations by linking measurable physical degradation indicators to computational risk outputs.

In some embodiments, statistical analysis of experimental data may be performed using commercial statistical software packages, such as JMP Pro 16 or JMP Pro 17 (SAS Institute, Inc.). For purposes of this disclosure, "statistical analysis" refers to the application of quantitative and inferential statistical methods to evaluate the significance of observed effects across experimental variables, including liner composition, storage duration, and beverage formulation parameters. In an exemplary embodiment, analysis of variance (ANOVA) may be employed to determine whether mean hydrogen sulfide ($H_2S$) concentrations differ significantly among treatment groups. The analysis may be configured with a significance level (a) of approximately 0.05, such that p-values less than 0.05 are interpreted as statistically significant. In some embodiments, ANOVA results may be complemented by post hoc comparison tests or least significant difference (LSD) analyses to further resolve differences between specific liner types, storage intervals, or wine compositions. In certain implementations, at least a processor may be configured to ingest raw data values corresponding to $H_2S$ concentration, liner characterization metrics, and formulation variables, and to perform automated statistical modeling within a data analysis module. The processor may compute confidence intervals, variance components, and p-values, and may generate visual or tabular outputs summarizing statistical trends. The results of the analysis may then be stored as structured statistical data objects and integrated into the system's predictive modeling framework to iteratively refine model weighting factors or validation criteria based on empirical evidence.

Figure 3:
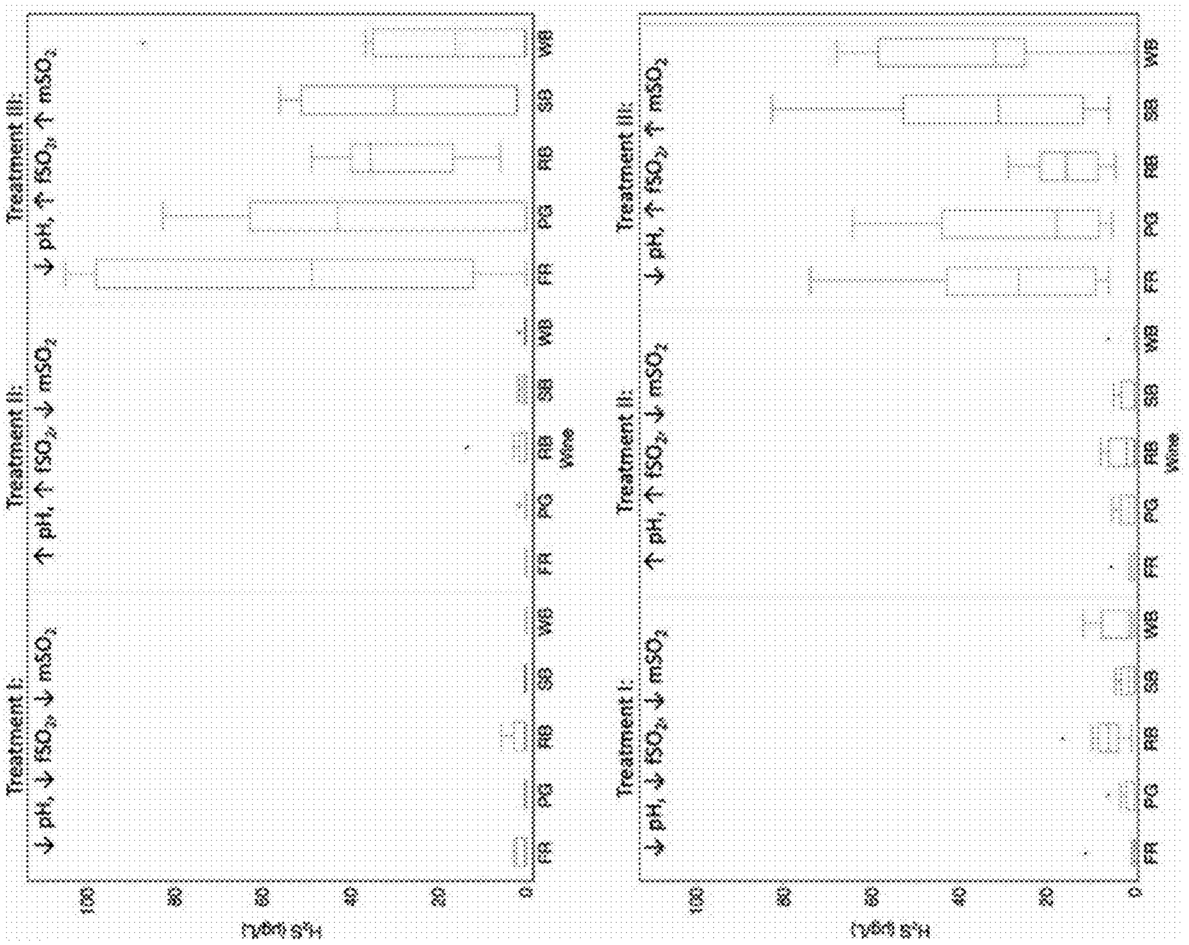
FIG. 3 is a graphical representation of hydrogen sulfide ($H_2S$) production by treatment group and wine after four months (top) and eight months (bottom)

With reference now to FIG. 3, a graphical representation of hydrogen sulfide ($H_2S$) production by treatment group and wine after four months (top) and eight months (bottom) is illustrated. In some embodiments, empirical results from long-term storage trials demonstrate that hydrogen sulfide ($H_2S$) accumulation in canned wines varies as a function of liner composition, wine chemistry, and molecular sulfur dioxide ($SO_2$) concentration. Earlier investigations involving isolated aluminum coupons and single wine formulations suggested that $H_2S$ formation was elevated in acrylic-lined cans relative to epoxy-lined cans, and that molecular $SO_2$ was a stronger predictor of $H_2S$ generation than either free $SO_2$ or pH alone. However, those prior studies were limited to short-term accelerated conditions and single-source liners. The present disclosure extends those findings by evaluating multiple commercial wine types and multiple liner sources under extended storage conditions, thereby confirming and refining the relationship between wine chemistry and gas evolution in sealed aluminum containers.

In an exemplary embodiment, five commercial wines, Pinot Grigio, Sauvignon Blanc, French Rosé, Sparkling Rosé, and Sparkling White, were each adjusted to yield three distinct treatment groups characterized by varying combinations of pH, free $SO_2$, and molecular $SO_2$ levels. Specifically, Treatment I represented low-pH, low-free-$SO_2$, and low-molecular-$SO_2$ conditions; Treatment II represented high-pH, high-free-$SO_2$, and low-molecular-$SO_2$ conditions; and Treatment III represented low-pH, high-free-$SO_2$, and high-molecular-$SO_2$ conditions. Additional theoretical combinations could not be produced due to the dependent relationship between molecular $SO_2$ and hydrogen ion concentration, as molecular $SO_2$ is a function of both free $SO_2$ and $[H^+]$. The "high" molecular $SO_2$ range tested (approximately 1.6-2.6 mg/L) may correspond to approximately 0.8-2.0 mg/L when expressed under conventional water-based dissociation constants, given ethanol-adjusted pKa correction factors. In some embodiments, wines corresponding to each treatment may be sealed in cans from three commercial suppliers, designated $X_1$ (BPA-epoxy), $Y_2$ (BPA-NI epoxy), and $Z_2$ (BPA-NI epoxy), and stored under controlled conditions at approximately 20° C. for extended durations. Hydrogen sulfide levels may then be quantified at predetermined intervals (e.g., four and eight months) as depicted in FIG. 3.

In one embodiment, the unadjusted Treatment I wines exhibited non-detectable or trace $H_2S$ concentrations (<3 μg/L) immediately following canning, with mean values below the sensory threshold (<10 μg/L) at both the four- and eight-month timepoints. In contrast, adjusted wines in Treatment III (high molecular $SO_2$) produced significantly higher $H_2S$ concentrations than Treatment I or II wines (analysis of variance, $p<0.05$). After four months of storage, the average $H_2S$ concentration in Treatment III samples was approximately 28.7 μg/L, with some samples exceeding 100 μg/L. By comparison, Treatments I and II averaged approximately 2.2 μg/L over the same interval. After eight months, similar trends were observed, as illustrated in FIG. 3 (bottom), wherein Treatment III wines maintained the highest $H_2S$ accumulation, indicating that elevated molecular $SO_2$, rather than free $SO_2$ concentration alone, remains a principal driver of $H_2S$ formation under long-term storage conditions. The measured $H_2S$ concentrations in these treatments, particularly for Treatment III, substantially exceeded levels previously observed in bottled wines (≤6 μg/L) and surpassed typical sensory detection thresholds (~1 μg/L).

Without being bound by theory, it is believed that the neutral molecular $SO_2$ fraction may permeate the non-polar liner interface and undergo chemical reduction upon contact with the aluminum substrate, leading to $H_2S$ formation and potential liner degradation. Because molecular $SO_2$ represents a component of total free $SO_2$ and its relative abundance increases at lower pH, the observed effect likely reflects an interactive relationship between $SO_2$ speciation and acidity rather than an independent molecular $SO_2$ mechanism. No statistically significant correlations were observed between $H_2S$ accumulation and other compositional parameters, including alcohol content, titratable acidity, dissolved aluminum, or residual sugar, as summarized in FIG. 10 ($p>0.05$, one-way ANOVA for all factors). These findings collectively confirm that (i) molecular $SO_2$ exerts the dominant influence on $H_2S$ generation during long-term aluminum can storage, (ii) liner chemistry modulates the rate and extent of gas evolution, and (iii) compositional parameters not associated with $SO_2$ speciation contribute minimally under the tested conditions.

In some embodiments, the experimental data represented in FIG. 3 may be stored in a compatibility modeling dataset accessible to at least a processor for validation of liner-beverage predictive models. The processor may compute correlation coefficients, regression weights, or feature-importance values linking liner composition and beverage parameters with observed $H_2S$ concentrations. The resulting model may thereby enable automated prediction of liner-formulation compatibility and long-term storage stability across diverse wine matrices.

Figure 4:
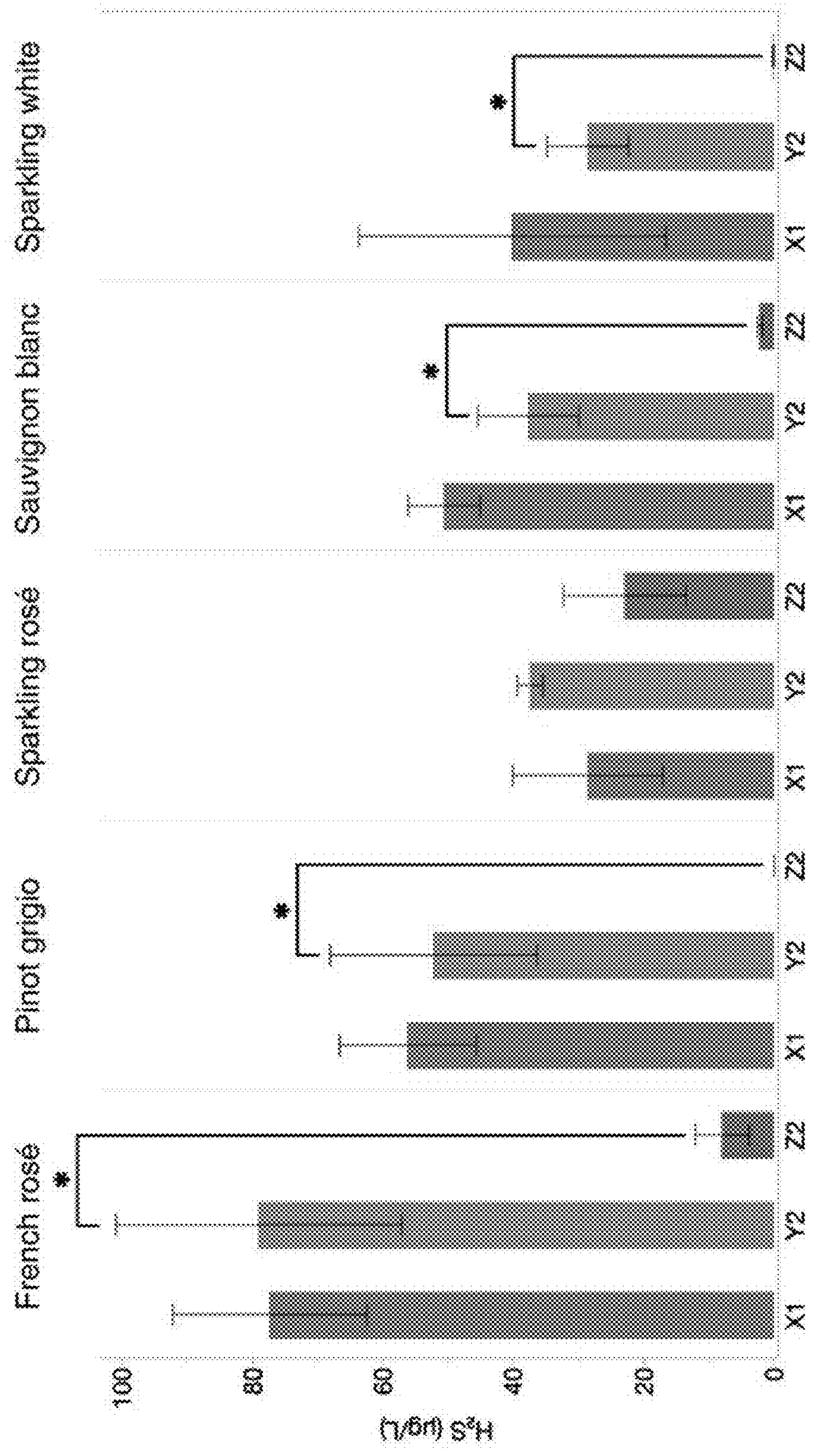
FIG. 4 is a graphical representation of hydrogen sulfide ($H_2S$) production by liner (X1, Y2, and Z2) for each of five Treatment III wines after four months of storage.

With reference now to FIG. 4, a graphical representation of hydrogen sulfide ($H_2S$) production by liner (X1, Y2, and Z2) for each of the five Treatment III (high molecular $SO_2$) wines after four months of storage is illustrated. In some embodiments, the long-term storage data may further be analyzed to evaluate liner-specific effects on hydrogen sulfide ($H_2S$) production across different wine compositions. The results for wines corresponding to Treatment III (high molecular $SO_2$ conditions) stored in three different liner types are illustrated in FIG. 4. In one embodiment, cans designated $Z_2$ (BPA-NI epoxy) exhibited markedly lower mean $H_2S$ concentrations (approximately 5.9 μg/L±2.1) compared to cans designated $X_1$ (BPA epoxy) and $Y_2$ (BPA-NI epoxy) (mean=36.6 μg/L±3.2; two-way ANOVA, $p<0.05$). These data indicate that, even within similar chemical liner classes, manufacturer-specific implementation variables may contribute substantially to corrosion-driven sulfur gas evolution.

In some embodiments, the observed differences between $Y_2$ and $Z_2$ cans may be attributed to manufacturing variability, despite the reported use of an identical liner formulation (e.g., Valspar V70 BPA-NI epoxy). Such variability may include differences in polymer cross-linking, cure kinetics, or application thickness, all of which may influence the permeability of the liner to reactive sulfur species and the local electrochemical environment at the metal-liner interface. Notably, $Z_2$ cans also produced less $H_2S$ than $X_1$ cans, even though $X_1$ utilized a conventional BPA-epoxy liner traditionally considered the industry "gold standard." Statistical variance analysis (Levene's test, $p<0.05$) demonstrated that $Z_2$ cans not only yielded lower mean $H_2S$ concentrations but also exhibited significantly lower inter-replicate variance compared to either $X_1$ or $Y_2$ cans. Reduced variance may indicate greater liner application consistency or enhanced uniformity of the coating thickness across can surfaces, suggesting that manufacturing process control exerts a measurable influence on the reproducibility of chemical stability outcomes.

In prior literature, variation in $H_2S$ production among canned wines has often been high (relative standard deviation exceeding 50%), even when cans were sourced from a single manufacturer. The present findings suggest that can-to-can variability, potentially arising from fluctuations in liner deposition thickness, adhesion, or cure temperature, may represent a significant unaccounted factor influencing gas formation rates. Such variability has been similarly implicated in beverage-can corrosion studies. In some embodiments, at least a processor may be configured to receive and normalize $H_2S$ concentration data and liner-specific parameters (e.g., liner thickness, curing conditions, or surface microdefects) into a structured compatibility dataset. The processor may then compute correlation coefficients or perform regression modeling to quantify the relative contribution of manufacturing variation to observed gas formation outcomes. The resulting correlation outputs may be stored as liner manufacturing performance indicators, thereby enabling subsequent predictive modules to assign confidence intervals or risk scores to candidate liner sources.

In certain implementations, the time-dependent trend observed in the low-$SO_2$ control wines (Treatment I) may further corroborate liner influence. Specifically, cans designated X1 produced the highest $H_2S$ concentrations in Treatment I control samples (ANOVA, $p=0.029$; data not shown), with incremental increases in $H_2S$ from four to eight months of storage. This pattern suggests that even under low-reactivity conditions, liner chemistry and manufacturing quality may contribute to baseline $H_2S$ accumulation rates. Accordingly, the data depicted in FIG. 4 collectively demonstrate that liner-to-liner and manufacturer-to-manufacturer variations have a statistically significant effect on $H_2S$ formation kinetics. These results may be used to refine compatibility thresholds within the predictive model described herein, enabling the system to recommend optimal liner sources or production batches for specific beverage formulations.

Figure 5:
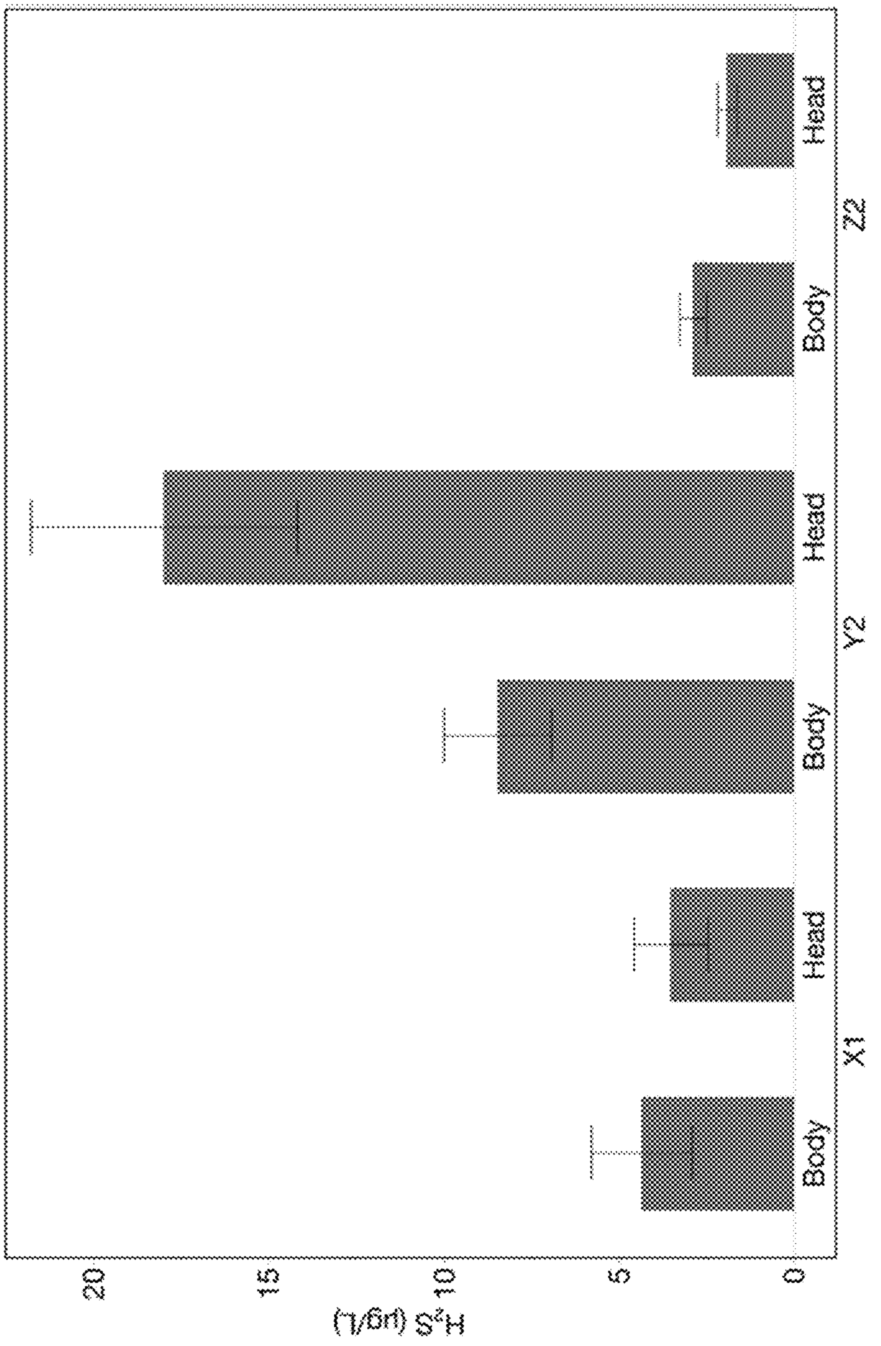
FIG. 5 is a graphical representation of hydrogen sulfide ($H_2S$) production from can body and headspace coupons from three different batches of cans (X1, Y2, Z2), using the accelerated aging assay in triplicate, measuring at three and 14 days of storage.

With reference now to FIG. 5, a graphical representation of hydrogen sulfide ($H_2S$) production from can body (see FIG. 2, Location 4) and headspace (see FIG. 2, Locations 1 and 2) coupons from three different batches of cans (X1, Y2, Z2), using the accelerated aging assay in triplicate (technical replicates), measuring at three and 14 days of storage is illustrated. in some embodiments, accelerated corrosion and hydrogen sulfide ($H_2S$) formation may vary between distinct structural regions of an aluminum beverage can. Prior studies have indicated that cans exhibiting higher $H_2S$ accumulation during long-term storage also display greater visible corrosion, suggesting a correlation between gas evolution and liner degradation. Although visible corrosion was not quantitatively scored in the present investigation, qualitative observations revealed region-specific variation among can sources. For example, cans designated $X_1$ exhibited visible corrosion predominantly along the body wall, whereas cans designated $Y_2$ exhibited corrosion concentrated near the upper neck and headspace region (see FIG. 17).

To evaluate whether such spatial differences reflect variable susceptibility to corrosion, coupons were prepared from the headspace neck region (corresponding to FIG. 2, Locations 1 and 2) and from the body sidewalls (corresponding to FIG. 2, Location 4). The coupons were incubated in a commercial Riesling wine under accelerated aging conditions (approximately three days at 50° C.). As illustrated in FIG. 5, $H_2S$ formation was greatest for the headspace-region coupons of the $Y_2$ can type, producing approximately three-fold higher $H_2S$ concentrations than coupons sourced from the can body. This observation is consistent with the visually evident corrosion near the upper neck region of the $Y_2$ cans.

Without being bound by theory, it is believed that regional differences in liner adhesion, coating thickness, or local curing temperature during manufacture may contribute to the observed heterogeneity in corrosion resistance. However, given that the total surface area of the can body is an order of magnitude greater than that of the neck region, localized corrosion alone is unlikely to account for global differences in $H_2S$ accumulation across liner types or manufacturers. Accordingly, liner uniformity and chemical barrier quality remain more predictive factors for system-wide compatibility assessment.

Figure 6:
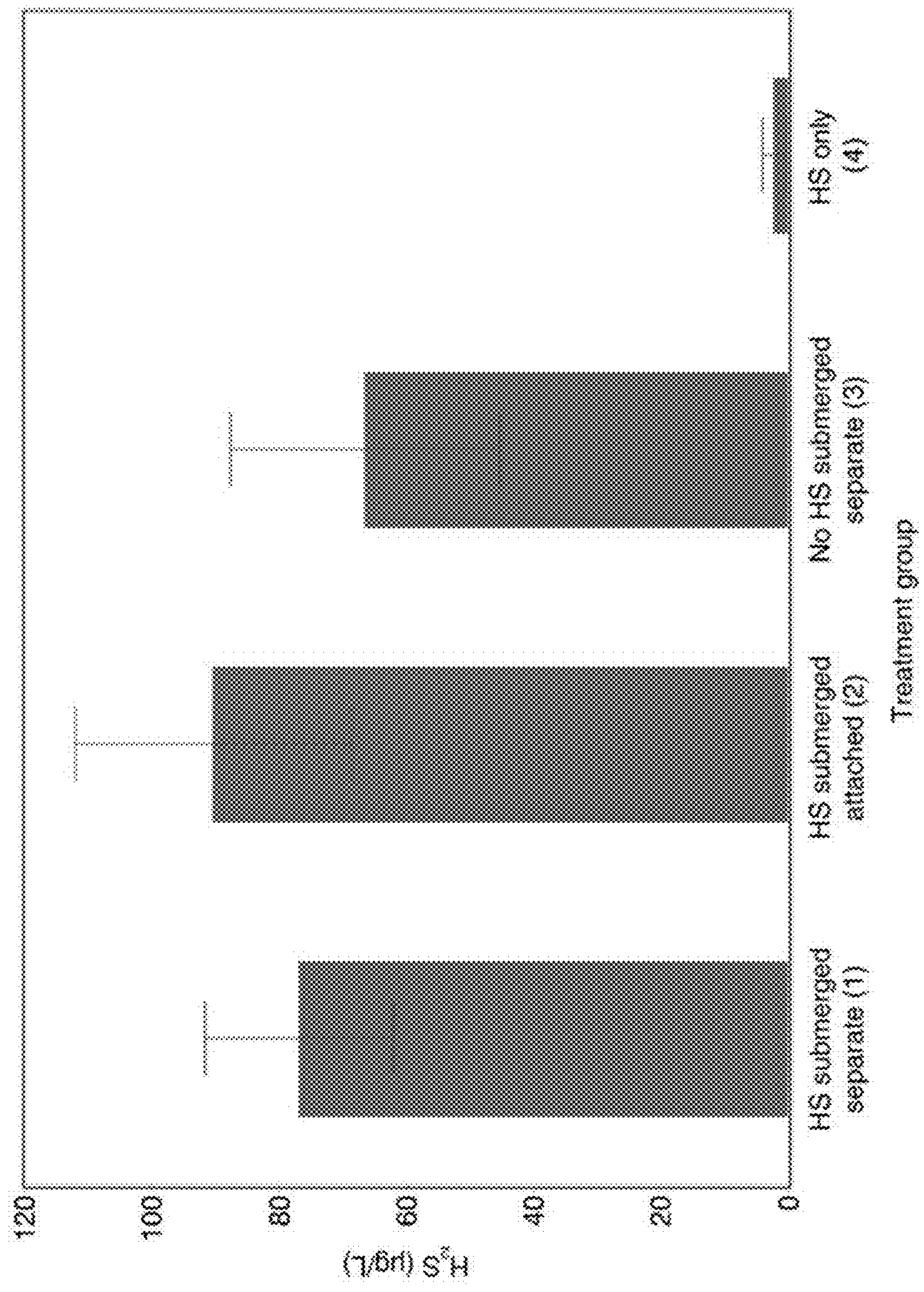
FIG. 6 is a graphical representation of dependence of hydrogen sulfide ($H_2S$) formation on location of coated aluminum coupon.

Referring now to FIG. 6, a graphical representation of dependence of hydrogen sulfide ($H_2S$) formation on location of coated aluminum coupon (headspace [HS] versus immersed) is illustrated. Treatment 1, two coupons, one in headspace and one immersed; Treatment 2, one intact coupon, partially in headspace and partially immersed; Treatment 3, two coupons, both immersed; and Treatment 4, coupon in HS only is illustrated. To further examine whether corrosion and $H_2S$ production differ between immersed and non-immersed aluminum regions, an additional accelerated aging protocol was conducted wherein the spatial orientation of aluminum coupons was systematically varied. As shown in FIG. 6, negligible $H_2S$ formation occurred when aluminum was present exclusively in the headspace (non-immersed), indicating that generation of $H_2S$ through the reduction of $SO_2$ requires direct liquid contact. Similarly, no statistically significant increase in $H_2S$ concentration or visible corrosion was detected when comparing fully immersed coupons (Treatment III) to partially immersed coupons (Treatments I and II), demonstrating that immersion depth alone does not materially affect reaction kinetics under these conditions. Accordingly, the higher corrosion observed in the neck region of certain liners (e.g., Y2) is attributed to reduced coating integrity or localized barrier defects rather than to increased chemical reactivity in vapor-phase regions. In some embodiments, these findings may be used to update the predictive compatibility model, wherein at least a processor may incorporate spatial corrosion weighting factors or liner-uniformity coefficients into the compatibility scoring routine. This enables the system to simulate region-specific degradation behavior and to predict cumulative $H_2S$ formation based on liner composition, coating thickness mapping, and surface area normalization.

Figure 7:
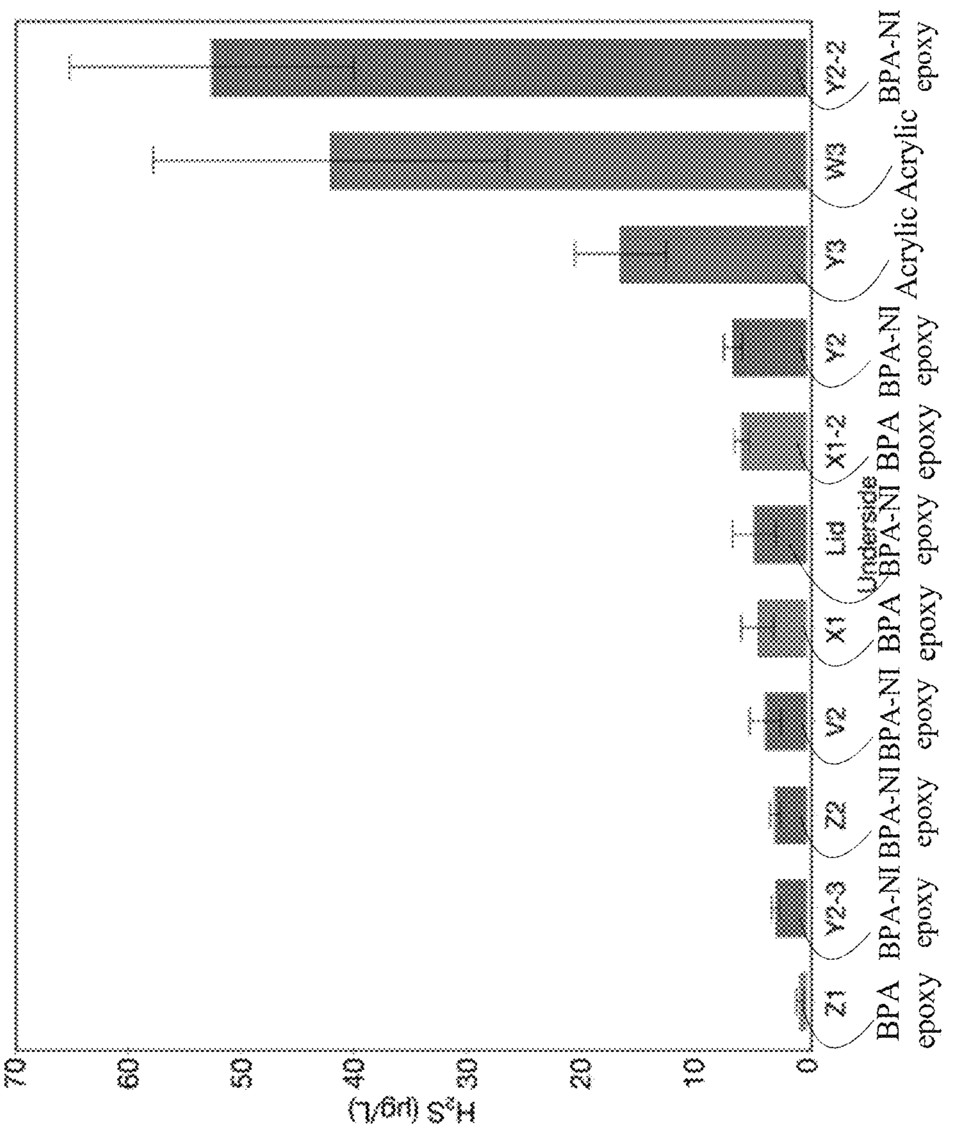
FIG. 7 is a graphical representation of hydrogen sulfide ($H_2S$) production for 10 different can types, as well as the underside of the can lid, after three days in accelerated aging conditions with a commercial German Riesling.

With reference now to FIG. 7, a graphical representation of hydrogen sulfide ($H_2S$) production for 10 different can types, as well as the underside of the can lid, after three days in accelerated aging conditions with a commercial German Riesling is illustrated. In some embodiments, accelerated aging trials may be conducted to further evaluate hydrogen sulfide ($H_2S$) formation across a plurality of liner types and can manufacturers. The accelerated aging protocol may allow controlled evaluation of corrosion-driven gas evolution independent of long-term storage variables such as temperature cycling, light exposure, or headspace gas exchange. In one embodiment, coupons were prepared from cans used in the long-term study described above, designated X1, Y2, and Z2, together with coupons from seven additional liner treatments, yielding a total of ten test configurations. Each coupon was incubated in a single commercially available German Riesling characterized by a high molecular $SO_2$ concentration, thereby standardizing the beverage chemistry across all test groups.

As illustrated in FIG. 7, in some embodiments, $H_2S$ formation under accelerated conditions may vary significantly among liner compositions and manufacturing sources. Consistent with previous findings, acrylic-coated coupons generated substantially higher $H_2S$ concentrations, up to approximately 100 μg/L, than other liner types, with the exception of the $Y_2$-2 batch (Tukey test, $p<0.05$). By comparison, epoxy and BPA-NI epoxy liners generally exhibited lower $H_2S$ generation, reinforcing the observed correlation between polymer chemistry and corrosion protection performance.

In certain embodiments, variation in $H_2S$ formation may also be detected among different manufacturers producing liners nominally classified under the same polymer category. For example, coupons corresponding to Z2 generated significantly lower $H_2S$ concentrations than all three Y2 batches (ANOVA, $p<0.05$), and coupons corresponding to Z1 generated lower concentrations than X1 (ANOVA, $p<0.05$). These findings demonstrate that liner formulation alone is not predictive of stability outcomes, and that manufacturing variables such as curing conditions, cross-linking density, and surface uniformity can produce measurable chemical divergence even when nominal liner chemistries are identical. Similar inter-manufacturer variability was observed among acrylic coatings sourced from different producers (e.g., Y3 and W3), which exhibited statistically distinct mean $H_2S$ values and elevated within-group variance (Levene's test, $p<0.05$). This result suggests that polymer homogeneity and process consistency during liner deposition materially affect barrier integrity and gas evolution behavior. In some embodiments, such process-linked data may be captured by at least a processor as part of a structured liner-performance dataset, enabling machine-learning-based association between manufacturer-specific process metrics and observed chemical stability outcomes. Batch-to-batch variation was also observed among cans designated Y2, wherein the defective lot Y2-2 produced approximately ten-fold higher $H_2S$ than either the original batch (Y2) or thinner-coated variant (Y2-3). The visually defective Y2-2 cans displayed surface irregularities and incomplete coating in the moat region (see FIG. 18), which likely contributed to elevated reactivity and reduced corrosion resistance. These results confirm that localized liner defects, particularly in high-stress forming regions of the can, can amplify reductive gas generation independent of overall polymer chemistry.

In one or more embodiments, the system may employ the results shown in FIG. 7 to derive manufacturing consistency scores or defect-risk parameters. At least a processor may compute weighted stability indices for each liner source based on accelerated aging data, variance magnitude, and observed defect frequency. These indices may be integrated into the predictive compatibility model as confidence factors for downstream liner-selection algorithms. By aggregating defect-linked chemical outcomes from multiple production lots, the disclosed system provides a scalable framework for correlating manufacturing variability with beverage stability and for recommending liner suppliers based on verified performance consistency.

Figure 8:
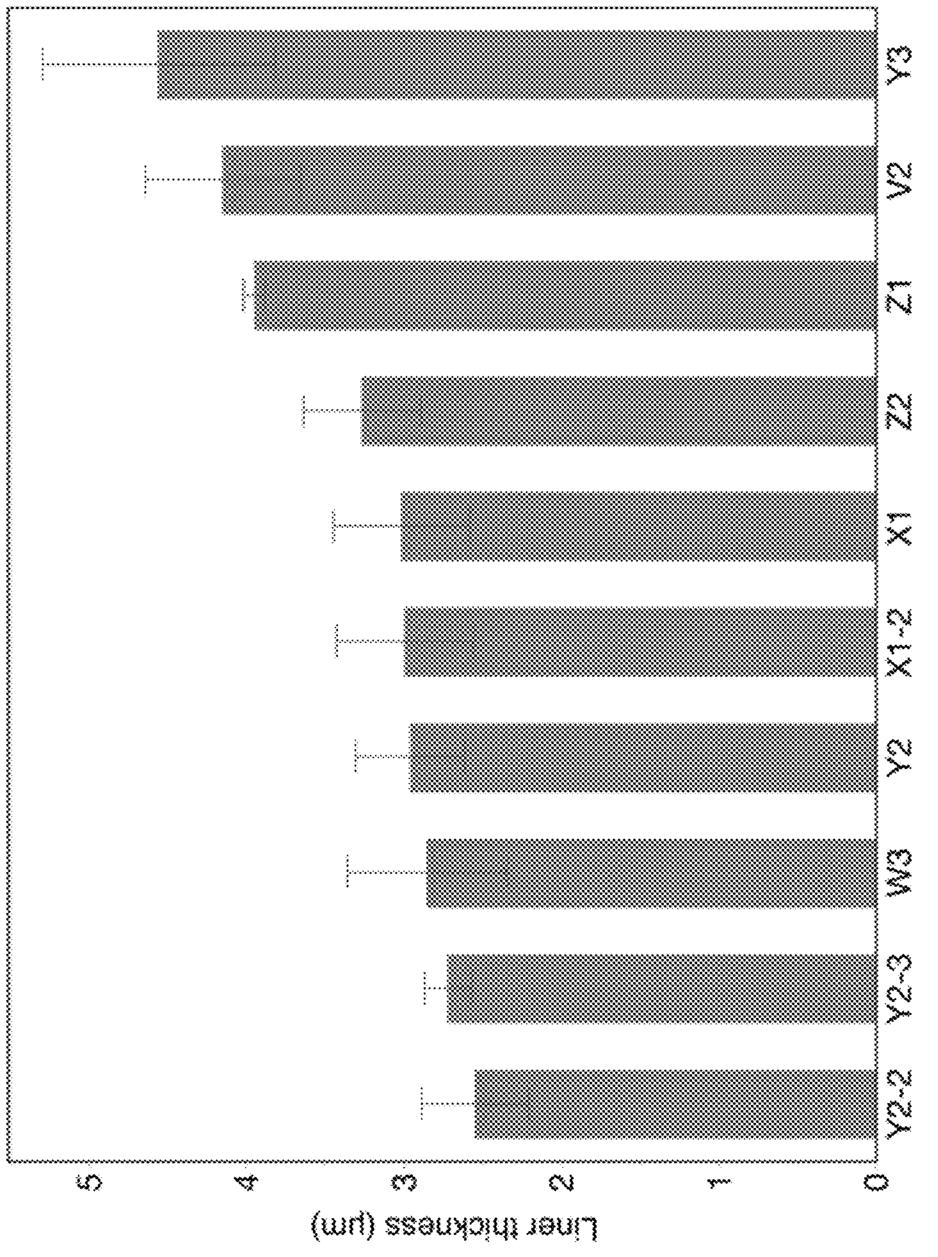
FIG. 8 is a graphical representation of can body liner thickness from 10 different can types, as measured by laser-scanning profilometer.

With reference now to FIG. 8, a graphical representation of can body liner thickness from 10 different can types, as measured by laser-scanning profilometer (n=3 cans per liner type) is illustrated. In some embodiments, the system may utilize characterization data associated with the polymeric liner and underlying aluminum substrate to identify structural or compositional features that contribute to variation in hydrogen sulfide ($H_2S$) formation. Prior experimental work demonstrated that liner chemistry is a principal determinant of gas formation, with acrylic liners yielding more than ten-fold higher $H_2S$ concentrations than epoxy-based liners. However, both long-term and accelerated-aging results of the present study revealed comparable variation among cans employing nominally identical liner chemistries but sourced from different manufacturers. Accordingly, variation in performance (including average $H_2S$ formation and can-to-can variance) was hypothesized to originate from one or more of the following: aluminum alloy composition, polymeric liner formulation, degree of polymer cross-linking or cure, and liner thickness and uniformity.

Figure 19:
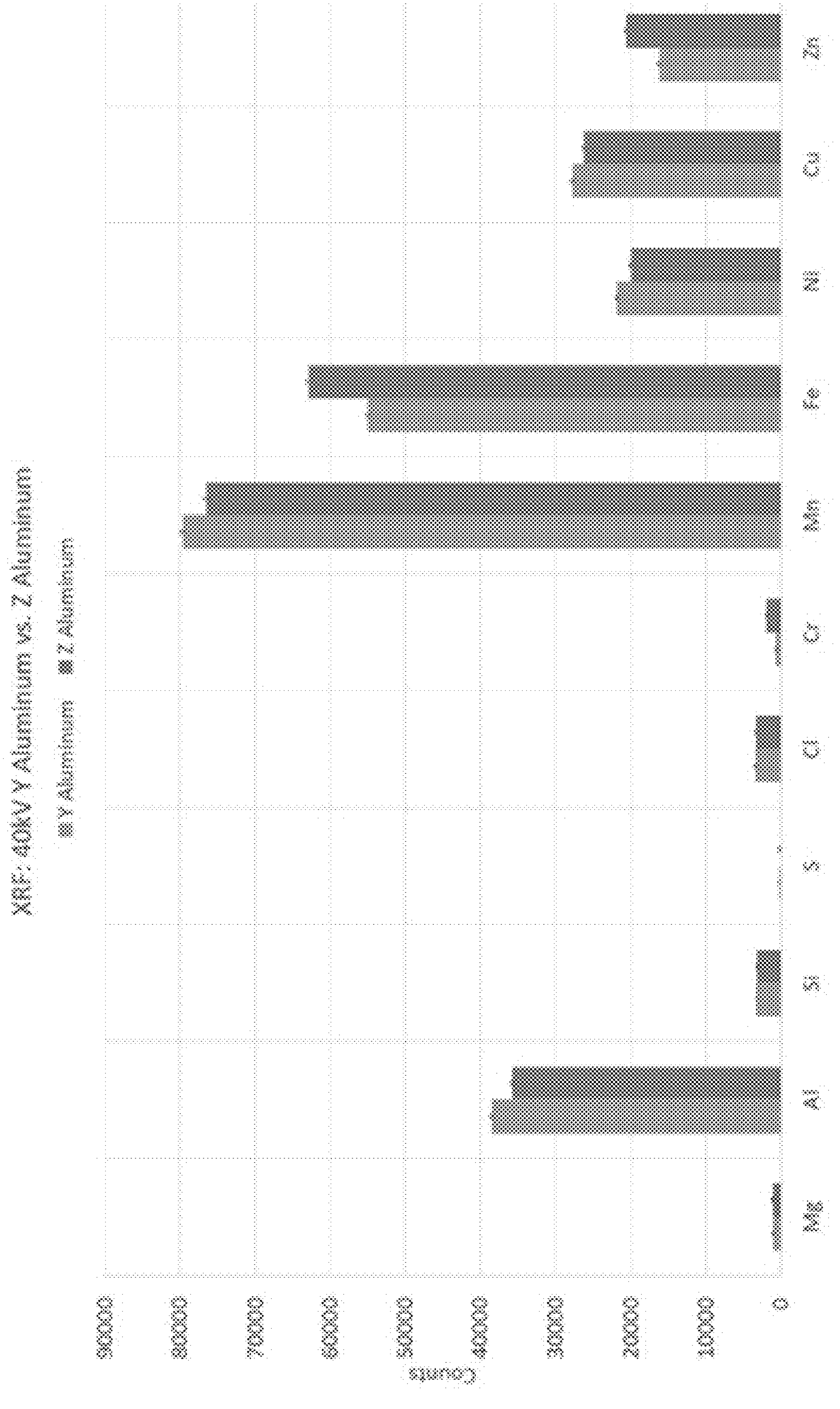
FIG. 19 illustrates an elemental analysis by x-ray fluorescence (XRF) for Y2 and Z2 cans.

In one embodiment, the aluminum alloy compositions of the BPA-NI epoxy can bodies produced by manufacturers Y and Z were analyzed via X-ray fluorescence (XRF) spectroscopy, as shown in FIG. 19. These sources were selected because they employed the same nominal liner chemistry, thereby isolating alloy composition as a variable. Results were semi-quantitative, as calibration standards were not included. Among detected elements, only chromium (Cr) exhibited variation exceeding 20%, with the Z series containing approximately three-fold higher Cr than Y. Given that Cr is typically present in the Al 3004 alloy at concentrations below 0.05%, this difference was unlikely to materially influence $H_2S$ evolution. Other trace elements such as copper (Cu), which in its soluble Cu(II) state can complex with or sequester sulfide species, showed differences below 20%, further suggesting that bulk alloy composition alone does not explain the observed variability in $H_2S$ accumulation.

Figure 20:
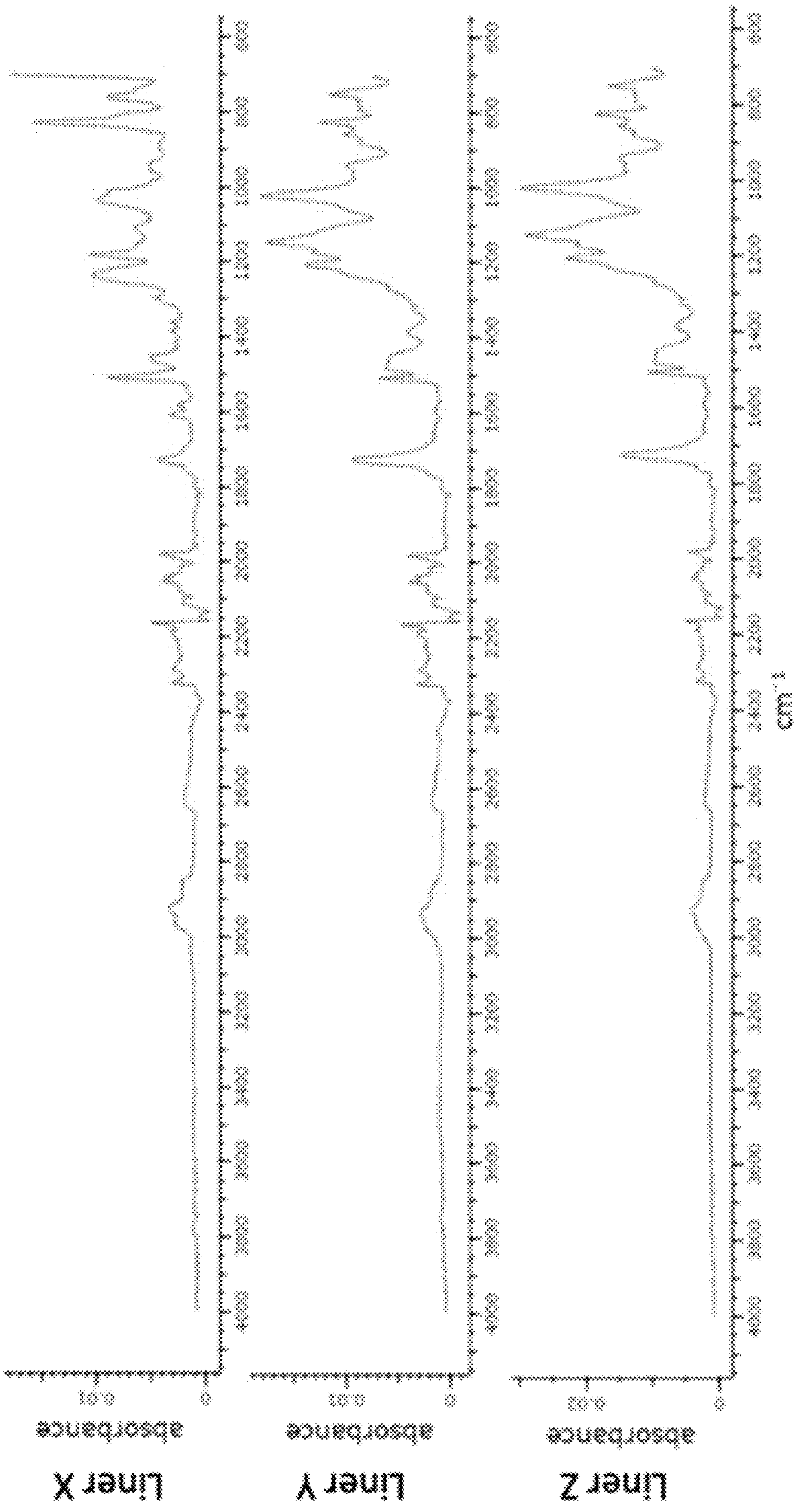
FIG. 20 illustrates an FTIR-ATR spectra of three liners (on aluminum substrate) used in a long-term storage experiment.

In an embodiment, polymeric liner composition may be characterized using Fourier-transform infrared spectroscopy with attenuated total reflectance (FTIR-ATR). Representative spectra for liners extracted from cans $X_1$, $Y_2$, and $Z_2$ are shown in FIG. 20. The BPA epoxy liner ($X_1$) exhibited minor spectral differences from the two BPA-NI epoxy liners ($Y_2$ and $Z_2$), but the latter two appeared identical, consistent with manufacturer documentation identifying both as Valspar V70 (tetramethyl bisphenol F) coatings. Major peaks were observed at approximately 1725, 1510, 1210, 1140, and 1030 $cm^{-1}$, corresponding to characteristic carbonyl stretching, aromatic ring vibration, and C—O—C epoxy linkages. In some embodiments, FTIR-based compositional data may be incorporated into the predictive compatibility model as feature vectors representing resin class, curing agent, and relative cross-link density for correlation with observed stability outcomes.

In some embodiments, liner integrity may be evaluated using electrochemical and optical methods, including enamel-rating (DC current) testing, electrochemical impedance spectroscopy (EIS), acid-copper displacement assays, and adhesion testing. Metal-exposure analysis (enamel rating) applies a direct-current potential (typically 6.3 V) across the can wall, with the measured current proportional to the exposed metal surface area. Industrial quality-control thresholds vary with beverage corrosivity; for example, a 75 mA cutoff is common for beer, whereas a≤5 mA threshold is recommended for acidic beverages such as wine. In the present study, enamel-rating currents for all three long-term test cans were below 4 mA, indicating minimal direct exposure of aluminum. Testing of the visibly defective $Y_2$-2 cans produced only two failures among fifteen samples, likely because an insulating $Al_2O_3$ layer had passivated exposed regions before analysis. These findings suggest that enamel-rating may be less sensitive when evaluating aged or pre-oxidized cans and may be more applicable for in-process manufacturing control than for end-user quality validation.

EIS analysis, employing an alternating-current potential, provides a complementary measure of liner barrier performance by modeling the can-liner system as a resistor-capacitor (RC) circuit. In the current study, impedance was measured at 0.05 Hz, an accepted proxy for corrosion resistance, yielding average values near 10 MΩ, exceeding the minimum recommended threshold for corrosion prevention. No statistically significant differences were detected among the three can sources, which was unexpected given prior literature suggesting that lower impedance correlates with poorer long-term performance. Without being bound by theory, it is possible that the highly reactive components of wine, especially $SO_2$, progressively degrade epoxy-based liners during extended storage, a phenomenon not observable in the short-term EIS tests conducted within one hour of filling. Future embodiments may incorporate time-series EIS measurements into predictive maintenance or liner-degradation models to capture dynamic changes in impedance over storage periods exceeding 14 days. Acidified copper-sulfate testing of unused cans did not reveal visible copper deposition or aluminum-sulfate precipitation, suggesting the absence of macroscopic voids (≥0.05 mm). Likewise, ASTM D3359-17 adhesion testing showed no measurable liner delamination, confirming acceptable adhesion strength for all liners evaluated. However, it is noted that oxide-layer formation between manufacturing and testing may have reduced the sensitivity of both assessments.

Liner-thickness measurements were obtained by laser-scanning profilometry on uniformly coated regions. The $Z_2$ cans exhibited an average liner thickness of 3.27 μm±0.37 μm, significantly greater than $Y_2$ (2.96 μm±0.35 μm), while the $X_1$ cans were intermediate (3.01 μm+0.43 μm). Although this ≈10% increase in mean thickness could contribute to the improved stability of the $Z_2$ cans, profilometry also revealed a higher proportion of thin-coating areas (<0.5 μm) and localized aluminum exposure in $Z_2$ relative to the other groups. Accordingly, overall liner thickness alone is not sufficient to explain reduced $H_2S$ generation; rather, uniformity and coating continuity across the interior surface appear more critical.

In some embodiments, liner-thickness maps, adhesion test results, and impedance data may be digitized and supplied to at least a processor as part of a liner-quality feature set. The processor may apply statistical regression, clustering, or feature-importance ranking to determine which liner characteristics most strongly correlate with observed packaging-stability outcomes. The resulting trained compatibility model may then predict performance of new liner formulations or flag batches exhibiting risk of premature degradation. Accordingly, the structural and electrochemical characterization data described in connection with FIG. 8 demonstrate that both chemical composition and manufacturing uniformity influence liner performance. These empirical results provide foundational input features for the predictive compatibility model disclosed herein, which leverages such multidimensional data to refine liner-selection algorithms, optimize canning parameters, and minimize the likelihood of post-packaging chemical instability events.

With continued reference to FIG. 8, in some embodiments, cans sourced from manufacturer Z and manufacturer V exhibited distinct performance advantages under accelerated aging conditions. Specifically, manufacturer Z's BPA epoxy and manufacturer V's BPA-NI epoxy slim-format cans produced minimal hydrogen sulfide ($H_2S$) accumulation in the accelerated-aging protocol (corresponding to FIG. 7) and were characterized by significantly greater average liner thicknesses (as shown in FIG. 8) relative to the remaining liner types analyzed (Student's t-tests, $p<0.05$). Notably, these cans maintained lower $H_2S$ formation despite a comparatively larger internal surface area, suggesting that liner thickness and uniformity may outweigh surface-area-driven effects in governing gas evolution and corrosion resistance. In some embodiments, these findings indicate that at least a processor may assign elevated compatibility weights or quality-confidence parameters to liner formulations exhibiting increased mean coating thickness coupled with minimal $H_2S$ generation, even where the geometric exposure area would predict higher reactivity. This relationship reinforces that liner microstructure and polymer continuity are dominant factors within the predictive compatibility model's stability-scoring framework, rather than overall can geometry alone.

Figure 9:
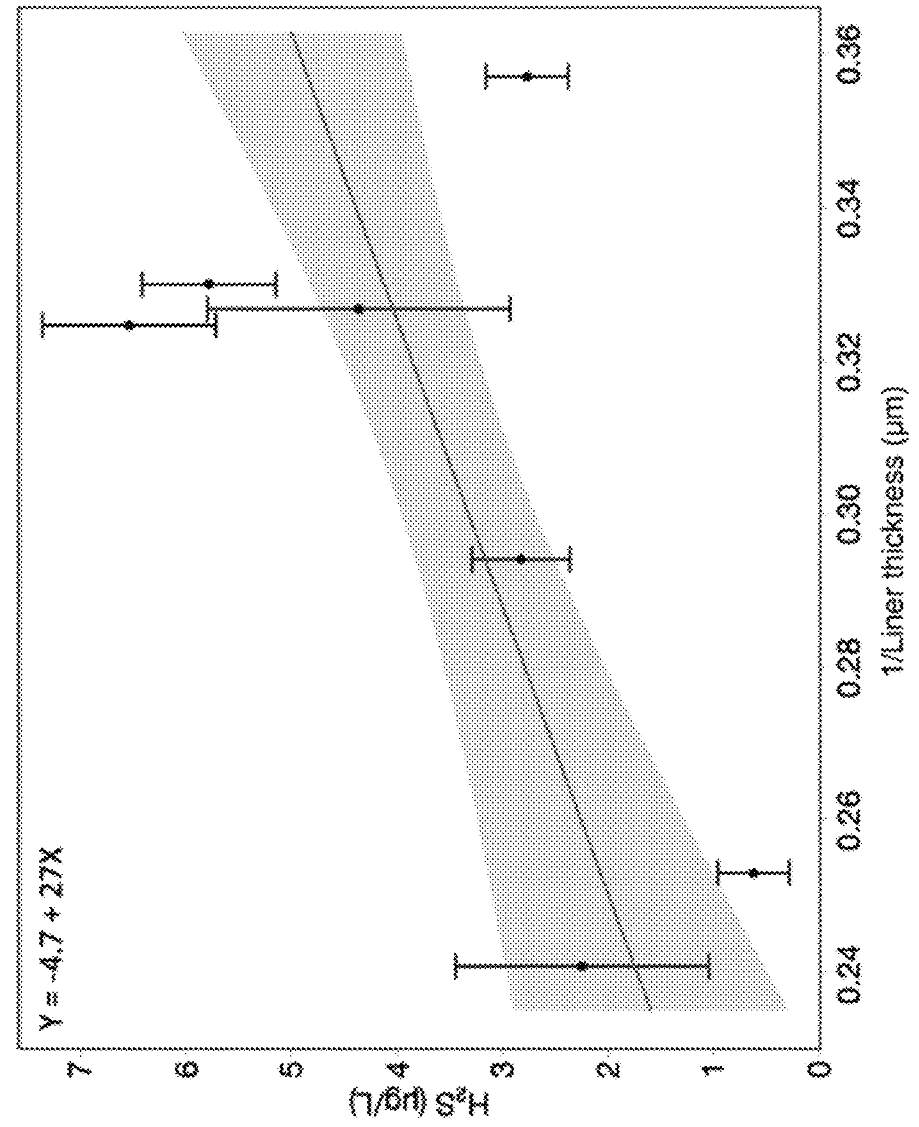
FIG. 9 is a graphical representation of hydrogen sulfide ($H_2S$) formation after three days at 50° C. versus inverse liner thickness for epoxy lined cans.

With reference now to FIG. 9, a graphical representation of hydrogen sulfide ($H_2S$) formation after three days at 50° C. versus inverse liner thickness for epoxy lined cans (BPA and BPA-NI) is illustrated. Each point represents the average $H_2S$ for a different liner (n=8 technical replicates per liner). Error bars represent one standard error. In some embodiments, at least a processor may perform a regression analysis of the inverse liner-thickness values against the measured hydrogen sulfide ($H_2S$) concentrations generated under accelerated-aging conditions. Acrylic liners and the visibly defective Y2-2 cans were excluded from this regression due to their known coating irregularities. For purposes of this disclosure, the "inverse liner thickness" refers to the reciprocal of the measured coating thickness and serves as a proportional estimator for coating permeability and, therefore, the expected rate of sulfur dioxide ($SO_2$) diffusion through the liner. A statistically significant correlation was observed between the inverse of liner thickness and the amount of $H_2S$ produced, indicating that thinner or more permeable coatings permit enhanced $SO_2$ transport and subsequent reductive sulfur formation.

In some embodiments, the system may further identify that liner-thickness uniformity, represented by the standard deviation of the thickness measurements, plays a critical role in determining overall compatibility. The two liner groups that produced the least $H_2S$, namely Y2-3 and Z1 (see FIG. 7), also exhibited the lowest standard deviations in liner thickness (see FIG. 8), suggesting that consistency of coating application, rather than absolute mean thickness alone, governs diffusion stability. Without being bound by theory, it is postulated that micro-thin or under-cured regions may act as preferential diffusion channels, accelerating localized $SO_2$ permeation and thus $H_2S$ generation. Interestingly, the cans with the thinnest average liner, designated Y2-3, produced intermediate amounts of $H_2S$, despite their reduced thickness. These cans were identified as "soda-weight" or "beer-weight" designs intended for lower-acidity products and thus received a thinner coating and lower cure temperature than "hard-to-hold" beverage cans (e.g., those used for wine, sour beer, or kombucha). All other cans in the study were designed for these more reactive beverage classes and therefore featured thicker liners and more stringent quality-control validation (e.g., enamel-rater and cure-integrity testing). This distinction supports the inference that manufacturing classification and thermal cure parameters may be integrated as categorical variables in the predictive compatibility model to account for performance variation across intended product categories.

Although the acrylic liner group (Y3) displayed the highest average liner thickness among all evaluated samples (see FIG. 8), it nonetheless exhibited substantial $H_2S$ accumulation. This observation is consistent with prior findings demonstrating that $SO_2$ and other wine constituents can chemically degrade acrylic resins, compromising liner integrity and exposing the underlying aluminum substrate. Accordingly, the system may assign a lower compatibility weighting to acrylic-based formulations, regardless of nominal coating thickness, due to their known chemical instability under acidic, $SO_2$-rich conditions. In further embodiments, liner-thickness data may also be acquired by optical interferometry to validate profilometric results across broader surface regions. Interferometric analysis yields averaged thickness values across 1-2 $mm^2$ sampling windows, providing macro-level thickness mapping but without micron-scale precision. For the three can sources evaluated in long-term storage studies. The order of average and minimum thickness (Z>X>Y) measured by interferometry matched that observed using laser-scanning profilometry, confirming consistency across measurement techniques. In some embodiments, such redundant measurement data may be supplied to at least a processor for cross-validation, outlier detection, or error-propagation modeling within the liner-quality assessment module of the system. Accordingly, the empirical correlation between inverse liner thickness and $H_2S$ formation depicted in FIG. 9 demonstrates that the permeability and uniformity of the polymeric barrier are primary determinants of chemical stability. These findings substantiate the predictive compatibility model's underlying logic, wherein liner-thickness metrics and their statistical dispersion are incorporated as input features for estimating diffusion-limited reaction probabilities, guiding both liner selection and recommended coating specifications for future canning operations.

Figure 10:
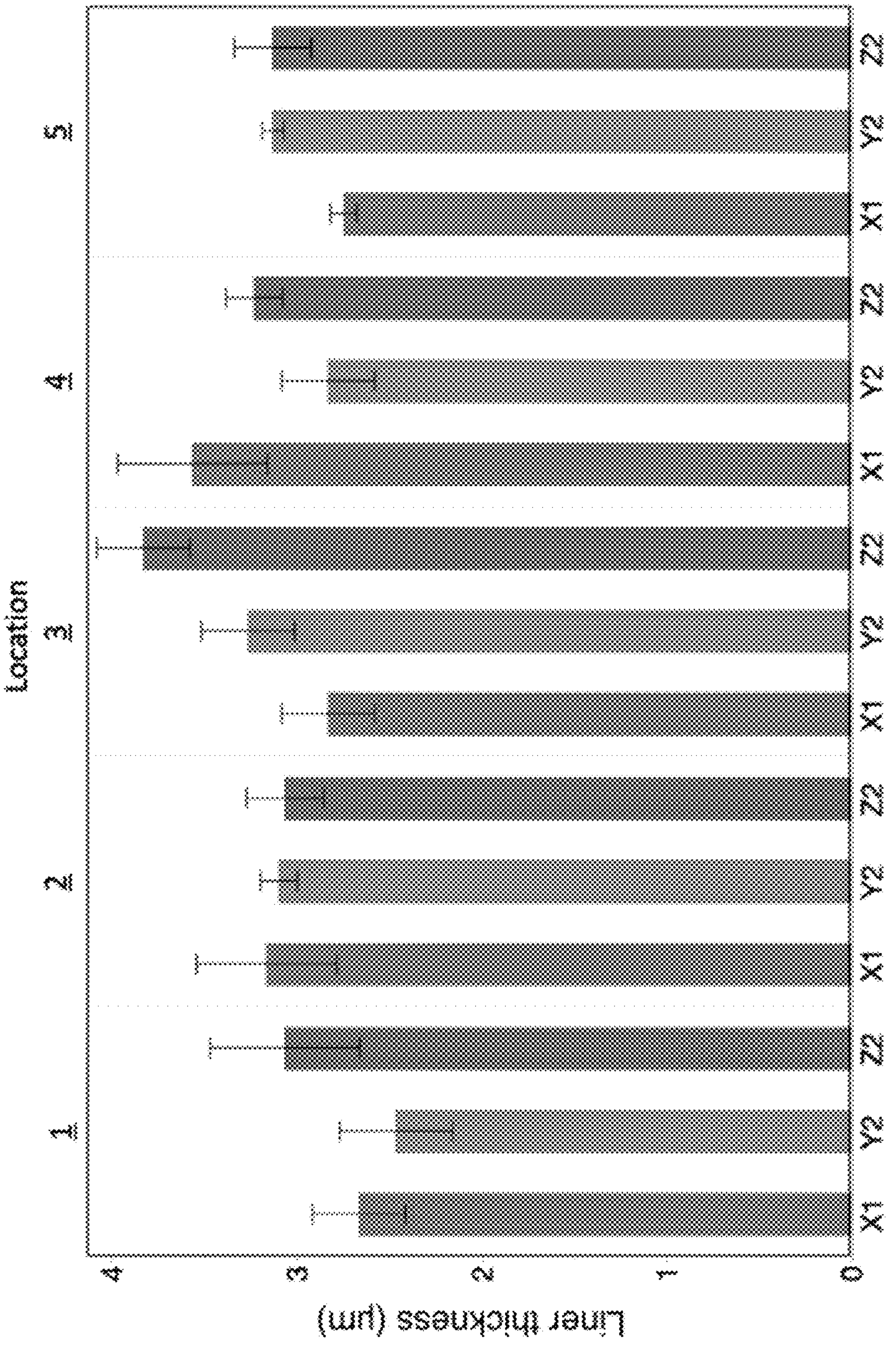
FIG. 10 is a graphical representation of liner thickness measurements by laser-scanning profilometry, measured across cans (X1, Y2, and Z2)

With continued reference to FIG. 10, a graphical representation of liner thickness measurements by laser-scanning profilometry, measured across the cans (X1, Y2, and Z2). Three technical replicates were analyzed. Error bars represent one standard deviation. X1, Y2, Z2: X, Y, and Z signify the can manufacturer; 1 and 2 signify the liner type (BPA epoxy and BPA-NI epoxy, respectively). For example, Y2 indicates a BPA-NI epoxy can from manufacturer Y. In some embodiments, liner-thickness measurements were also obtained for the underside of can ends, which are regions that rarely exhibit visible corrosion during long-term storage. Measurements were taken on flat portions of the can end to ensure optical uniformity, and the average liner thickness was determined to exceed approximately 8 μm, roughly threefold greater than the corresponding thicknesses observed in the can body. Without being bound by theory, this increased thickness is believed to contribute to the enhanced corrosion resistance commonly observed in these regions, as the augmented polymer barrier limits both oxygen ingress and sulfur dioxide ($SO_2$) permeation into the underlying aluminum substrate. In some embodiments, liner-thickness mapping was performed across multiple internal locations within the can body and headspace for the three can sources evaluated in long-term aging trials. Measurements were conducted by laser-scanning profilometry, as schematically represented in FIG. 2 and graphically summarized in FIG. 10, encompassing five distinct sampling sites along the can interior. The thinnest liner coverage (~2.5 μm) was consistently observed in the upper headspace region (Location 1) of the Y2 cans, correlating with elevated hydrogen sulfide ($H_2S$) formation previously measured in that same region.

In some embodiments, this spatial correlation between liner thickness and $H_2S$ generation supports the inference that regions exhibiting thinner or non-uniform coatings demonstrate shorter onset times for measurable gas accumulation, assuming equivalent beverage composition and environmental conditions. Accordingly, the system may be configured such that at least a processor integrates localized liner-thickness data into the predictive compatibility model as a spatial weighting factor, enabling simulation of corrosion initiation thresholds and time-to-failure predictions across distinct can zones. Such spatially resolved modeling may further inform targeted coating-process optimization or liner-reinforcement recommendations for high-risk areas, particularly in the upper headspace region where coating stress and thermal variability during curing are greatest.

In some embodiments, experimental validation confirmed that the molecular sulfur dioxide ($SO_2$) fraction of total sulfites represents the most reliable predictor of hydrogen sulfide ($H_2S$) formation during long-term storage of canned wine compositions across a range of beverage formulations and liner chemistries. Significant variability in both $H_2S$ accumulation and visible corrosion was observed not only among cans incorporating different polymeric liner materials, but also among cans utilizing nominally identical liner chemistries sourced from different manufacturers. Furthermore, can-to-can variation within a single manufacturer's production batch was found to be non-negligible, indicating that micro-scale differences in coating application, curing, or substrate treatment may materially influence stability performance.

In some embodiments, physical, optical, and mechanical integrity assessments of unused cans, such as enamel rating, adhesion, and impedance spectroscopy, did not consistently predict long-term corrosion or gas-evolution behavior. However, statistical correlation analysis demonstrated that performance variation among can groups was modestly associated with differences in liner thickness and uniformity, supporting the inference that coating geometry plays a partial, but not exclusive, role in mediating chemical stability. Without being bound by theory, it is postulated that liner degradation through chemical reaction with dissolved sulfites, rather than purely mechanical failure, represents a primary initiation pathway for corrosion and $H_2S$ formation.

These findings collectively suggest that the combination of initial liner thickness and intrinsic chemical resistance of the coating material to sulfur-containing species governs overall packaging stability. In some embodiments, the system disclosed herein may incorporate these empirical relationships into a predictive compatibility model that weights liner chemical composition and geometric parameters to forecast long-term stability outcomes. Such correlations may further extend beyond wine to other acidified or sulfur-containing products, including functional beverages, kombucha, and fruit-based formulations, where analogous beverage-liner interactions are expected. Accordingly, it is recommended that packaging validation workflows include controlled storage or coupon testing prior to large-scale use of a liner formulation, thereby verifying integrity under representative chemical conditions.

With reference now to FIG. 11, a table illustrating initial composition of wines used in the long-term canning study is shown. In some embodiments, the initial composition of the beverage formulations used in the long-term canning study is provided as exemplary input data for the system's predictive compatibility model. For purposes of this disclosure, FIG. 10 illustrates representative analytical parameters obtained from five commercial wine samples, including but not limited to pH, titratable acidity (TA), alcohol by volume (ABV), free sulfur dioxide ($SO_2$), molecular $SO_2$, and dissolved oxygen ($dO_2$). Each parameter corresponds to a defined "chemical parameter" of the beverage composition profile as previously described.

In an embodiment, the dataset represented in FIG. 11 may be used to populate the initial beverage composition profiles received by at least a processor prior to defining composition adjustment thresholds. These parameter values may serve as baseline conditions from which permissible deviations are determined and from which liner-compatibility simulations are initiated. The table further illustrates variability among different beverage types, such as Pinot Grigio, Sauvignon Blanc, French Rosé, sparkling Rosé, and sparkling White, demonstrating the system's applicability across diverse formulations. Accordingly, FIG. 11 provides an illustrative example of the chemical input space upon which the predictive compatibility model operates. It is understood that the particular values shown are non-limiting and may vary according to beverage category, analytical method, and intended packaging configuration. In some embodiments, the system may dynamically normalize or standardize these values prior to model inference to ensure consistency across datasets collected from different analytical sources or production environments.

With reference now to FIG. 12A, a table of parameters for open circuit potential testing is shown. In some embodiments, parameters for open circuit potential (OCP) testing are presented to illustrate the electrochemical validation conditions used to assess liner integrity and aluminum corrosion susceptibility. For purposes of this disclosure, the OCP test measures the equilibrium potential between the can substrate and a reference electrode in the absence of externally applied current, providing a non-destructive indication of the coating's barrier performance. In an embodiment, FIG. 12A presents representative experimental parameters including electrolyte composition, electrode configuration, stabilization criteria, potential drift thresholds, and measurement duration. Each parameter defines an operational boundary condition that the system may replicate when simulating corrosion-onset scenarios or calibrating predictive liner degradation models. For example, in a hardware-integrated embodiment, at least a processor may access stored OCP parameter sets to control an automated testing apparatus and record voltage drift data for use in liner performance scoring.

It will be understood that the parameters listed in FIG. 12A are exemplary and non-limiting. Variations in electrolyte concentration, reference electrode type, or stabilization criteria may be implemented without departing from the scope of the disclosed embodiments. The dataset presented in FIG. 11 thus serves as an example of how electrochemical measurement conditions can be formalized for system calibration, model training, or quality-assurance workflows.

With reference now to FIG. 12B, a table of parameters for electrochemical impedance spectroscopy testing is shown. In some embodiments, parameters for electrochemical impedance spectroscopy (EIS) testing are provided to illustrate representative electrochemical conditions for evaluating the barrier performance and degradation behavior of polymeric liners. For purposes of this disclosure, EIS testing involves the application of an alternating current (AC) signal across the liner-electrolyte interface while measuring impedance as a function of frequency, thereby characterizing both resistive and capacitive components of liner integrity. In an embodiment, FIG. 12B depicts exemplary testing parameters including frequency range, AC amplitude, applied DC bias, open-circuit potential (OCP) stabilization period, electrolyte composition, and data-acquisition intervals. Each of these parameters establishes the baseline conditions under which impedance spectra are collected and subsequently analyzed using equivalent-circuit models to infer coating porosity, adhesion, and corrosion susceptibility. In some embodiments, at least a processor may be configured to access the parameter schema of FIG. 12B to standardize laboratory or in-situ EIS testing routines, ensuring repeatable data capture across production facilities.

It will be appreciated that the specific parameters shown in FIG. 12B are exemplary and may be varied according to the electrolyte system, liner chemistry, or measurement instrumentation without departing from the scope of the disclosed embodiments. In an embodiment, EIS parameters such as those shown in FIG. 12B may be stored as metadata linked to individual liner performance records, enabling correlation between electrochemical response and predicted long-term packaging stability.

Figure 13:
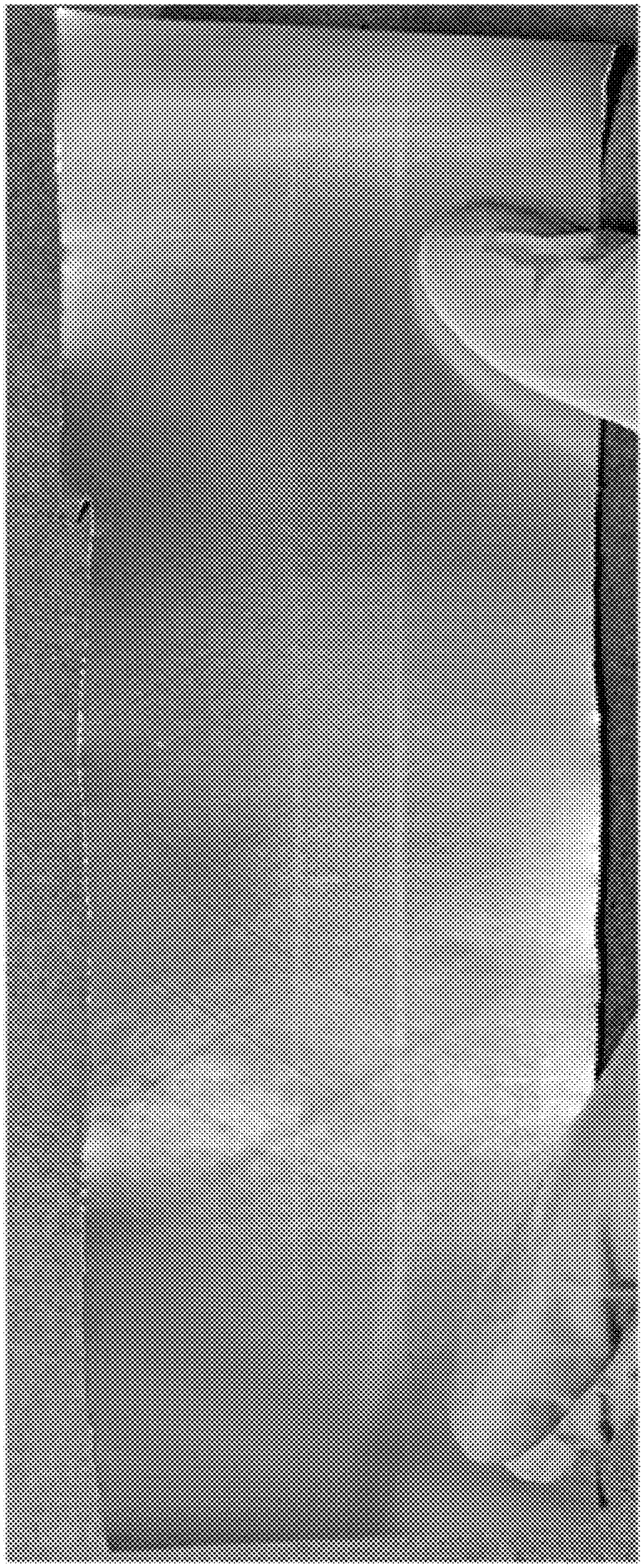
FIG. 13 is an illustration of a can body with the top and bottom removed.

With reference now to FIG. 13, an illustration of a can body with the top and bottom removed is shown. In some embodiments, a schematic representation of a prepared aluminum can body is shown, with the top and bottom sections removed to facilitate liner evaluation and coupon preparation. For purposes of this disclosure, removal of the top and bottom portions of the can allows access to the internal surface of the cylindrical body for subsequent sectioning, cleaning, and analytical characterization. In an embodiment, the can body depicted in FIG. 13 may correspond to the configuration used for preparing aluminum coupons for accelerated aging trials or for optical and electrochemical liner assessments. In some embodiments, at least a processor may receive digital or imaging data corresponding to a can body configuration such as that shown in FIG. 13 to index the sampling regions and associate analytical measurements (e.g., liner thickness, corrosion scoring, impedance spectra) with specific spatial coordinates. This enables traceable correlation between experimental data and geometric position within the container, which may later inform feature mapping or model refinement in the predictive compatibility framework.

Figure 14:
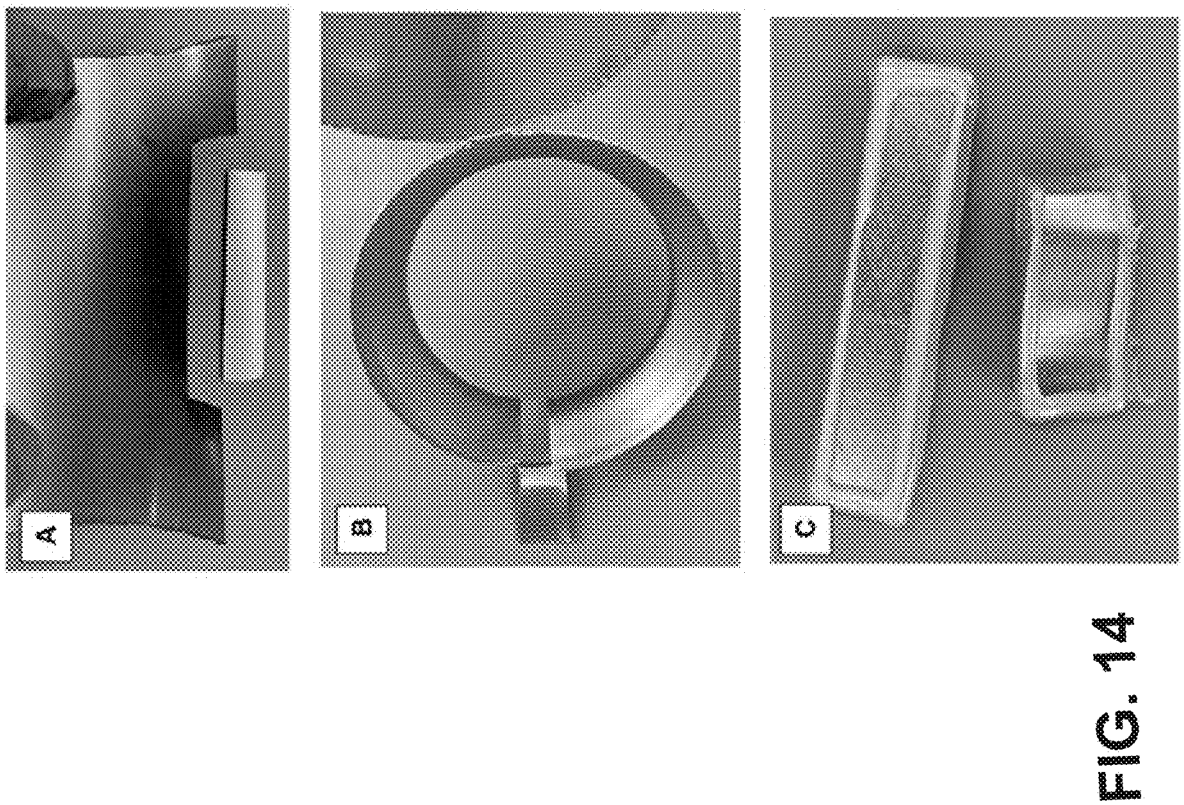
FIG. 14 illustrates exemplary locations and configurations of aluminum coupons used for accelerated aging texting, including (A) body-region coupons, (B) headspace-region coupons, and (C) sealed-edge coupons prepared with hot-melt adhesive to prevent bare aluminum exposure during testing.

With reference now to FIG. 14, illustrated is exemplary locations and configurations of aluminum coupons used for accelerated aging texting, including (A) body-region coupons, (B) headspace-region coupons, and (C) sealed-edge coupons prepared with hot-melt adhesive to prevent bare aluminum exposure during testing. in some embodiments, representative sampling locations and coupon configurations used for accelerated aging testing are shown. (A) body illustrates exemplary coupon sections obtained from the body region of an aluminum can, while (B) headspace illustrates coupons sectioned from the headspace region of the can. Each coupon represents a defined area of liner-coated substrate selected for evaluation under controlled chemical and thermal conditions. For purposes of this disclosure, such coupons are used to replicate the localized liner-beverage interactions occurring in distinct geometric regions of the full container.

As shown at location C, the exposed aluminum along the cut edges of each coupon may be sealed using a hot-melt adhesive material (e.g., ethylene-vinyl acetate), thereby isolating the coated surface and preventing direct exposure of bare aluminum during immersion testing. In an embodiment, sealing the edges with a non-reactive polymer ensures that observed chemical or electrochemical responses arise exclusively from liner-beverage interactions rather than edge corrosion or galvanic interference. In some embodiments, at least a processor may receive image data, coordinate mappings, or metadata corresponding to coupon geometry and sampling location, such as those depicted in FIG. 14, to contextualize analytical results (e.g., $H_2S$ formation, impedance spectra, or color shift metrics) by physical region. This allows the predictive compatibility model to associate liner performance with spatial variables, such as curvature, headspace proximity, or localized coating thickness, enhancing spatially resolved corrosion prediction accuracy.

Figure 15:
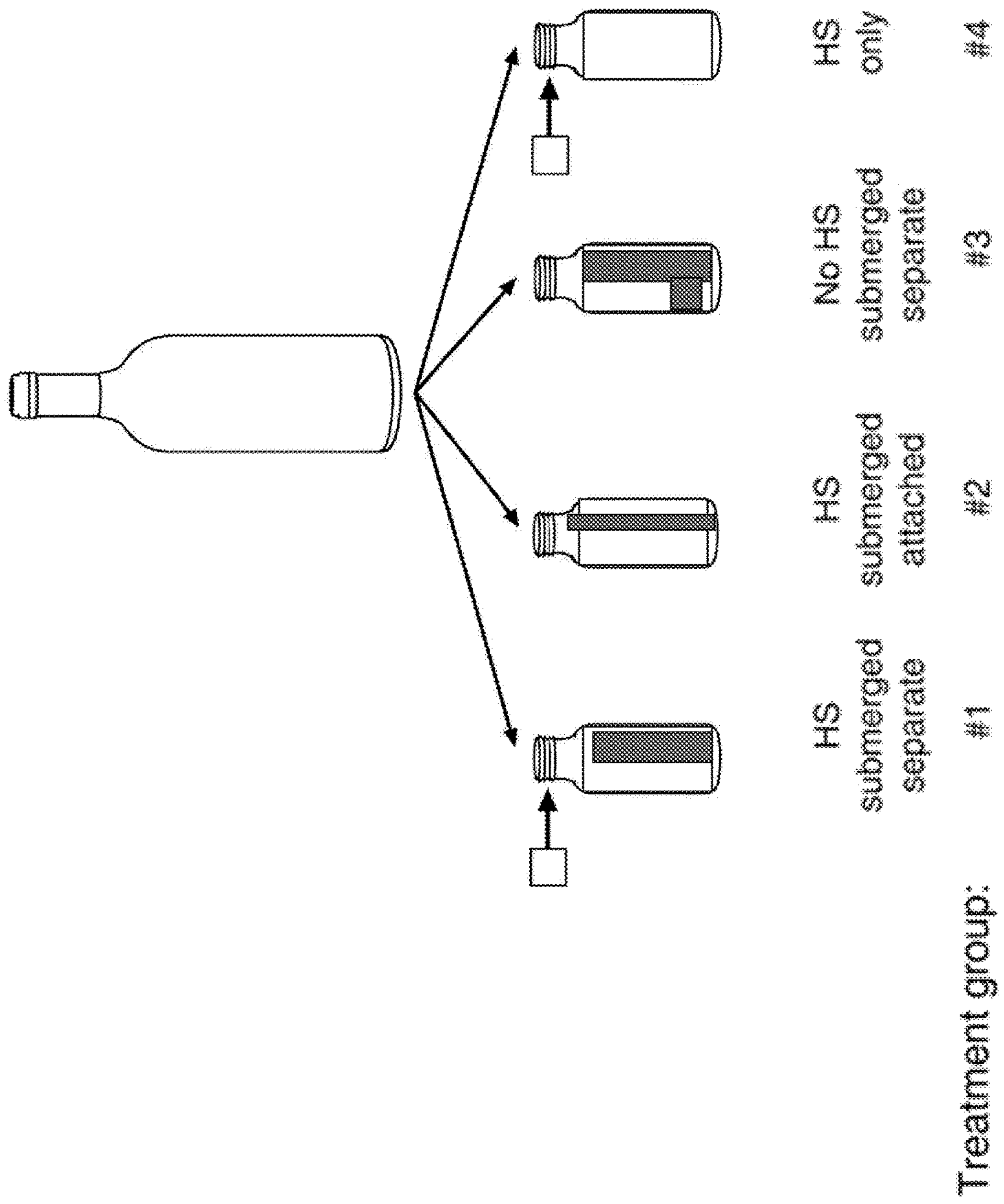
FIG. 15 illustrates an exemplary experimental design for comparing immersed and non-immersed aluminum surfaces during accelerated aging, showing coupon orientations corresponding to headspace (HS) and submerged exposure regions.

With reference now to FIG. 15, illustrated is an exemplary experimental design for comparing immersed and non-immersed aluminum surfaces during accelerated aging, showing coupon orientations corresponding to headspace (HS) and submerged exposure regions. Four technical replicates were performed for each treatment configuration. FIG. 15 illustrates an experimental configuration for evaluating the relative effects of immersed and non-immersed aluminum surfaces on hydrogen sulfide ($H_2S$) formation during accelerated aging. For purposes of this disclosure, the arrangement shown in FIG. 15 demonstrates the orientation of coated aluminum coupons within sealed vials, allowing comparative analysis of headspace-exposed (HS) and liquid-immersed regions under identical thermal and chemical conditions.

In an embodiment, FIG. 15 depicts four representative coupon orientations, each corresponding to a unique combination of immersion depth and exposure environment. These configurations include fully submerged coupons, partially submerged coupons with defined vapor exposure area, and headspace-mounted coupons affixed to vial septa. Each configuration was tested in quadruplicate (four technical replicates per treatment), enabling statistical evaluation of $H_2S$ generation as a function of surface exposure. In some embodiments, at least a processor may associate experimental configuration metadata, such as coupon orientation, immersion depth, and exposure time, with observed $H_2S$ concentrations to parameterize a corrosion-reaction model within the predictive compatibility framework. This allows the system to distinguish between liquid-phase and vapor-phase reaction dynamics and to quantify how liner exposure geometry affects gas-phase sulfur accumulation.

Figure 16:
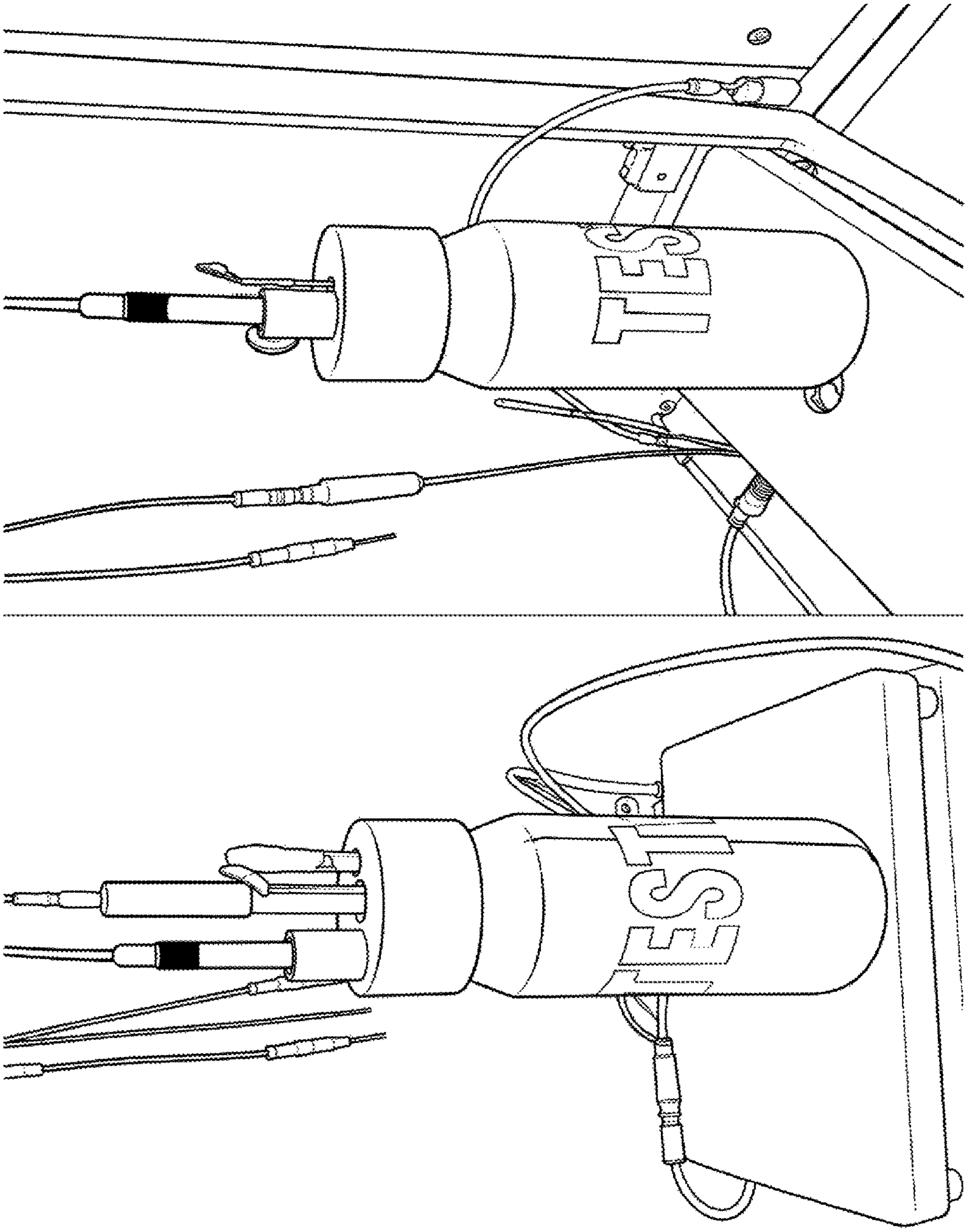
FIG. 16 illustrates an exemplary electrochemical impedance spectroscopy setup, showing a counter electrode (left), reference electrode (center), and working electrode (bottom of can)

With reference now to FIG. 16, illustrated is an exemplary electrochemical impedance spectroscopy setup, showing the counter electrode (left), reference electrode (center), and working electrode (bottom of can). The electrochemical cell is positioned inside a grounded Faraday cage to eliminate electromagnetic interference during measurement. In some embodiments, an electrochemical impedance spectroscopy (EIS) testing arrangement is illustrated for characterizing the electrical and barrier properties of can liners. As depicted, the system includes a counter electrode positioned on the left, a reference electrode centrally located, and a working electrode in electrical contact with the bottom of the can under evaluation. The can is filled with an electrolyte solution and functions as the electrochemical cell during testing. In an embodiment, the electrochemical cell is housed within a grounded Faraday cage, as shown in FIG. 16, to minimize external electromagnetic interference during measurement. This configuration ensures signal integrity and reproducibility when determining open-circuit potential and frequency-dependent impedance characteristics.

In some embodiments, the EIS system may be configured to generate frequency sweeps over a defined range (e.g., $10^5$ Hz to $10^{-2}$ Hz) while applying alternating-current (AC) excitation. The resulting data can be modeled as an equivalent circuit (e.g., resistor-capacitor pair) to estimate coating resistance, charge-transfer resistance, and double-layer capacitance associated with the polymeric liner. The collected measurements may be processed by at least a processor to determine liner integrity, degree of porosity, or onset of electrochemical degradation.

Figure 17:
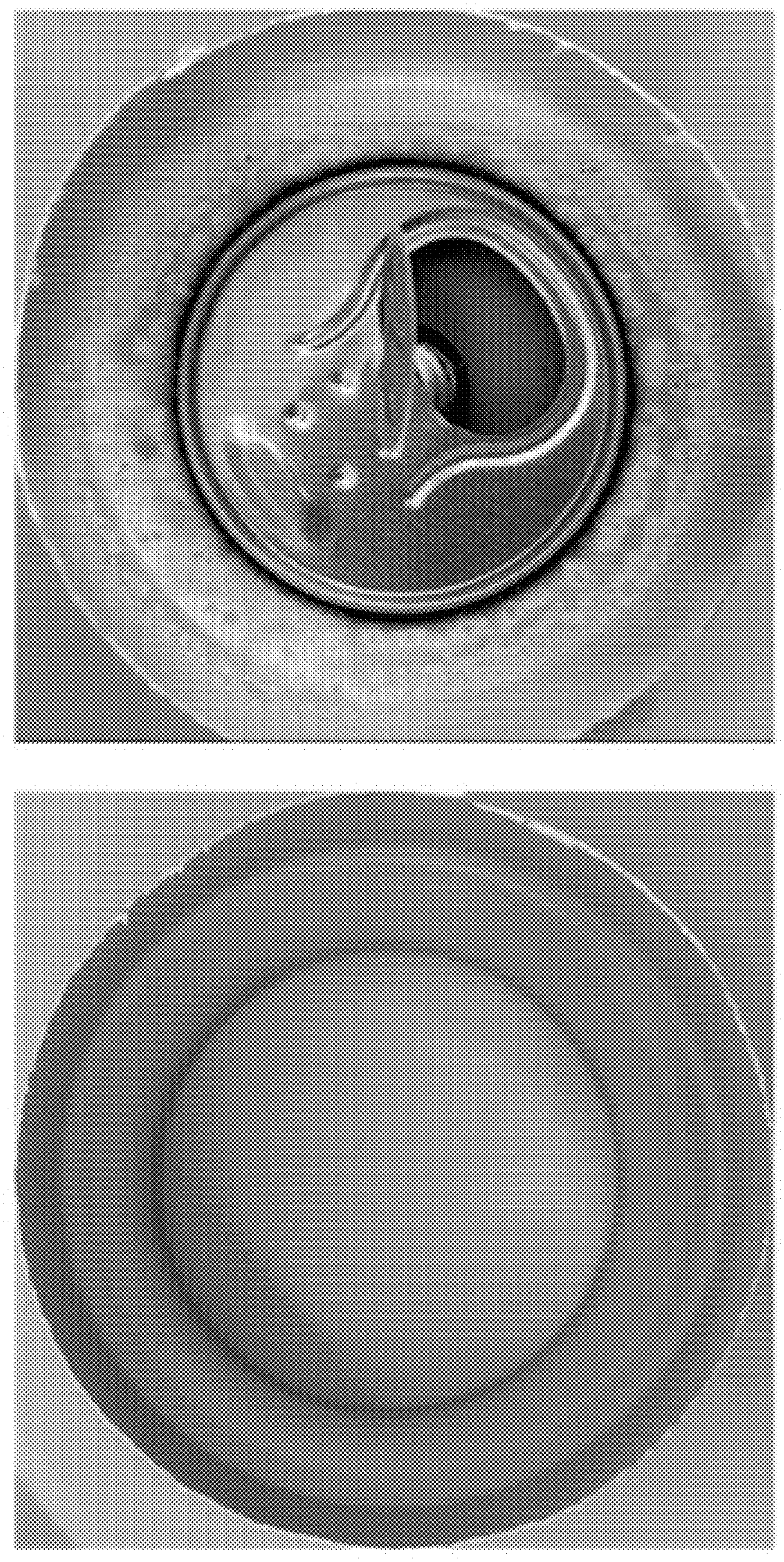
FIG. 17 illustrates a visual comparison between an unused can with no corrosion (left) and a used can exhibiting corrosion localized to the neck region (right)

With reference now to FIG. 17, illustrated is a visual comparison between an unused can with no corrosion (left) and a used can exhibiting corrosion localized to the neck region (right). In some embodiments, comparative visual evidence of corrosion patterns in aluminum beverage cans following long-term storage is shown. FIG. 17 (left) illustrates an unused can interior exhibiting an intact, uniformly coated liner surface with no visible corrosion. FIG. 17 (right) depicts a corresponding can after product storage, showing localized corrosion primarily concentrated in the upper neck region of the container. In an embodiment, the observed corrosion is indicative of liner degradation or reduced coating performance in high-curvature regions, which may experience greater mechanical stress or thinner applied coatings during manufacturing. The neck region often presents a more challenging geometry for achieving uniform liner coverage, making it a potential site for accelerated degradation when exposed to acidic or sulfur-containing beverages.

In some embodiments, the corrosion mapping represented in FIG. 17 can be used to train a predictive liner-failure model, wherein image-based corrosion signatures are correlated with process metadata (e.g., liner thickness, cure temperature, can geometry). The system may thereby automatically identify regions of elevated corrosion susceptibility and adjust liner deposition or quality control parameters accordingly.

Figure 18:
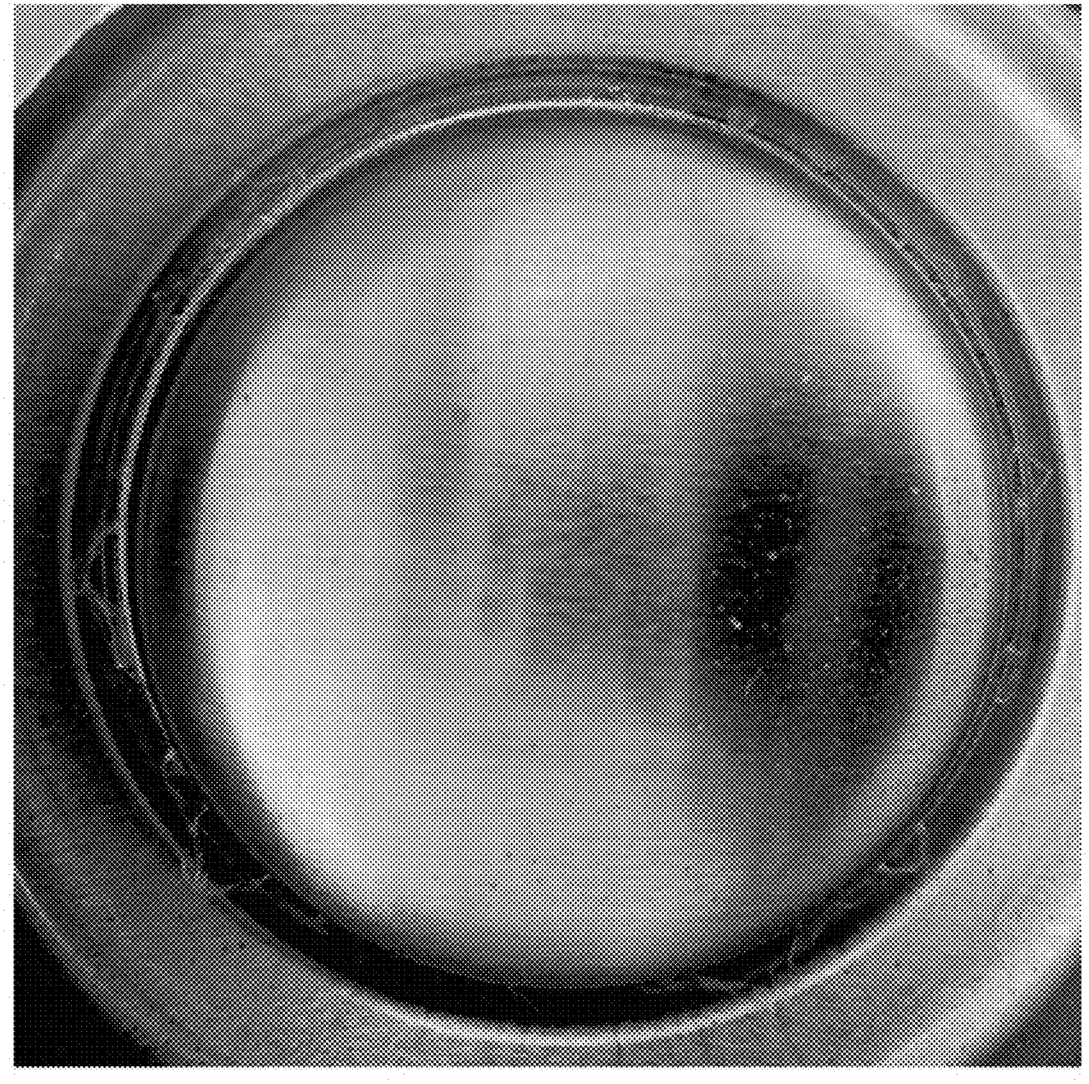
FIG. 18 illustrates visual defects in polymeric lining of a moat region of Y2-2 cans prior to storage.

With reference now to FIG. 18, illustrated is visual defects in the polymeric lining of the moat region of Y2-2 cans prior to storage. The Y2-2 code designates the second batch of BPA-NI epoxy-lined cans from manufacturer Y, tested to evaluate batch-to-batch variation. In some embodiments, representative visual defects are illustrated in the polymeric liner of the "moat" region of certain aluminum beverage cans. The depicted example corresponds to the Y2-2 batch, wherein "Y" denotes the manufacturer and "2" denotes the liner type (BPA-NI epoxy). Multiple production batches from the same manufacturer were evaluated (e.g., Y2, Y2-2, Y2-3) to assess batch-to-batch variability in liner uniformity and integrity.

In some embodiments, as depicted in FIG. 18, the polymeric liner exhibits incomplete coverage and localized thinning along the recessed curvature of the moat region. These areas represent critical weak points where liquid ingress or liner delamination may initiate during product storage, leading to elevated hydrogen sulfide formation or visible corrosion. In an embodiment, batch-to-batch variation in liner application parameters, such as spray angle, viscosity, and cure temperature, may account for the irregularities observed in FIG. 18. Consistent with experimental findings, this batch (Y2-2) produced approximately ten-fold higher $H_2S$ concentrations than other batches of the same liner chemistry, confirming that mechanical or geometric nonuniformities in liner deposition can significantly influence long-term can performance.

With reference now to FIG. 19, illustrated is an elemental analysis by x-ray fluorescence (XRF) for Y2 and Z2 cans. Each sample represents a BPA-NI epoxy-lined can, with three technical replicates analyzed per manufacturer. Y2 and Z2 indicate cans from manufacturers Y and Z, respectively. In some embodiments, comparative results of elemental analysis conducted by x-ray fluorescence (XRF) spectroscopy for cans Y2 and Z2 are shown. Each sample corresponds to a BPA-NI epoxy-lined can, wherein the letter (Y or Z) denotes the manufacturer and the number "2" denotes the liner type. Three technical replicates were analyzed per manufacturer.

As depicted in FIG. 19, both Y2 and Z2 cans exhibited comparable base compositions consistent with Al 3004 alloy specifications, including characteristic peaks for aluminum, manganese, magnesium, and trace transition metals. However, detectable variation in minor alloying elements such as chromium (Cr) and copper (Cu) was observed between the two sources. In particular, manufacturer Z exhibited approximately three-fold higher Cr intensity relative to manufacturer Y, while all other element peak intensities varied by less than 20%. In some embodiments, the relative abundance of alloying elements revealed by XRF spectroscopy may serve as an indicator of metallurgical consistency or manufacturing variability. Although such differences were not found to correlate strongly with hydrogen sulfide ($H_2S$) formation under accelerated or long-term storage conditions, the analysis demonstrates that subtle deviations in alloy composition can be systematically quantified as part of a broader diagnostic workflow for predicting can performance.

With reference now to FIG. 20, illustrated is an FTIR-ATR spectra of three liners (on aluminum substrate) used in the long-term storage experiment. X1, Y2, and Z2 denote can manufacturers X, Y, and Z, respectively; liner types 1 and 2 correspond to BPA epoxy and BPA-NI epoxy formulations. In some embodiments, Fourier transform infrared-attenuated total reflectance (FTIR-ATR) spectra obtained from the polymeric liners of three representative can types (X1, Y2, and Z2) are shown. Each liner was applied on an aluminum substrate and corresponds to a liner formulation used in the long-term storage study. Specifically, the X1 can include a BPA epoxy liner, while Y2 and Z2 cans include BPA-NI epoxy liners. The letters X, Y, and Z signify the respective can manufacturers, and the numerals "1" and "2" designate the liner types.

As depicted in FIG. 20, the FTIR-ATR spectra exhibit strong absorbance bands near 1725 $cm^{-1}$, 1510 $cm^{-1}$, 1210 $cm^{-1}$, 1140 $cm^{-1}$, and 1030 $cm^{-1}$, corresponding to C═O stretching, aromatic C═C vibrations, and ether or hydroxyl-related stretching modes characteristic of epoxy-based coatings. Only minor spectral differences were observed between the BPA epoxy (X1) and BPA-NI epoxy (Y2, Z2) liners, consistent with their similar resin backbones. In an embodiment, the overlapping absorbance profiles of Y2 and Z2 liners indicate that both coatings are likely derived from similar formulations (e.g., tetramethyl bisphenol F epoxy resins such as Valspar V70). However, slight differences in relative peak intensity and baseline shape may reflect variations in cure temperature, film crosslinking, or pigment loading introduced during manufacturer-specific coating processes. Such differences could contribute to the distinct hydrogen sulfide ($H_2S$) generation trends observed in the long-term storage study.

Figure 21:
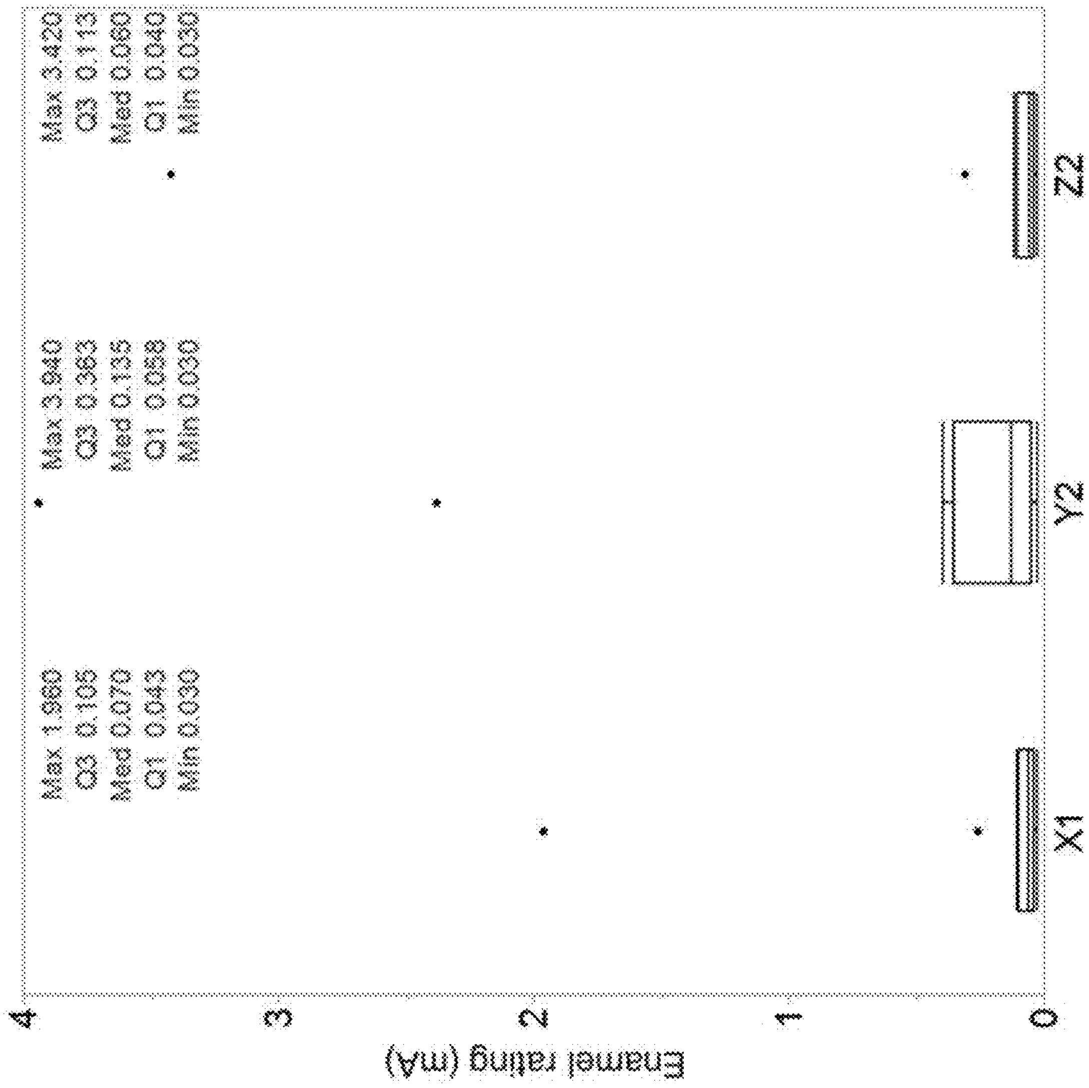
FIG. 21 illustrates metal exposure (enamel) ratings for three can types, X1 (BPA epoxy), Y2 (BPA-NI epoxy), and Z2 (BPA-NI epoxy), used in a long-term aging study (n=48)

With reference now to FIG. 21, illustrated is metal exposure (enamel) ratings for three can types, X1 (BPA epoxy), Y2 (BPA-NI epoxy), and Z2 (BPA-NI epoxy), used in the long-term aging study (n=48). Lower current values correspond to more complete liner coverage and lower metal exposure. In some embodiments, metal exposure ratings, also referred to as enamel ratings, for the three can types evaluated in the long-term storage study are shown. The enamel rating quantifies the extent of exposed aluminum substrate by measuring electrical current flow through an electrolyte in contact with the internal can surface under an applied potential. The three can types include X1 (BPA epoxy), Y2 (BPA-NI epoxy), and Z2 (BPA-NI epoxy). As before, the letters X, Y, and Z designate can manufacturers, and the numerals "1" and "2" designate the liner type.

As illustrated in FIG. 21, enamel rating currents were below 4 mA for all 48 tested samples (n=48), indicating minimal exposed aluminum and adequate liner coverage. No statistically significant differences were detected among the three can groups, suggesting that the liner application met industry specifications for barrier performance at the time of manufacture. The results were well below the threshold of 5 mA generally recommended for highly corrosive beverages such as wine and far below the 75 mA limit typically used for less corrosive beverages such as beer. In an embodiment, these enamel-rating results demonstrate that all three liner types initially exhibited satisfactory electrical insulation properties. However, because long-term $H_2S$ formation and corrosion were later observed to differ among the same can groups, the enamel-rating test alone may not fully predict chemical resistance or performance over time. This finding supports the conclusion that liner-wine chemical compatibility, rather than initial electrical barrier integrity, is the dominant factor influencing can stability during extended storage.

Figure 22:
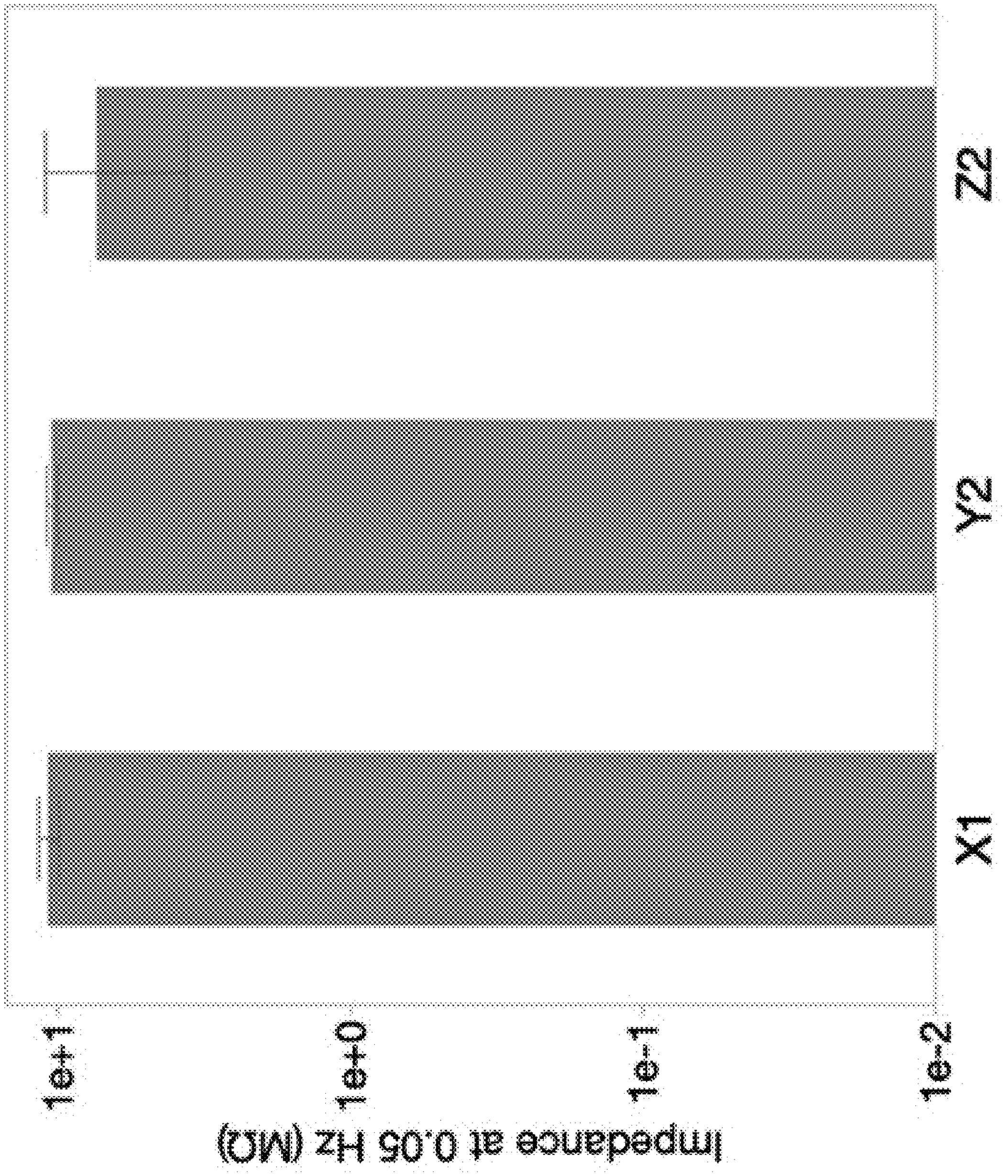
FIG. 22 illustrates impedance values at low frequency (0.05 Hz) for three can types, X1 (BPA epoxy), Y2 (BPA-NI epoxy), and Z2 (BPA-NI epoxy), used in the long-term aging study.

With reference now to FIG. 22, illustrated is impedance values at low frequency (0.05 Hz) for three can types, X1 (BPA epoxy), Y2 (BPA-NI epoxy), and Z2 (BPA-NI epoxy), used in the long-term aging study. Three technical replicates were tested for each can type (n=9). Error bars represent one standard error of the mean. In some embodiments, impedance values measured at a low-frequency operating point (0.05 Hz) for the three can types used in the long-term aging study are shown. The impedance values were obtained by electrochemical impedance spectroscopy (EIS) performed on intact, unused cans filled with a sodium chloride electrolyte. The evaluated can types included X1 (BPA epoxy), Y2 (BPA-NI epoxy), and Z2 (BPA-NI epoxy). As used herein, the letters X, Y, and Z designate can manufacturers, and the numerals "1" and "2" designate the liner type.

As depicted in FIG. 22, all three can types exhibited impedance magnitudes on the order of 10 MΩ at 0.05 Hz, a value consistent with a fully intact and continuous polymeric liner. Each can type was tested in triplicate (n=9 total), and error bars represent one standard error of the mean. No statistically significant differences in impedance were observed among the three liner groups, suggesting comparable initial electrochemical barrier performance across all tested cans. In some embodiments, the absence of significant variation in EIS-derived impedance among the liners indicates that, at time of manufacture, all coatings provided sufficient electrical insulation to limit ion transport through the film. However, long-term differences in hydrogen sulfide ($H_2S$) generation and corrosion behavior, as described elsewhere, imply that impedance measured immediately after filling may not capture liner degradation kinetics that manifest over time. The data therefore underscore that EIS can complement chemical compatibility testing when evaluating can performance for sulfur-containing beverages.

Figure 23:
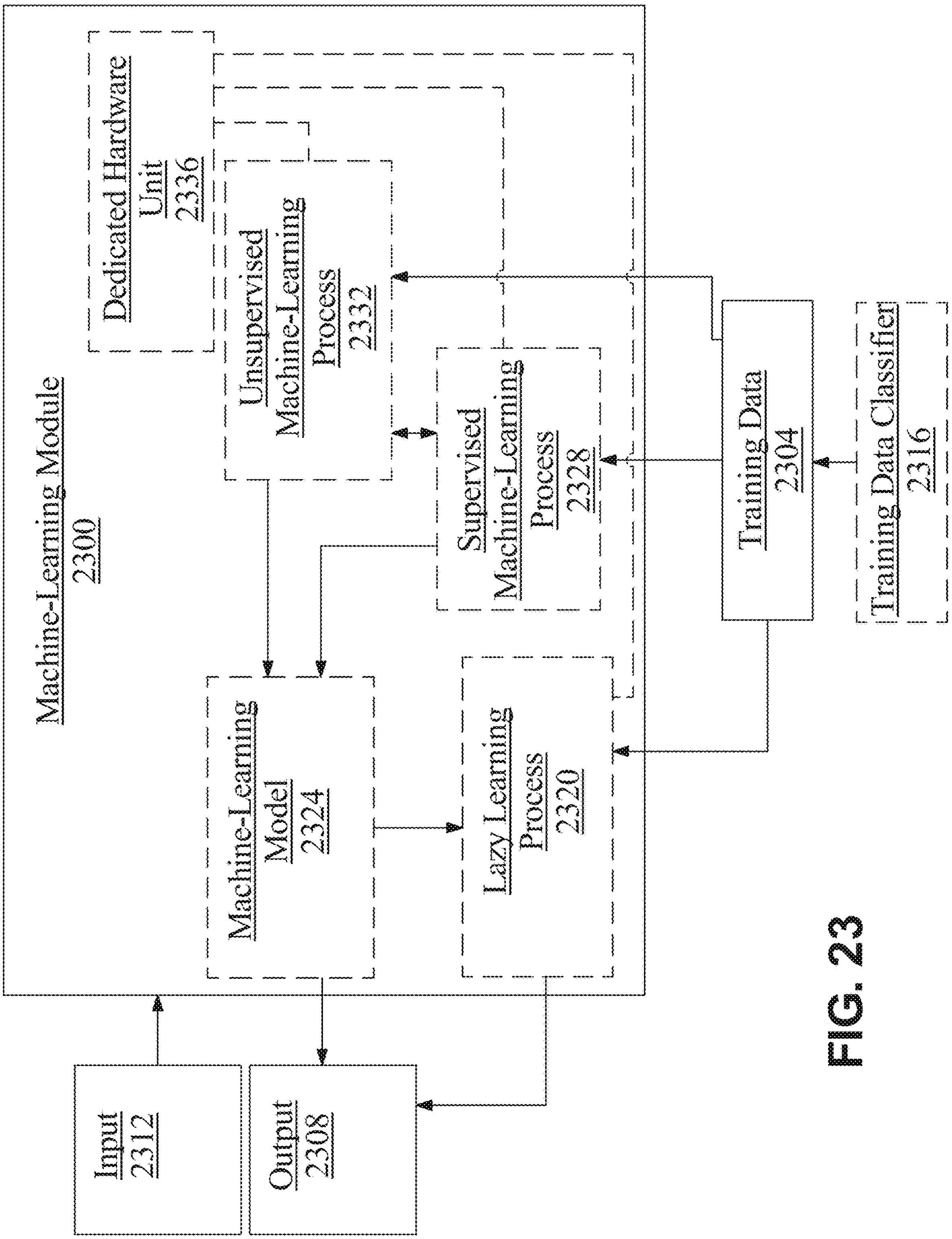
FIG. 23 is a diagram of an exemplary embodiment of a machine-learning module.

Referring now to FIG. 23, an exemplary embodiment of a machine-learning module 2300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 2304 to generate an algorithm instantiated in hardware or software logic, data structures, and/or functions that will be performed by a computing device/module to produce outputs 2308 given data provided as inputs 2312; this is in contrast to a non-machine learning software program where the commands to be executed are determined in advance by a user and written in a programming language.

Still referring to FIG. 23, "training data," as used herein, is data containing correlations that a machine-learning process may use to model relationships between two or more categories of data elements. For instance, and without limitation, training data 2304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 2304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 2304 according to various correlations; correlations may indicate causative and/or predictive links between categories of data elements, which may be modeled as relationships such as mathematical relationships by machine-learning processes as described in further detail below. Training data 2304 may be formatted and/or organized by categories of data elements, for instance by associating data elements with one or more descriptors corresponding to categories of data elements. As a non-limiting example, training data 2304 may include data entered in standardized forms by persons or processes, such that entry of a given data element in a given field in a form may be mapped to one or more descriptors of categories. Elements in training data 2304 may be linked to descriptors of categories by tags, tokens, or other data elements; for instance, and without limitation, training data 2304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 23, training data 2304 may include one or more elements that are not categorized; that is, training data 2304 may not be formatted or contain descriptors for some elements of data. Machine-learning algorithms and/or other processes may sort training data 2304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 2304 to be made applicable for two or more distinct machine-learning algorithms as described in further detail below. Training data 2304 used by machine-learning module 2300 may correlate any input data as described in this disclosure to any output data as described in this disclosure. As a non-limiting illustrative example, input data may include liquid data, liquid parameters, parameter range, facility data, facility parameters, mechanical variability, reference data, interaction profile, compatibility score, and the like. As a non-limiting illustrative example, output data may include mechanical variability, reference data, interaction profile, compatibility score, adjustment profile, adjusted facility parameter, adjusted liquid parameter, and the like.

Further referring to FIG. 23, training data may be filtered, sorted, and/or selected using one or more supervised and/or unsupervised machine-learning processes and/or models as described in further detail below; such models may include without limitation a training data classifier 2316. Training data classifier 2316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 2300 may generate a classifier using a classification algorithm, defined as a process whereby a computing device and/or any module and/or component operating thereon derives a classifier from training data 2304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 2316 may classify elements of training data to facility cohort associated with facility size, location, and the like. As a non-limiting example, training data classifier 2316 may classify elements of training data to liquid cohort associated with type of liquid, and the like.

Still referring to FIG. 23, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 23, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 23, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 23, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 23, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 23, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 23, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 23, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 23, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 23, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 23, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 23, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 23, machine-learning module 2300 may be configured to perform a lazy-learning process 2320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 2304. Heuristic may include selecting some number of highest-ranking associations and/or training data 2304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 23, machine-learning processes as described in this disclosure may be used to generate machine-learning models 2324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 2324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 2324 may be generated by creating an artificial neural network, such as a convolutional neural network comprising an input layer of nodes, one or more intermediate layers, and an output layer of nodes. Connections between nodes may be created via the process of "training" the network, in which elements from a training data 2304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 23, machine-learning algorithms may include at least a supervised machine-learning process 2328. At least a supervised machine-learning process 2328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include liquid data, liquid parameters, parameter range, facility data, facility parameters, mechanical variability, reference data, interaction profile, compatibility score, and the like as described above as inputs, mechanical variability, reference data, interaction profile, compatibility score, adjustment profile, adjusted facility parameter, adjusted liquid parameter, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 2304. Persons skilled in the art, upon reviewing the entirety of this disclosure, will be aware of various possible variations of at least a supervised machine-learning process 2328 that may be used to determine relation between inputs and outputs. Supervised machine-learning processes may include classification algorithms as defined above.

With further reference to FIG. 23, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation, gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 23, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 23, machine learning processes may include at least an unsupervised machine-learning processes 2332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 2332 may not require a response variable; unsupervised processes 2332 may be used to find interesting patterns and/or inferences between variables, to determine a degree of correlation between two or more variables, or the like.

Still referring to FIG. 23, machine-learning module 2300 may be designed and configured to create a machine-learning model 2324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 23, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 23, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 23, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 23, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 23, one or more processes or algorithms described above may be performed by at least a dedicated hardware unit 2336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 2336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 2336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 2336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 24:
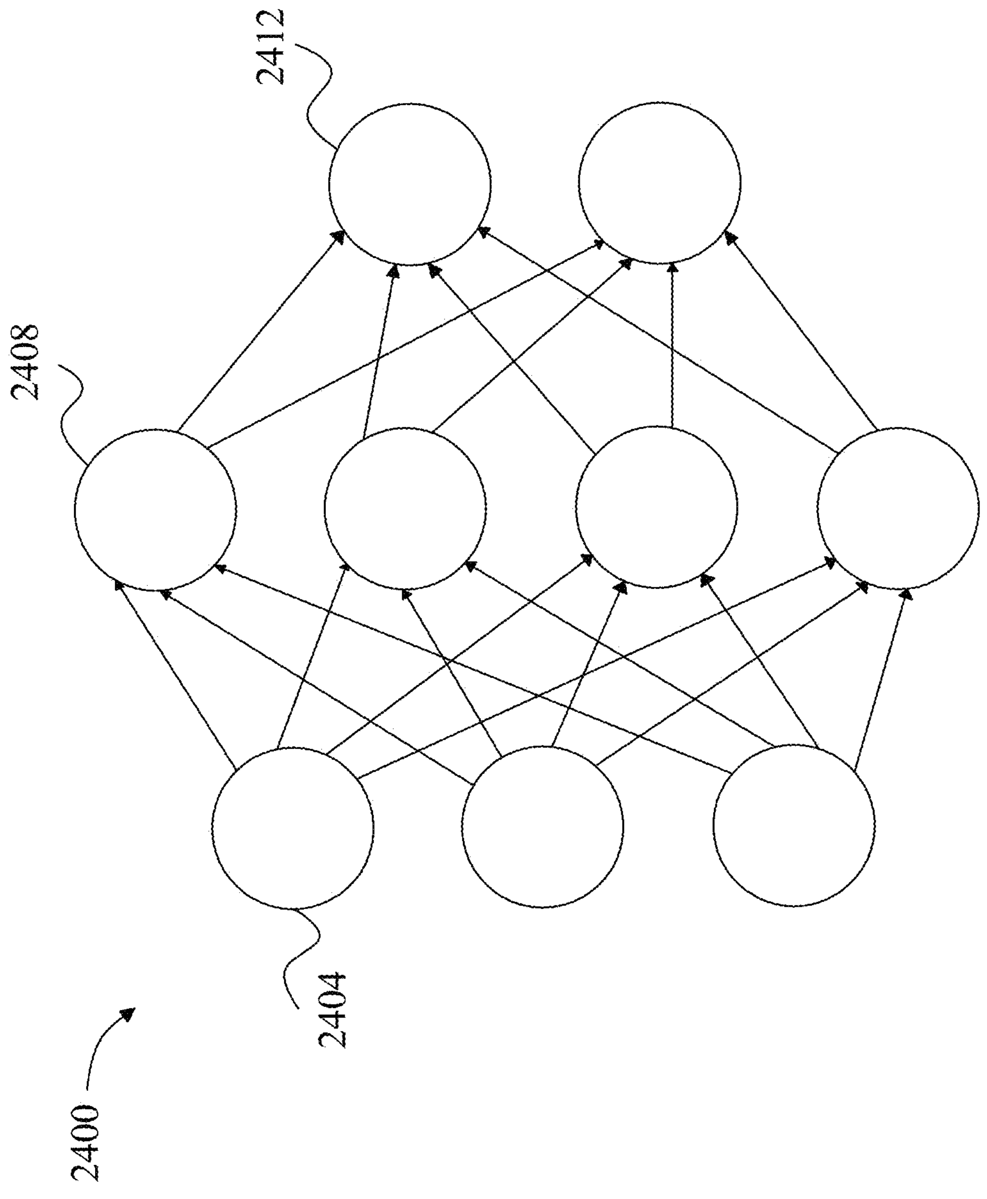
FIG. 24 is a diagram of an exemplary embodiment of a neural network.

Referring now to FIG. 24, an exemplary embodiment of neural network 2400 is illustrated. A neural network 2400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 2404, one or more intermediate layers 2408, and an output layer of nodes 2412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 25:
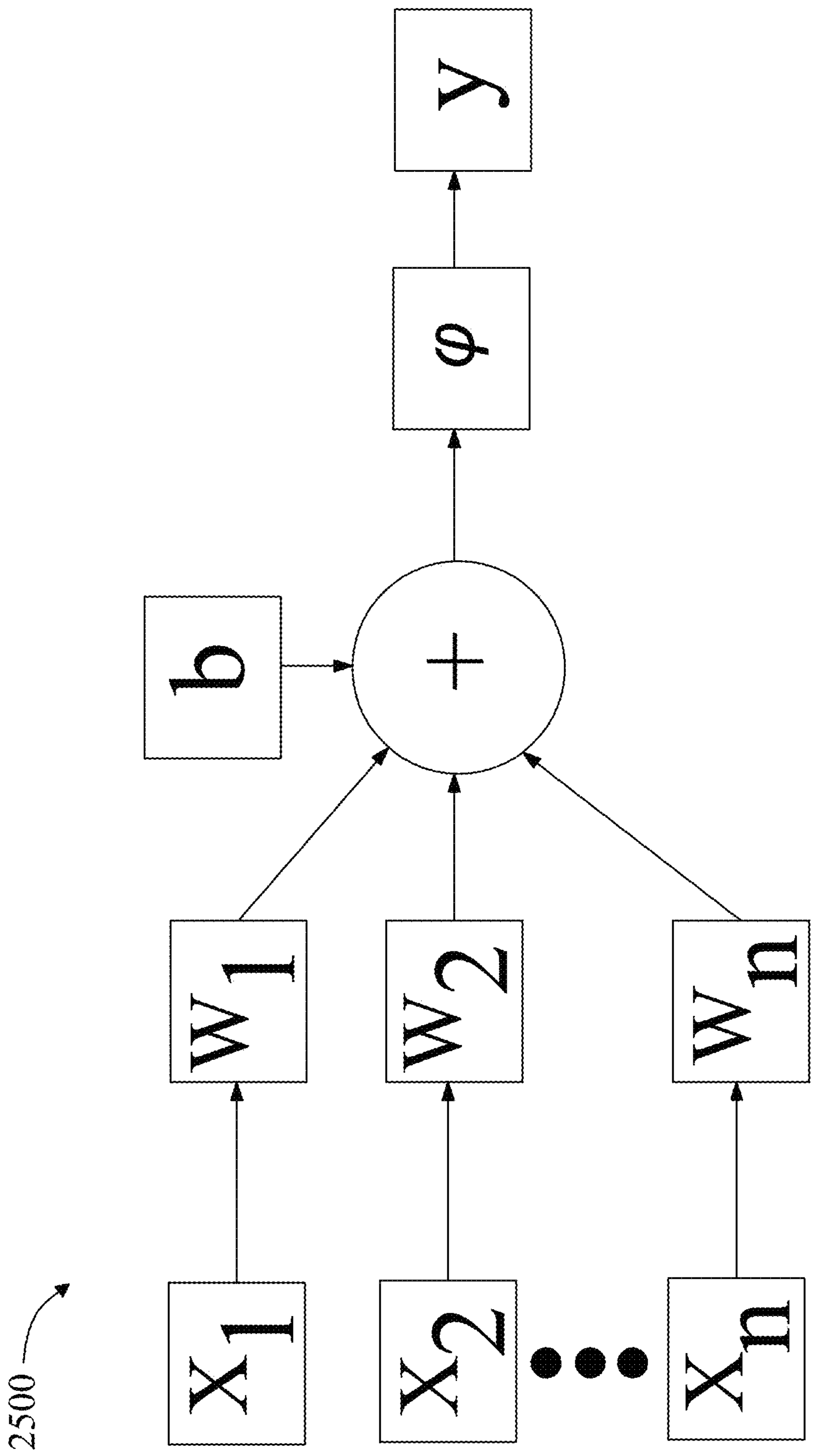
FIG. 25 is a diagram of an exemplary embodiment of a node of a neural network.

Referring now to FIG. 25, an exemplary embodiment of a node 2500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\Sigma_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, $w_{old}$ is the previous weight value, α is a parameter to set the learning rate, and $$\frac{dJ}{dw}$$

is the partial derivative of with respect to weight w.

Figure 26:
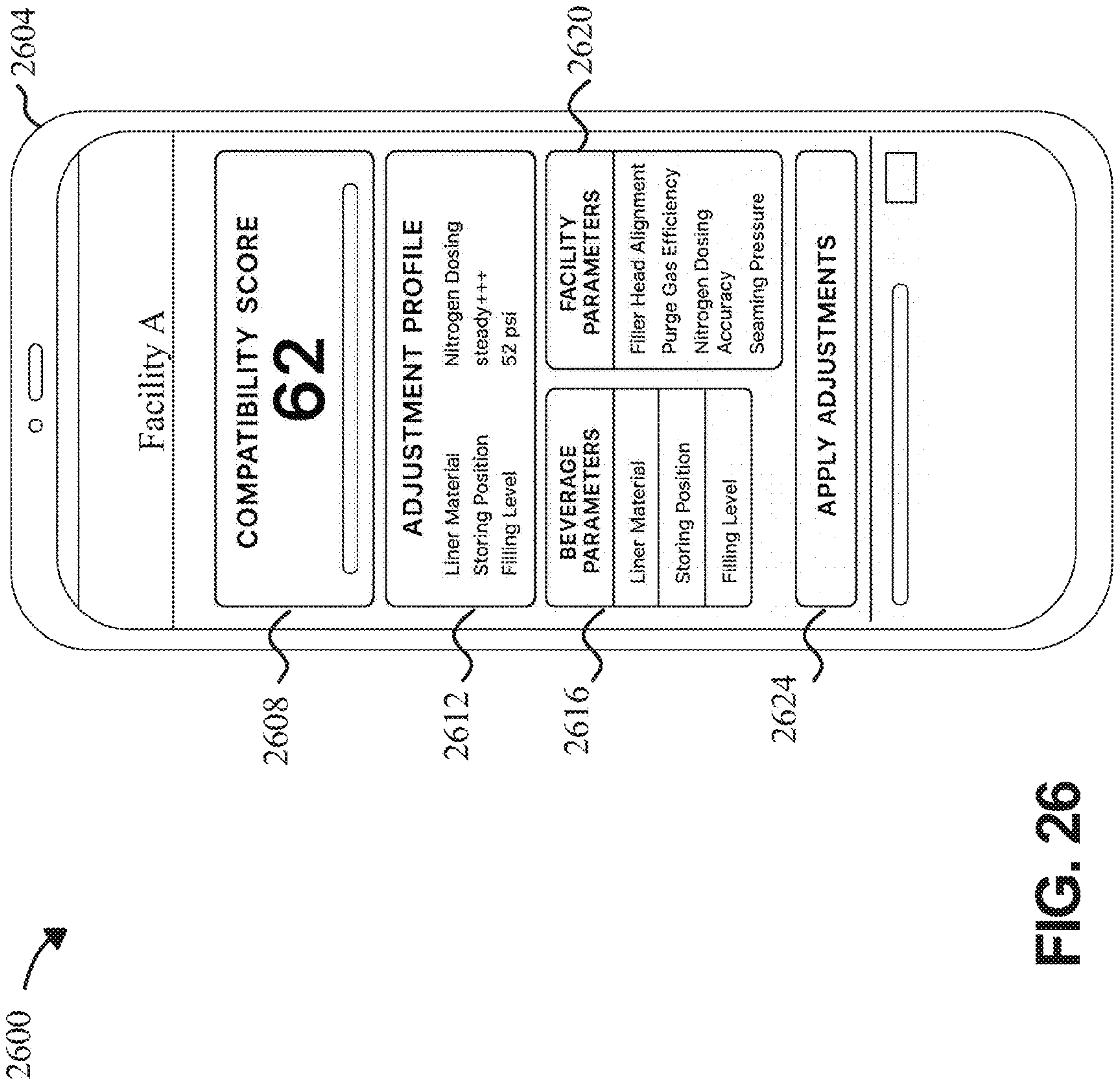
FIG. 26 illustrates an exemplary user interface.

Referring now to FIG. 26, an exemplary user interface 2600 is illustrated. The user interface 2600 may be displayed on a user device 2604, such as a mobile phone, tablet, or other computing device configured to execute a graphical display generated by processor 104. The user interface 2600 may include a plurality of interactive elements and information panels that present adaptive parameter data generated by the apparatus described herein. In some embodiments, the user interface 2600 may display a compatibility score 2608, which may represent a predictive measure of the suitability between one or more liquid parameters and one or more facility parameters. The compatibility score 2608 may be numerically displayed and may optionally include a progress bar or visual indicator that reflects relative stability or packaging fitness. The compatibility score 2608 may be dynamically updated in response to changes in facility conditions, liquid composition, or updated machine-learning predictions. The user interface 2600 may include adjustment profile 2612 may be presented. The adjustment profile 2612 may include one or more recommended adjustments to liquid or facility parameters. For example, the adjustment profile 2612 may display an adjusted liquid parameter, such as a modified $CO_2$ concentration or filling level, and an adjusted facility parameter, such as nitrogen dosing pressure or purge gas efficiency. These parameters may be derived as a function of the compatibility score and mechanical variability, as computed by processor 104. In some embodiments, the user interface 2600 may include a beverage parameters panel 2616 and a facility parameters panel 2620, each displaying corresponding parameters used in compatibility determination. The beverage parameters panel 2616 may include parameters such as liner material, storing position, and filling level, while the facility parameters panel 2620 may include parameters such as filler head alignment, purge gas efficiency, nitrogen dosing accuracy, and seaming pressure. These panels may enable users to visually compare operational and product characteristics relevant to predictive adaptation. The user interface 2600 may include a graphical element 2624, which may include an interactive control such as a button labeled "APPLY ADJUSTMENTS." The graphical element 2624 may enable the user to confirm or implement the generated adjustment profile in real time. Activation of the graphical element 2624 may prompt processor 104 to transmit updated control signals to the facility or to record acceptance of the adjustment profile within memory 108. In some embodiments, the user interface 2600 may receive input from the user, such as confirmation of facility capabilities or a negative input indicating that a facility is unable to apply a recommended adjustment. Based on such input, the processor may update the adjustment profile or generate an alternative recommendation including one or more alternative facilities. The structured and interactive nature of user interface 2600 may facilitate human-in-the-loop optimization of liquid-facility compatibility with minimal computational latency and enhanced operational transparency.

Figure 27:
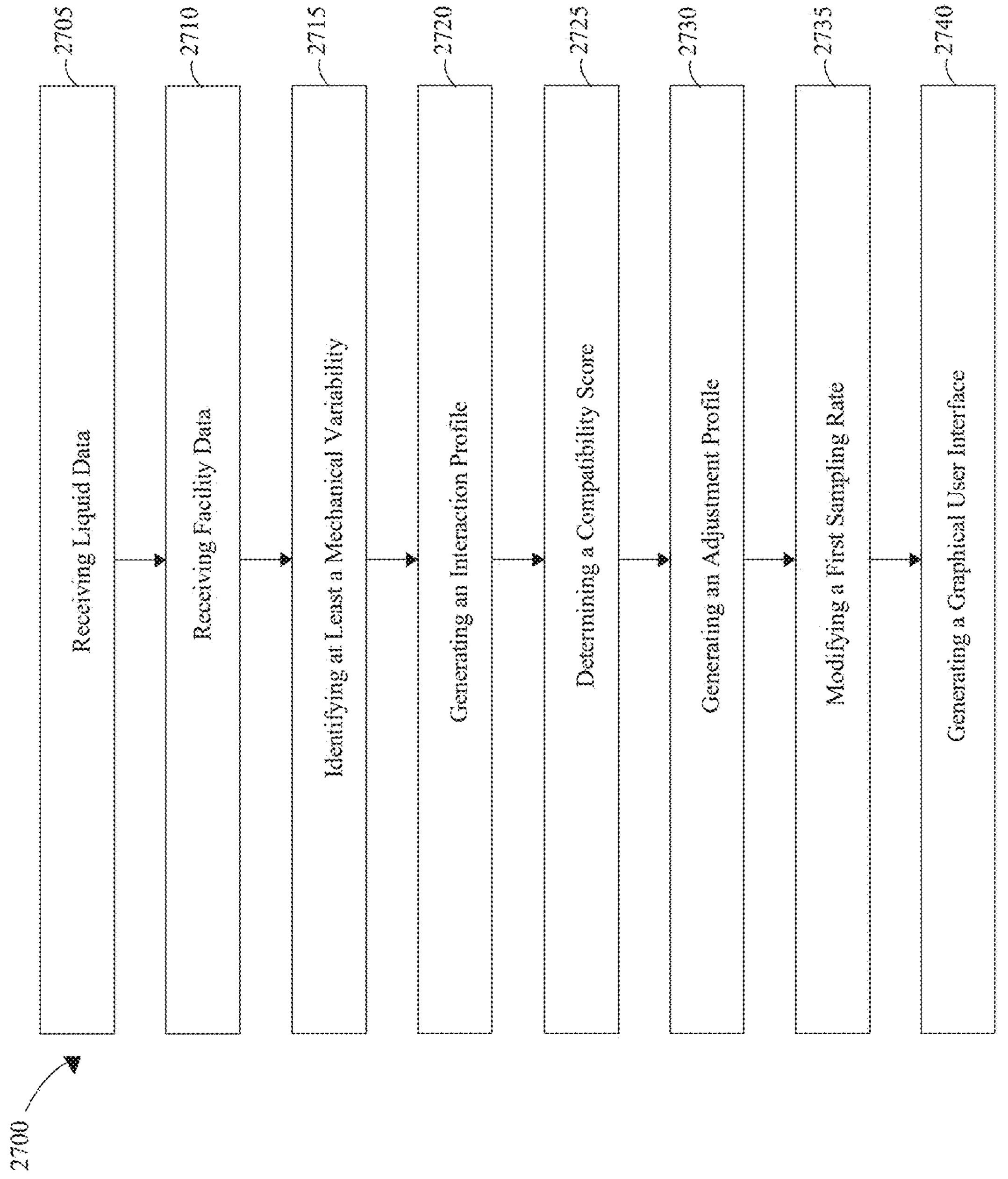
FIG. 27 illustrates a flow diagram of an exemplary method of predictive adaptation of data parameters.

Referring now to FIG. 27, a flow diagram of an exemplary method 2700 of predictive adaptation of data parameters. Method 2700 contains a step of 2705 of receiving, using at least a processor, liquid data including one or more liquid parameters associated with a liquid formulation and an associated parameter range. In some embodiments, the liquid data may include the one or more liquid parameters selected from the group consisting of a liner material, a storing position and a filling level. These may be implemented with reference to FIGS. 1-26.

With continued reference to FIG. 27, method 2700 contains a step 2710 of receiving, using at least a processor, facility data at a first sampling rate, wherein the facility data includes one or more facility parameters. In some embodiments, the facility data may include the one or more facility parameters selected from the group consisting of filler head alignment, purge gas efficiency, nitrogen dosing accuracy, and seaming pressure. In some embodiments, receiving the liquid data and the facility data may include generating a language processing model using a stochastic gradient descent algorithm, wherein the stochastic gradient descent algorithm iteratively optimizes an objective function representing a statistical estimation of relationships between the one or more liquid parameters and the one or more facility parameters in a form of a sum of relationships to be estimated, and extracting the one or more liquid parameters and the one or more facility parameters using the language processing model. These may be implemented with reference to FIGS. 1-26.

With continued reference to FIG. 27, method 2700 contains a step 2715 of identifying, using at least a processor, at least a mechanical variability as a function of one or more facility parameters and reference data. In some embodiments, identifying the at least a mechanical variability may include generating one or more deviation vectors representing a difference between the one or more facility parameters and corresponding facility parameters contained in the reference data, and aggregating the one or more deviation vectors into a mechanical variability index. These may be implemented with reference to FIGS. 1-26.

With continued reference to FIG. 27, method 2700 contains a step 2720 of generating, using at least a processor, an interaction profile between one or more liquid parameters and one or more facility parameters. In some embodiments, generating the interaction profile may include using a plurality of interaction machine-learning models, wherein the plurality of interaction machine-learning models may include a multivariate regression model configured to capture a proportional dependency between the one or more liquid parameters and the one or more facility parameters, and a deep learning model including multiple hidden layers configured to determine a non-linear multivariate feature interaction between the one or more liquid parameters and the one or more facility parameters. These may be implemented with reference to FIGS. 1-26.

With continued reference to FIG. 27, method 2700 contains a step 2725 of determining, using at least a processor, a compatibility score as a function of an interaction profile. In some embodiments, determining the compatibility score may include using a compatibility machine-learning model, wherein the compatibility machine-learning model may include a neural network model that has been trained using labeled data including exemplary liquid parameters and exemplary facility parameters correlated to exemplary compatibility scores. These may be implemented with reference to FIGS. 1-26.

With continued reference to FIG. 27, method 2700 contains a step 2730 of generating, using at least a processor, an adjustment profile as a function of a compatibility score and at least a mechanical variability, wherein generating the adjustment profile includes in response to the compatibility score being lower than a compatibility threshold, generating at least an adjusted liquid parameter of the adjustment profile as a function of the at least a mechanical variability and in response to the at least an adjusted liquid parameter exceeding the parameter range, generating at least an adjusted facility parameter of the adjustment profile as a function of the one or more liquid parameters. These may be implemented with reference to FIGS. 1-26.

With continued reference to FIG. 27, method 2700 contains a step 2735 of modifying, using at least a processor, a first sampling rate to a second sampling rate as a function of an adjustment profile. This may be implemented with reference to FIGS. 1-26.

With continued reference to FIG. 27, method 2700 contains a step 2740 of generating, using at least a processor, a graphical user interface including an adjustment profile. In some embodiments, generating the adjustment profile may include using an adjustment machine-learning model that has been trained with adjustment training data may include exemplary liquid parameters and exemplary facility parameters correlated to exemplary adjusted liquid parameters and exemplary adjusted facility parameters. In some embodiments, generating the adjustment profile may include receiving a facility input, wherein the facility input may include a negative input indicating that a facility is unable to implement the at least an adjusted facility parameter, and in response to the negative input, generating an alternative recommendation as a function of the reference data, wherein the alternative recommendation may include one or more alternative facilities including the compatibility score greater than or equal to the compatibility threshold. In some embodiments, generating the alternative recommendation may include determining an estimated score for each alternative facility contained in the reference data, and filtering out the one or more alternative facilities having the estimated score lower than the compatibility threshold. These may be implemented with reference to FIGS. 1-26.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, For example, and without limitation, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, and without limitation, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 28:
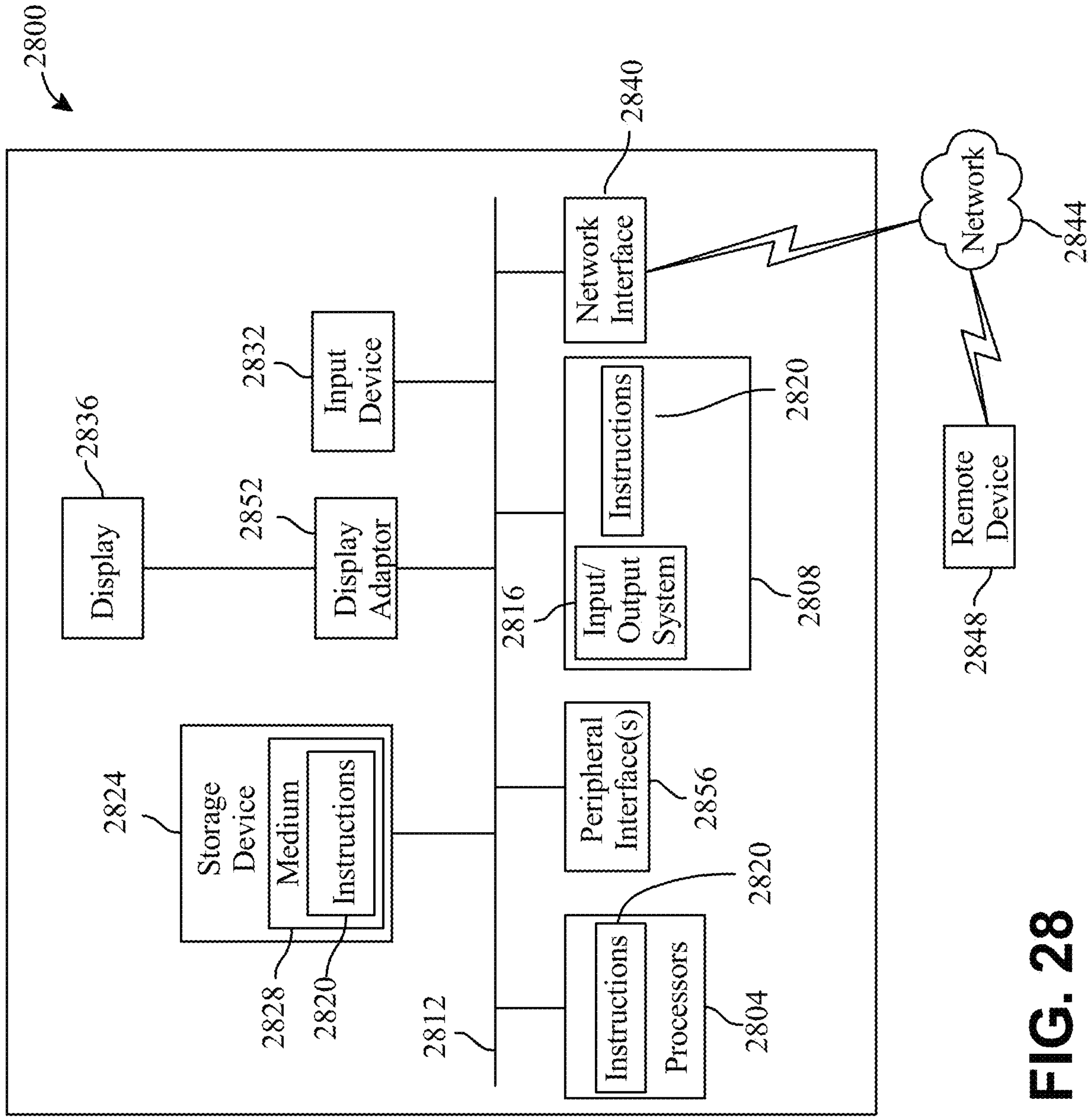
FIG. 28 illustrates a block diagram of a computing system that can be used to implement any one or more of the methodologies disclosed herein and any one or more portions thereof.

FIG. 28 shows a diagrammatic representation of one embodiment of a computing device in the exemplary form of a computer system 2800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 2800 includes a processor 2804 and a memory 2808 that communicate with each other, and with other components, via a bus 2812. Bus 2812 may include any of several types of bus structures including, but not limited to, a memory bus, a memory controller, a peripheral bus, a local bus, and any combinations thereof, using any of a variety of bus architectures.

Processor 2804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 2804 may be organized according to Von Neumann and/or Harvard architecture as a non-limiting example. Processor 2804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulpo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 2808 may include various components (e.g., machine-readable media) including, but not limited to, a random-access memory component, a read only component, and any combinations thereof. In one example, a basic input/output system 2816 (BIOS), including basic routines that help to transfer information between elements within computer system 2800, such as during start-up, may be stored in memory 2808. Memory 2808 may also include (e.g., stored on one or more machine-readable media) instructions (e.g., software) 2820 embodying any one or more of the aspects and/or methodologies of the present disclosure. In another example, memory 2808 may further include any number of program modules including, but not limited to, an operating system, one or more application programs, other program modules, program data, and any combinations thereof. Memory 2808 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 2800 may also include a storage device 2824. Examples of a storage device (e.g., storage device 2824) include, but are not limited to, a hard disk drive, a magnetic disk drive, an optical disc drive in combination with an optical medium, a solid-state memory device, and any combinations thereof. Storage device 2824 may be connected to bus 2812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 2824 (or one or more components thereof) may be removably interfaced with computer system 2800 (e.g., via an external port connector (not shown)). Particularly, storage device 2824 and an associated machine-readable medium 2828 may provide nonvolatile and/or volatile storage of machine-readable instructions, data structures, program modules, and/or other data for computer system 2800. In some embodiments, storage device 2824 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 2820 may reside, completely or partially, within machine-readable medium 2828. In another example, software 2820 may reside, completely or partially, within processor 2804.

Computer system 2800 may also include an input device 2832. In one example, a user of computer system 2800 may enter commands and/or other information into computer system 2800 via input device 2832. Examples of an input device 2832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 2832 may be interfaced to bus 2812 via any of a variety of interfaces (not shown) including, but not limited to, a serial interface, a parallel interface, a game port, a USB interface, a FIREWIRE interface, a direct interface to bus 2812, and any combinations thereof. Input device 2832 may include a touch screen interface that may be a part of or separate from display 2836, discussed further below. Input device 2832 may be utilized as a user selection device for selecting one or more graphical representations in a graphical interface as described above.

A user may also input commands and/or other information to computer system 2800 via storage device 2824 (e.g., a removable disk drive, a flash drive, etc.) and/or network interface device 2840. A network interface device, such as network interface device 2840, may be utilized for connecting computer system 2800 to one or more of a variety of networks, such as network 2844, and one or more remote devices 2848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 2844, may employ a wired and/or a wireless mode of communication. In general, any network topology may be used. Information (e.g., data, software 2820, etc.) may be communicated to and/or from computer system 2800 via network interface device 2840.

Computer system 2800 may further include a video display adapter 2852 for communicating a displayable image to a display device, such as display 2836. Examples of a display device include, but are not limited to, a liquid crystal display (LCD), a cathode ray tube (CRT), a plasma display, a light emitting diode (LED) display, and any combinations thereof. Display adapter 2852 and display 2836 may be utilized in combination with processor 2804 to provide graphical representations of aspects of the present disclosure. In addition to a display device, computer system 2800 may include one or more other peripheral output devices including, but not limited to, an audio speaker, a printer, and any combinations thereof. Such peripheral output devices may be connected to bus 2812 via a peripheral interface 2856. Examples of a peripheral interface include, but are not limited to, a serial port, a USB connection, a FIREWIRE connection, a parallel connection, and any combinations thereof.

Further referring to FIG. 28, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 28, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 28, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 2800, processor 2804, and memory 2808 may be virtualized; that is, a virtual machine and/or container may interact directly with such computing system 2800, processor 2804, and/or memory 2808, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 2804 comprises a plurality of processors and/or processor cores, virtualization may, in some cases, simulate or emulate a single (virtual)

processor whose functions are allocated to one or more of the plurality of processors and/or processor cores. In this case, while processor 2804 may be said to be virtualized, the processor 2804, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU; (2) VMware by Broadcom Inc of Palo Alto, California; (3) VirtualBox by Oracle Corporation headquartered in Austin, Texas; and (4) kernel-based virtual machine (KVM).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for predictive adaptation of data parameters, the apparatus comprising:
- at least a processor; and
- a memory communicatively connected to the at least a processor, wherein the memory contains instructions configuring the at least a processor to:
  - receive liquid data comprising one or more liquid parameters associated with a liquid formulation and an associated parameter range;
  - receive, from one or more physical sensors of a facility, facility data at a first sampling rate, wherein the facility data comprises one or more facility parameters;
  - identify at least a mechanical variability as a function of the one or more facility parameters and reference data;
  - generate an interaction profile between the one or more liquid parameters and the one or more facility parameters;
  - determine a compatibility score as a function of the interaction profile;
  - generate an adjustment profile as a function of the compatibility score and the at least a mechanical variability, wherein generating the adjustment profile comprises:
    - in response to the compatibility score being lower than a compatibility threshold, generating at least an adjusted liquid parameter of the adjustment profile as a function of the at least a mechanical variability; and
    - in response to the at least an adjusted liquid parameter exceeding the parameter range, generating at least an adjusted facility parameter of the adjustment profile as a function of the one or more liquid parameters;
  - control operation of the one or more physical sensors to modify the first sampling rate to a second sampling rate as a function of the adjustment profile, wherein the adjustment profile is configured to control at least one of:
    - a liquid parameter of the liquid formulation; or
    - a facility operating parameter; and
  - generate a graphical user interface comprising the adjustment profile.

2. The apparatus of claim 1, wherein the liquid data comprises the one or more liquid parameters selected from the group consisting of a liner material, a storing position and a filling level.

3. The apparatus of claim 1, wherein the facility data comprises the one or more facility parameters selected from the group consisting of filler head alignment, purge gas efficiency, nitrogen dosing accuracy, and seaming pressure.

4. The apparatus of claim 1, wherein receiving the liquid data and the facility data comprises:
- generating a language processing model using a stochastic gradient descent algorithm, wherein the stochastic gradient descent algorithm iteratively optimizes an objective function representing a statistical estimation of relationships between the one or more liquid parameters and the one or more facility parameters in a form of a sum of relationships to be estimated; and
- extracting the one or more liquid parameters and the one or more facility parameters using the language processing model.

5. The apparatus of claim 1, wherein identifying the at least a mechanical variability comprises:
- generating one or more deviation vectors representing a difference between the one or more facility parameters and corresponding facility parameters contained in the reference data; and
- aggregating the one or more deviation vectors into a mechanical variability index.

6. The apparatus of claim 1, wherein generating the interaction profile comprises using a plurality of interaction machine-learning models, wherein the plurality of interaction machine-learning models comprises:
- a multivariate regression model configured to capture a proportional dependency between the one or more liquid parameters and the one or more facility parameters; and
- a deep learning model comprising multiple hidden layers configured to determine a non-linear multivariate feature interaction between the one or more liquid parameters and the one or more facility parameters.

7. The apparatus of claim 1, wherein determining the compatibility score comprises using a compatibility machine-learning model, wherein the compatibility machine-learning model comprises a neural network model that has been trained using labeled data comprising exemplary liquid parameters and exemplary facility parameters correlated to exemplary compatibility scores.

8. The apparatus of claim 1, wherein generating the adjustment profile comprises using an adjustment machine-learning model that has been trained with adjustment training data comprises exemplary liquid parameters and exemplary facility parameters correlated to exemplary adjusted liquid parameters and exemplary adjusted facility parameters.

9. The apparatus of claim 1, wherein generating the adjustment profile comprises:

receiving a facility input, wherein the facility input comprises a negative input indicating that a facility is unable to implement the at least an adjusted facility parameter; and in response to the negative input, generating an alternative recommendation as a function of the reference data, wherein the alternative recommendation comprises one or more alternative facilities comprising the compatibility score greater than or equal to the compatibility threshold.

10. The apparatus of claim 9, wherein generating the alternative recommendation comprises:

determining an estimated score for each alternative facility contained in the reference data; and filtering out the one or more alternative facilities having the estimated score lower than the compatibility threshold.

11. A method of predictive adaptation of data parameters, the method comprising:

receiving, using at least a processor, liquid data comprising one or more liquid parameters associated with a liquid formulation and an associated parameter range;

receiving, using the at least a processor and from one or more physical sensors of a facility, facility data at a first sampling rate, wherein the facility data comprises one or more facility parameters;

identifying, using the at least a processor, at least a mechanical variability as a function of the one or more facility parameters and reference data;

generating, using the at least a processor, an interaction profile between the one or more liquid parameters and the one or more facility parameters;

determining, using the at least a processor, a compatibility score as a function of the interaction profile;

generating, using the at least a processor, an adjustment profile as a function of the compatibility score and the at least a mechanical variability, wherein generating the adjustment profile comprises:

in response to the compatibility score being lower than a compatibility threshold, generating at least an adjusted liquid parameter of the adjustment profile as a function of the at least a mechanical variability; and in response to the at least an adjusted liquid parameter exceeding the parameter range, generating at least an adjusted facility parameter of the adjustment profile as a function of the one or more liquid parameters;

controlling, using the at least a processor, operation of the one or more physical sensors to modify the first sampling rate to a second sampling rate as a function of the adjustment profile, wherein the adjustment profile is configured to control at least one of:

a liquid parameter of the liquid formulation; or a facility operating parameter; and generating, using the at least a processor, a graphical user interface comprising the adjustment profile.

12. The method of claim 11, wherein the liquid data comprises the one or more liquid parameters selected from the group consisting of a liner material, a storing position and a filling level.

13. The method of claim 11, wherein the facility data comprises the one or more facility parameters selected from the group consisting of filler head alignment, purge gas efficiency, nitrogen dosing accuracy, and seaming pressure.

14. The method of claim 11, wherein receiving the liquid data and the facility data comprises:

generating a language processing model using a stochastic gradient descent algorithm, wherein the stochastic gradient descent algorithm iteratively optimizes an objective function representing a statistical estimation of relationships between the one or more liquid parameters and the one or more facility parameters in a form of a sum of relationships to be estimated; and extracting the one or more liquid parameters and the one or more facility parameters using the language processing model.

15. The method of claim 11, wherein identifying the at least a mechanical variability comprises:

generating one or more deviation vectors representing a difference between the one or more facility parameters and corresponding facility parameters contained in the reference data; and aggregating the one or more deviation vectors into a mechanical variability index.

16. The method of claim 11, wherein generating the interaction profile comprises using a plurality of interaction machine-learning models, wherein the plurality of interaction machine-learning models comprises:

a multivariate regression model configured to capture a proportional dependency between the one or more liquid parameters and the one or more facility parameters; and a deep learning model comprising multiple hidden layers configured to determine a non-linear multivariate feature interaction between the one or more liquid parameters and the one or more facility parameters.

17. The method of claim 11, wherein determining the compatibility score comprises using a compatibility machine-learning model, wherein the compatibility machine-learning model comprises a neural network model that has been trained using labeled data comprising exemplary liquid parameters and exemplary facility parameters correlated to exemplary compatibility scores.

18. The method of claim 11, wherein generating the adjustment profile comprises using an adjustment machine-learning model that has been trained with adjustment training data comprises exemplary liquid parameters and exemplary facility parameters correlated to exemplary adjusted liquid parameters and exemplary adjusted facility parameters.

19. The method of claim 11, wherein generating the adjustment profile comprises:

receiving a facility input, wherein the facility input comprises a negative input indicating that a facility is unable to implement the at least an adjusted facility parameter; and in response to the negative input, generating an alternative recommendation as a function of the reference data, wherein the alternative recommendation comprises one or more alternative facilities comprising the compatibility score greater than or equal to the compatibility threshold.

20. The method of claim 19, wherein generating the alternative recommendation comprises:

determining an estimated score for each alternative facility contained in the reference data; and filtering out the one or more alternative facilities having the estimated score lower than the compatibility threshold.

* * * * *